US007043497B1

(12) United States Patent
Carty et al.

(10) Patent No.: US 7,043,497 B1
(45) Date of Patent: May 9, 2006

(54) SYSTEM AND METHOD FOR CAPTURING AND STORING WEB SITE VISITOR PROFILE INFORMATION IN A DATA WAREHOUSE

(75) Inventors: Scott D. Carty, San Diego, CA (US); Sylvie Feghali Haddad, Columbia, SC (US); Tucker L. Smith, Irmo, SC (US)

(73) Assignee: NCR Corp., Dayton, OH (US)

( * ) Notice: Subject to any disclaimer, the term of this patent is extended or adjusted under 35 U.S.C. 154(b) by 378 days.

(21) Appl. No.: 09/990,541

(22) Filed: Nov. 16, 2001

(51) Int. Cl.
G06F 7/00 (2006.01)

(52) U.S. Cl. .................. 707/102; 707/100; 707/101; 707/3

(58) Field of Classification Search .......... 707/104.1, 707/102, 103.4, 100; 709/219; 705/19
See application file for complete search history.

(56) References Cited

U.S. PATENT DOCUMENTS

| 5,974,451 | A | * | 10/1999 | Simmons .................. 709/218 |
|---|---|---|---|---|
| 6,029,174 | A | | 2/2000 | Sprenger et al. |
| 6,029,195 | A | * | 2/2000 | Herz ........................ 725/116 |
| 6,101,489 | A | | 8/2000 | Lannert et al. |
| 6,112,181 | A | | 8/2000 | Shear et al. |
| 6,128,624 | A | | 10/2000 | Papierniak et al. |
| 6,151,584 | A | | 11/2000 | Papierniak et al. |
| 6,151,601 | A | | 11/2000 | Papierniak et al. |
| 6,157,928 | A | | 12/2000 | Sprenger et al. |
| 6,594,692 | B1 | * | 7/2003 | Reisman ................... 709/219 |

OTHER PUBLICATIONS 8E-bussines Terdata @ctive Warehouse 2.0, Jun. 2000.*
NCR World Mark 5250 Server, Teradata manager, Teradata E-Business Analytics for advertising, Powering one-to-one service, What is NCR Teradata.*

NCR Teradata analyst pack.*
Teradata Database Technical Overview.*
E-Business Teradata @ctive Warehouse, Installation and Customization Guide, Release 3.0, Jan. 2001.

* cited by examiner

Primary Examiner—Charles Rones
Assistant Examiner—Sana Al-Hashemi
(74) Attorney, Agent, or Firm—James M. Stover

(57) ABSTRACT

A customer relationship management system for storing and managing information for an E-Business retailer. The customer relationship system includes a database system for storing and organizing said information, a logical data model defining the manner in which said information is stored and related within the database system, and a subject area within the logical data model defining the manner in which profile information concerning web site visitors to a web site operated by the E-Business retailer is stored and organized within the database system. Visitors may include any individuals, households or organizations that are of interest to the E-Business retailer. The profile information collected and organized within the database system in accordance with the logical data model may include information concerning household and organizational affiliations of said visitors; information concerning occupations of said visitors; information concerning income levels of said visitors; information concerning educational levels of said visitors; marital status information about said visitors; gender information about said visitors; ethnicity information about said visitors; residence information about said visitors; and language information about said visitors. Profile information may further include a customer score associated with each web site visitor, wherein a visitor's customer score is determined from previous behavior of the visitor with the E-Business retailer, and is an indication of the visitor's future behavior with the E-Business retailer.

3 Claims, 59 Drawing Sheets

FIG. 7
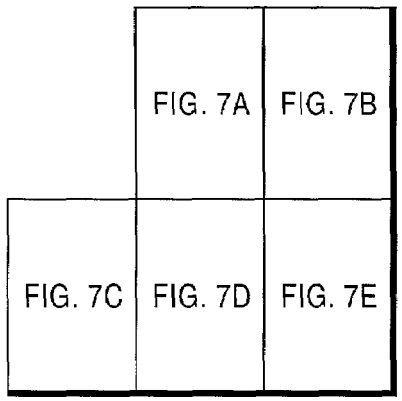
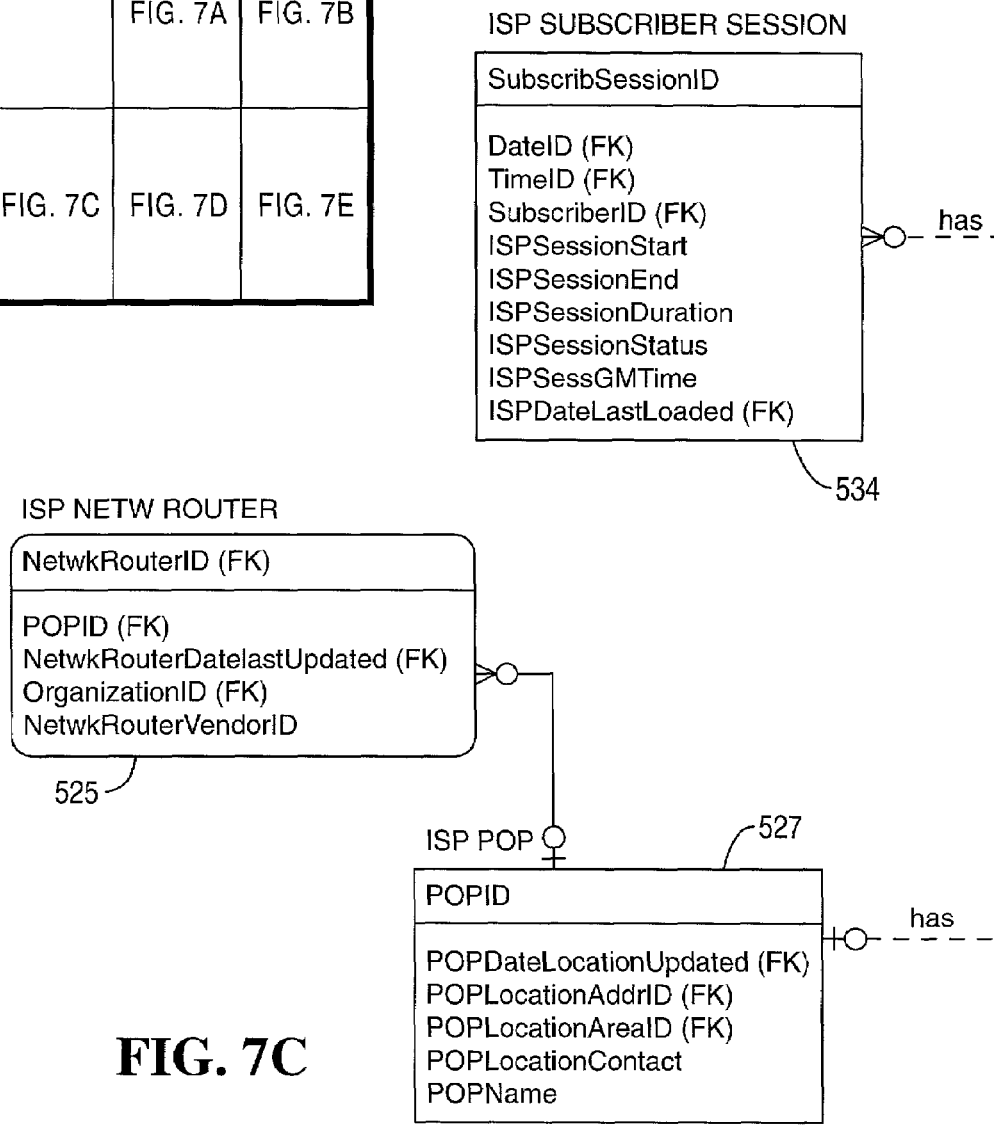
FIG. 7C

FIG. 7E
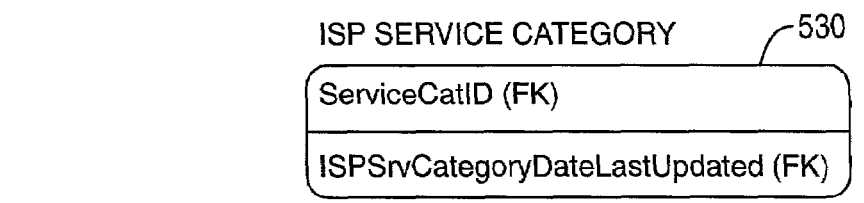
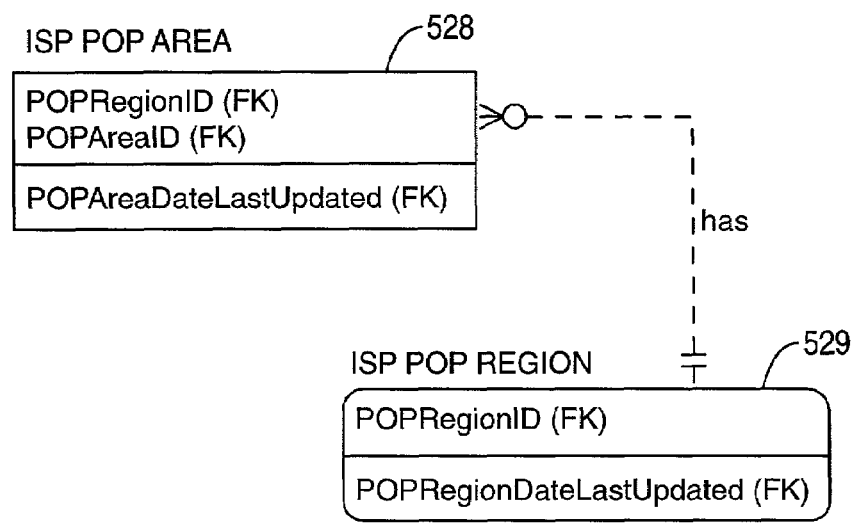
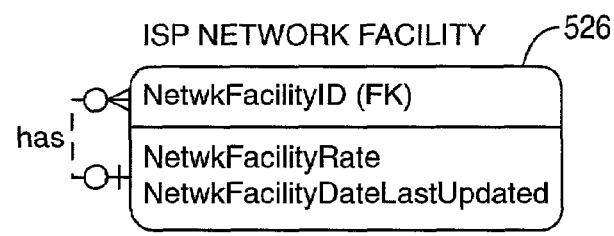

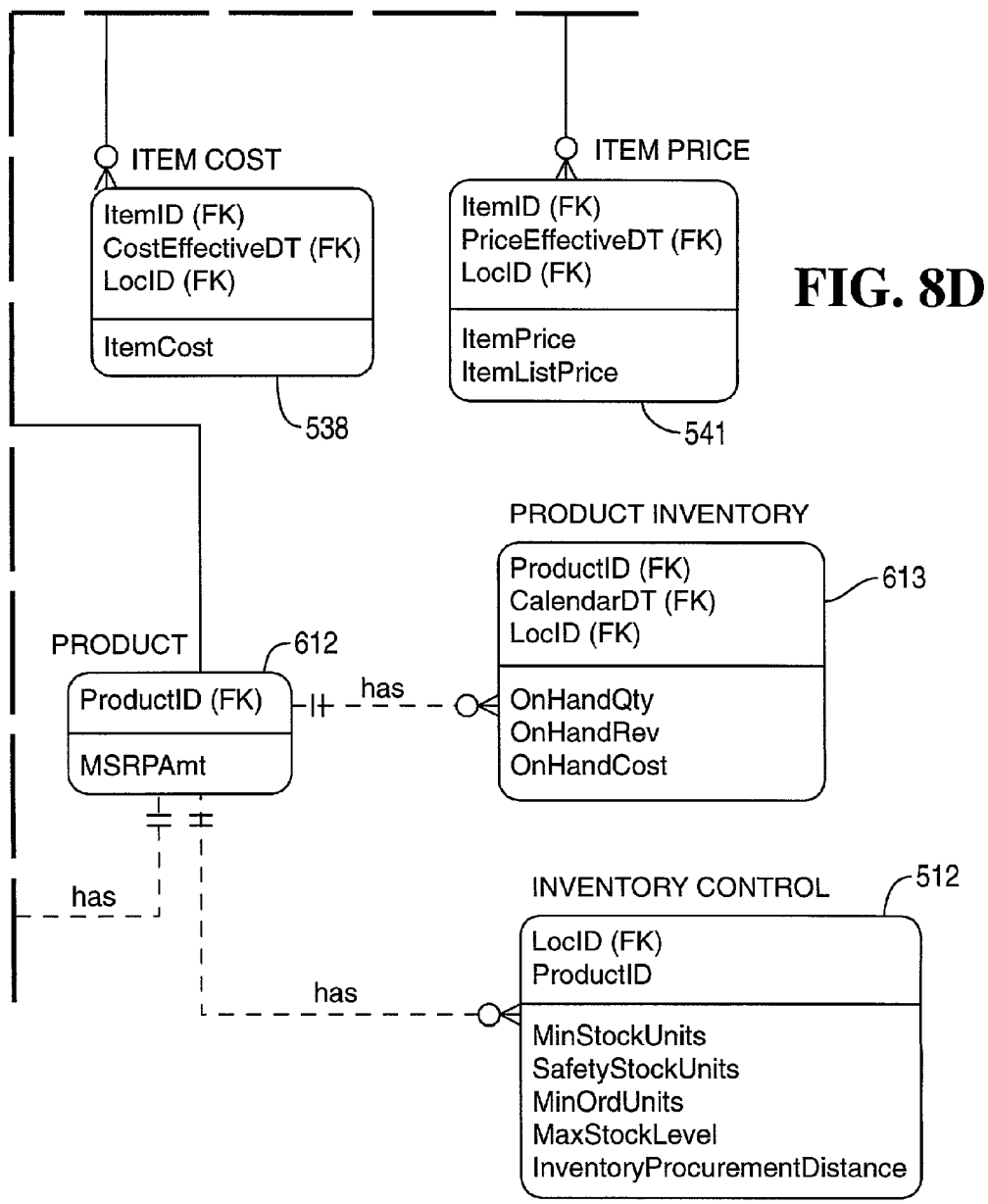

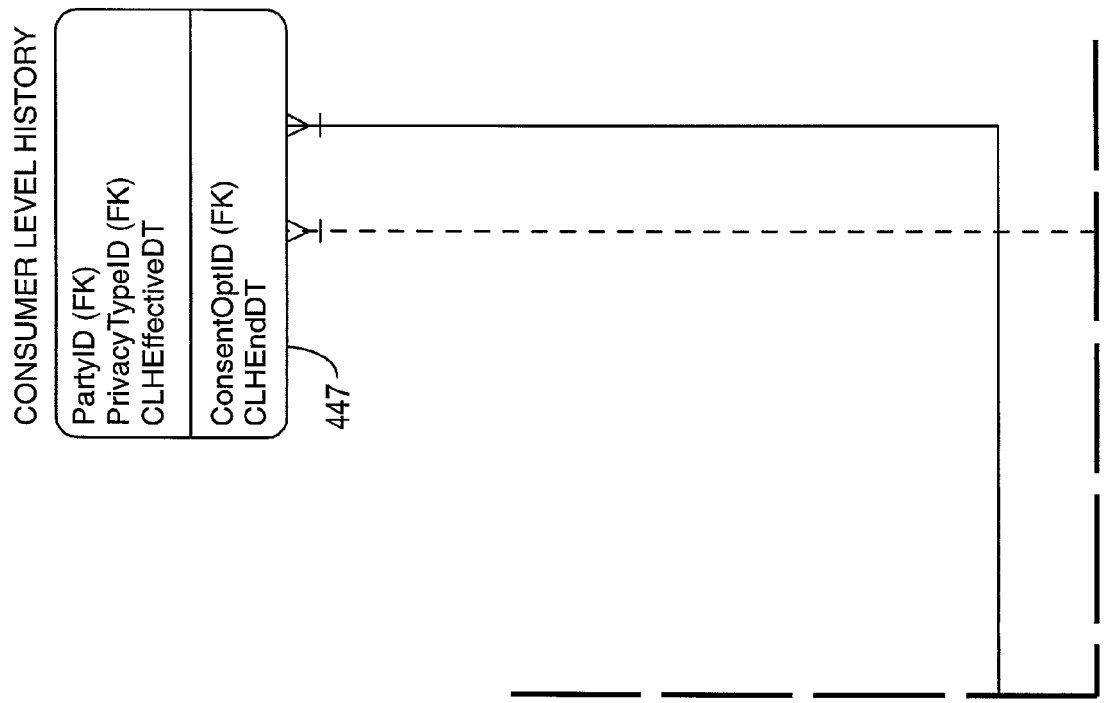

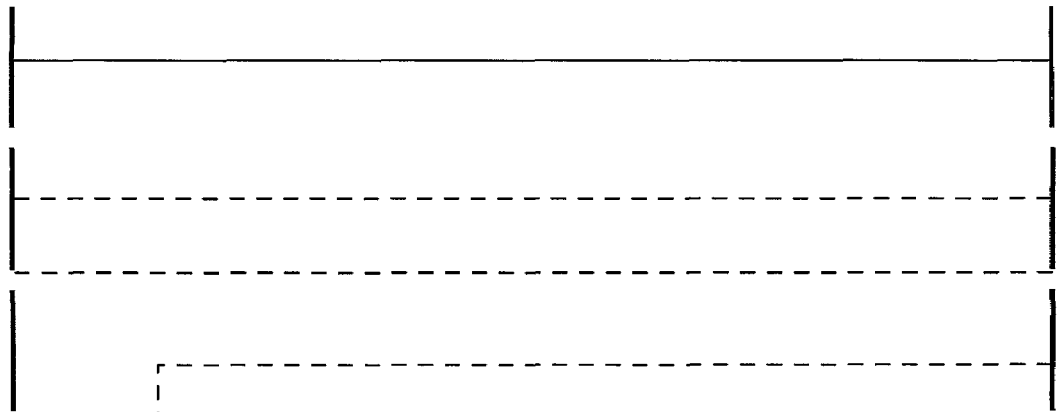
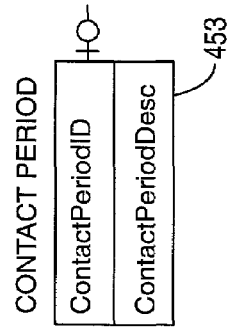
453
FIG. 12C
| FIG. 12A | FIG. 12B |
| FIG. 12C | FIG. 12D |
| FIG. 12E | FIG. 12F |
| FIG. 12G | |
FIG. 12

SYSTEM AND METHOD FOR CAPTURING AND STORING WEB SITE VISITOR PROFILE INFORMATION IN A DATA WAREHOUSE

CROSS REFERENCE TO RELATED APPLICATIONS

This application is related to the following co-pending and commonly-assigned patent applications, which are incorporated by reference herein:

application Ser. No. 09/990,539, entitled "SYSTEM AND METHOD FOR CAPTURING AND STORING INFORMATION CONCERNING WEB VISITOR BROWSING ACTIVITIES IN A DATA WAREHOUSE"; filed on Nov. 16, 2001 by Scott D. Carty, Sylvie F. Haddad and Tucker Smith;

application Ser. No. 09/990,411, entitled "SYSTEM AND METHOD FOR IMPLEMENTING PRIVACY PREFERENCES AND RULES WITHIN AN E-BUSINESS DATA WAREHOUSE"; filed on Nov. 16, 2001 by Sylvie F. Haddad;

application Ser. No. 09/992,571, entitled "SYSTEM AND METHOD FOR CAPTURING AND STORING INFORMATION CONCERNING OPERATIONAL METRICS OF A BUSINESS WEB SERVER AND WEB SITE"; filed on Nov. 16, 2001 by Scott D. Carty, Sylvie F. Haddad, and Tucker Smith;

application Ser. No. 09/990,634, entitled "SYSTEM AND METHOD FOR CAPTURING AND STORING INFORMATION CONCERNING ON-LINE ADVERTISING CAMPAIGNS, PROMOTIONS, AND ADVERTISEMENTS OF AN E-BUSINESS RETAILER"; filed on Nov. 16, 2001 by Scott D. Carty and Tucker Smith;

application Ser. No. 09/990,902, entitled "SYSTEM AND METHOD FOR CAPTURING AND STORING OPERATIONAL DATA CONCERNING AN INTERNET SERVICE PROVIDER'S (ISP) OPERATIONAL ENVIRONMENT AND CUSTOMER WEB BROWSING HABITS"; filed on Nov. 16, 2001 by Scott D. Carty and Tucker Smith.

FIELD OF THE INVENTION

The present invention relates generally to customer relationship management, and more particularly, to systems and methods for capturing and storing detailed business web site visitor profile information for use within an E-Business customer relationship management system. Still more particularly, the present invention is related to a logical data model for storing and organizing web site visitor profile information within an E-Business customer relationship management system.

BACKGROUND OF THE INVENTION

As the World Wide Web evolves into an increasingly dynamic channel for marketing and commerce, web sites are becoming mission-critical components of overall business strategies. Sophisticated businesses no longer view the web as a venue of relatively anonymous transactions, but as a crucial point of contact between the business and its customers—a place where lasting customer relationships can be forged and maintained. Businesses realize that, at each point of customer contact, significant amounts of data are being gathered and stored. The data from these disparate systems needs to be sorted, merged and coalesced into meaningful business information.

Companies for whom the Internet is a primary, if not the primary, conduit for managing customer relationships have invested heavily in their online businesses. To measure the return on this investment, and make the most of the web-marketing channel, managers need an E-Business Data Warehouse solution that can provide answers to the following types of questions:

Who are our best prospects and why?

Where are our most profitable customers coming from . . . which of our partner refers them to our site?

Which of our banner ad campaigns is driving the most qualified traffic to our site?

Which banner ad is generating the most revenue?

Which banner ad has the best buy versus browse ratio?

Which products are selling best online and why?

How many new or repeat visitors come to our site in a given time period?

What is the percentage and total number of new customers, existing customers, browsers for a given time period?

What is the conversion ratio for all customers coming to the site, by referral, by customer segment?

What is the average number of browse sessions prior to first purchase, second purchase, . . . nth purchase, by customer segment over a given time frame?

Whereas the success of a company's web site was once measured in hits and page views, with the web master as primary audience for reports based on those metrics, the performance and information obtained from the web site is now critical to many members of the organization. To answer questions like the samples above, an E-Business Data Warehouse solution must be able to correlate click stream data with data from other disparate sources and transform it into actionable information available to users throughout the Enterprise.

While understanding online customers is necessary for an E-Business company's success, and extracting business information from web site traffic is imperative, web site complexity is growing exponentially. Today's complex web sites often employ geographically distributed servers and a mix of solutions, e.g., Ad Servers, Application Servers, Profile Servers, Content Management Systems and various Personalization technologies, to offer visitors a richer, more dynamic personal experience in the hope of turning those visitors into loyal customers. In addition, more and more companies are moving traditional business applications to the web and linking back-office systems to their online environments. These complex information architectures linking intranets, extranets and the Internet create vast amounts of raw data. The resulting site complexity, disparate data sources, and data volumes makes accurate and complete customer analysis difficult to impossible for most vendor solutions.

NCR Corporation has developed an E-Business Data Warehouse solution to provide the answers, embedded in this complex E-Business environment, to questions about online customers. NCR Corporation's E-Business Data warehouse solution, referred to herein as the Teradata Solutions for E-Business (TSEB), provides the decision support engine and surrounding technology to turn disparate customer information into knowledge. The ability to easily handle large amounts of data coupled with the ability to integrate data from many sources allows NCR. Corporation to provide the most robust and scalable complete E-Business Data Warehouse Solution available in the industry.

SUMMARY OF THE INVENTION

It is an object of the present invention to provide a system and method for capturing and storing detailed business web site visitor profile information for use within an E-Business customer relationship management system.

It is a further object of the present invention to provide a logical data model that defines the structure for storing and organizing profile data concerning web sit visitors within an E-Business data warehouse solution.

The foregoing objects are accomplished through utilization of a database system for storing profile data related to web site visitors to a web store web site operated by an E-Business retailer. Data is organized within the database system in accordance with a logical data model comprising a plurality of entities and relationships defining the manner in which profile information is stored and organized within the database system.

In the preferred embodiment, the E-Business logical data model includes PROFILE and VISITOR subject areas defining the manner in which web site visitor profile information is stored and organized within a customer relationship management system for an E-Business retailer.

Visitors may include any individuals, households or organizations that are of interest to the E-Business retailer. The profile information collected and organized within the database system in accordance with the logical data model may include information concerning household and organizational affiliations of said visitors; information concerning occupations of said visitors; information concerning income levels of said visitors; information concerning educational levels of said visitors; marital status information about said visitors; gender information about said visitors; ethnicity information about said visitors; residence information about said visitors; and language information about said visitors.

Profile information may further include a customer score associated with each web site visitor, wherein a visitor's customer score is determined from previous behavior of the visitor with the E-Business retailer, and is an indication of the visitor's future behavior with the E-Business retailer.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the Figures of the accompanying drawings, wherein elements having the same reference numeral designations represent like elements throughout and wherein:

FIGS. 7A through 7E illustrate an entity-relationship diagram of the INTERNET SERVICE PROVIDER (ISP) subject area of the logical data model in accordance with the preferred embodiment of the present invention;

FIGS. 8A through 8E illustrate an entity-relationship diagram of the ITEM subject area of the logical data model in accordance with the preferred embodiment of the present invention;

FIGS. 11A through 11F illustrate an entity-relationship diagram of the PRIVACY subject area of the logical data model in accordance with the preferred embodiment of the present invention;

FIGS. 12A through 12G illustrate an entity-relationship diagram of the PROFILE subject area of the logical data model in accordance with the preferred embodiment of the present invention;

BEST MODE FOR CARRYING OUT THE INVENTION

Figure 1:
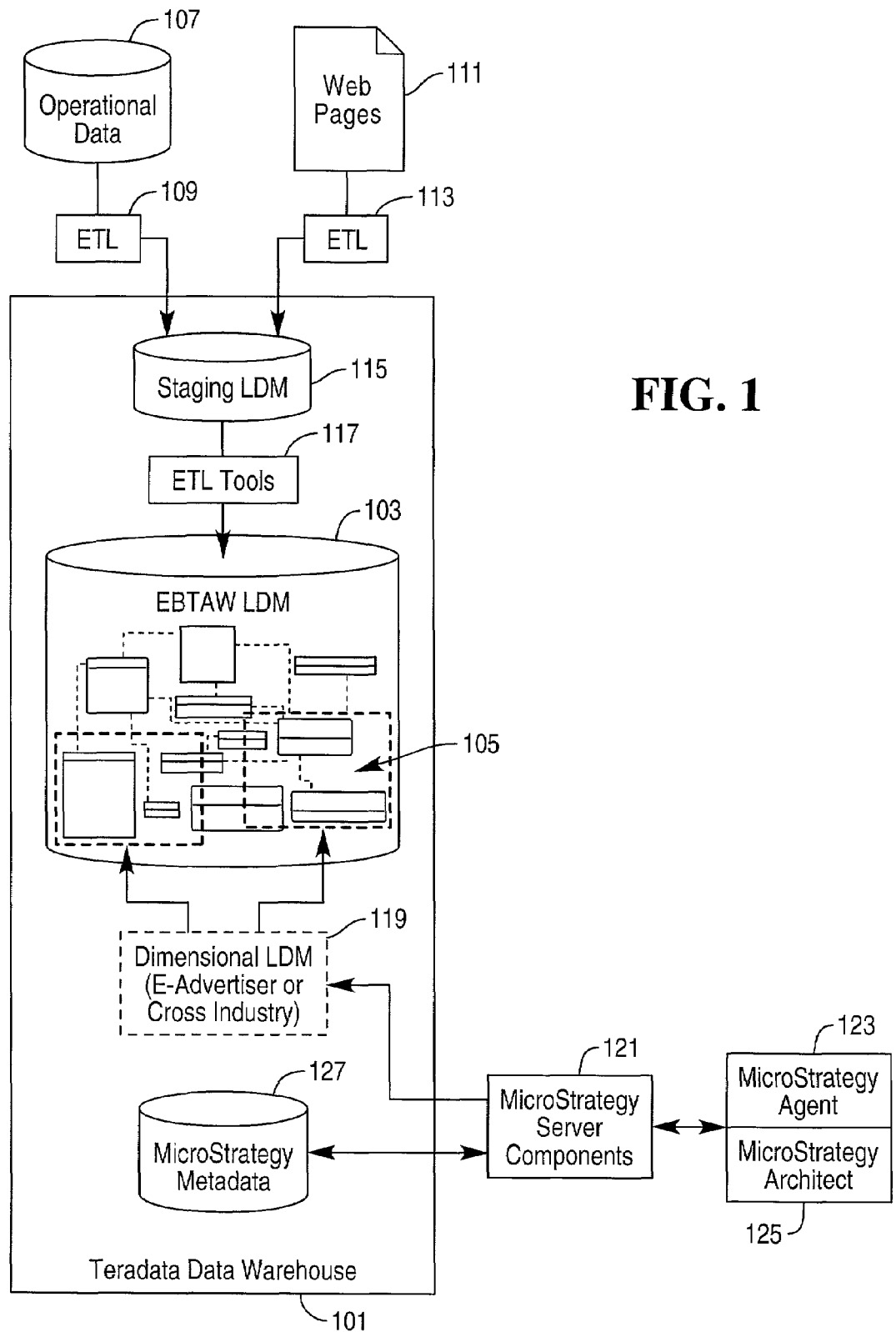
FIG. 1 is a block diagram illustration of an operational architecture of the Teradata Solutions for E-Business in accordance with the present invention.

FIG. 1 illustrates the operational architecture of the Teradata Solutions for E-Business. Components of the architecture shown include external operational databases 107, web logs 111 and extraction, translation and loading (ETL) tools 109 and 113 for extracting data from the data sources 107 and 111, respectively, and preprocessing the extracted data for entry into the data warehouse. The data warehouse 101 includes staging tables 115, ETL tools 117, an E-Business database 103 organized in accordance with an E-Business LDM 105, E-Advertiser and E-Business Dimensional Data Models 119 that support the creation of reports, and an E-Advertiser and E-Business Metadata Database 127 providing report definitions (templates, filters, etc.) and dimensional model-to-data warehouse mapping.

In the operational architecture shown in FIG. 1, Dimensional Data Models 119 and Metadata Database 127 are components of MicroStrategy Incorporated Decision Support System (DSS) software toolset. These two components work together with external MicroStrategy DSS server components 121 and MicroStrategy applications 123 and 125 to create and modify E-Business and web site reports.

Operational data 107 and web logs 111 are loaded into the staging tables on a regular basis, using extraction, transformation, and loading (ETL) tools 109 and 113, respectively. The data is then transferred from the staging tables 115 to the TSEB LDM physical database 103 using ETL tools 117. The MicroStrategy DSS tools, used to analyze the data in the TSEB, require a star schema database to create multidimensional reports. To create this schema, a dimensional LDM 119 is defined using views and tables in the TSEB physical database.

The operational data, i.e. filters, templates and reports, for MicroStrategy is contained in the metadata database 127. This database is created using a MicroStrategy SQL Script, and populated with project information via MicroStrategy Architect 125 and Agent 123. When one of the MicroStrategy applications performs a function that accesses the dimensional LDM, the appropriate information is extracted from the metadata database.

Figure 2:
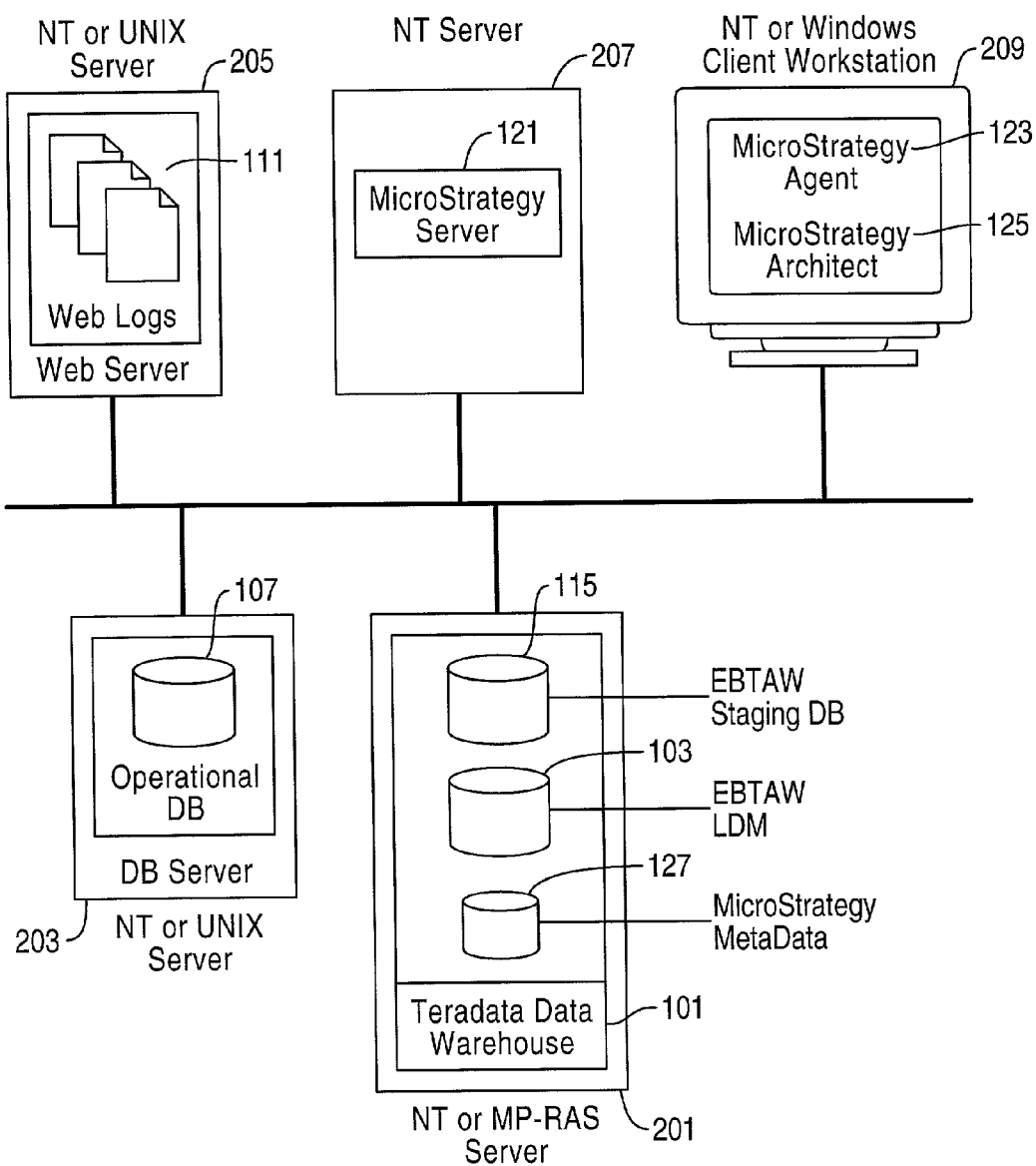
FIG. 2 is a high level illustration of a system architecture of the Teradata Solutions for E-Business in accordance with the present invention.

FIG. 2 illustrates a system architecture for the Teradata Solutions for E-Business. The main components of the TSEB solution are:

Teradata warehouse running on an NCR UNIX SVR4 MP-RAS or a Windows NT server 201; and Analysis and data mining applications running on a separate Windows NT server 207.

The TSEB configuration should be implemented as a two-tier (minimum) or three-tier (preferable for databases more than 3 GB) architecture. The Teradata data warehouse 101, for security and performance, should run on a remote server 201 and the other components run on separate servers. Other components may include an NT or UNIX server 203 for housing operational database 107, a web server 205 for housing web logs 111, and an NT server 207 and NT or Windows client workstation 209 supporting MicroStrategy server components 121 and applications 123 and 125.

The source of the data that will be stored in the data warehouse depends upon the type of business for which the warehouse is being implemented. At a retail site, customer data will come from the business' operational database, web interaction data will come from the business's web logs, and transactional and product data will come from the business' commerce database. For an ISP support business (such as an E-Advertiser), customer data will come from registration and purchase information. Web data will come from web logs gathered from many sites, and transactional data will come from many businesses.

Logical Data Model Design Basics

A logical data model (LDM) is an abstract construct that is physically realized in the database or data warehouse. The data model provides an architecture for the information that will be included in a data warehouse. The database provides the physical realization of that architecture in a form that can be efficiently maintained and used. There may well be some differences between the logical data model and the final database design. The database may include some tables (summary tables, etc.) or columns that have no direct correlation in the logical data model. Elements in the logical model may be grouped differently in the physical database.

A logical data model is organized by Subject Areas, each comprised of numerous Entities, Attributes and Relationships. The data model hierarchy includes one or more Subject Areas. Each Subject Area includes one or more Entities or Tables, each having Attributes and Relationships. Each Attribute describes a fact about an Entity. Relationships between two or more Entities are further defined by Cardinality. The Relationships define which entities are connected to other entities and the cardinality of the relationships. Each of these elements will be described in greater detail below.

Subject Area

A subject area is a subset of objects taken from the universe of data objects for a particular line of business or industry that focus on a particular Business Process. Typically, a subject area is created to help manage large data architectures that may encompass multiple business processes or business subjects. This is the highest-level data concept within a conceptual entity/relationship (E/R) model. Working with subject areas is especially useful when designing and maintaining a large or complex data model. Dividing the enterprise into several distinct subject areas allows different groups within an organization to concentrate on the processes and functions pertinent to their business area.

Entity

An Entity represents a person, place, thing, concept, or event (e.g. PARTY, ACCOUNT, INVOICE, etc.). It represent something for which the business has the means and the will to collect and store data. An Entity must have distinguishable occurrences, e.g., one must be able to uniquely identify each occurrence of an entity with a primary key (e.g. Party Identifier, Account Identifier, Invoice Number, etch). An Entity is typically named with a unique singular noun or noun phrase (e.g., PARTY, BILLING STATEMENT, etc.) that describes one occurrence of the Entity and cannot be used for any other Entity. It should be exclusive of every other Entity in the database. An Entity cannot appear more than once in the conceptual entity/relationship (E/R) model. Each Entity may have relationships to other Entities residing in its own Subject Area or in other Subject Areas.

Attribute

An Attribute is a data fact about an Entity or Relationship. It is a logical (not physical) construct. It is data in its atomic form. In other words, it is the lowest level of information that still has business meaning without further decomposition. An example would be FIRST NAME, or LAST NAME. An example of an invalid attribute would be PERSON NAME if it includes both the first and last names, as this could be further decomposed into the separate, definable (first name, last name) data facts.

Relationship

A Relationship is an association that links occurrences of one or more Entities. A Relationship must connect at least one Entity. If only one Entity is connected, the Relationship is said to be Recursive. A Relationship is described by a noun or passive verb or verb phrase that describes the action taken in the Relationship. A Relationship represent a static state of being between the occurrences of the Entities it connects. Relationships are not intended to represent processes or data flows. They cannot be linked to another Relationships. They may optionally represent future, present, and/or past relatedness. The time frame must be explicitly defined in the data definition. Relationships may contain attributes. In a normalized model, a Relationship containing Attributes will result in the creation of an Entity.

Cardinality

In order for a data model to be considered accurate, it must contain both the maximum and minimum number of Entity occurrences expected. This is controlled by rules of cardinality, which describes a relationship between two Entities based on how many occurrences of one Entity type may exist relative to the occurrence of the other Entity. Typically, it is a ratio, commonly depicted as a one-to-one (1:1); one-to-many (1:N); and many-to-many (M:N) relationship.

The maximum cardinality may be an infinite number or a fixed number but never zero. The minimum cardinality may be zero, or some other positive number, but it must be less than or equal to the maximum cardinality for the same relationship.

The logical data model for the E-Business will now be described in more detail. The logical data model uses IDEF1X modeling conventions, as shown in Table 1.

TABLE 1

Entity Conventions

| Convention | Definition |
|---|---|
| ENTITY1<br>Entity1_PK | Independent entity. An entity is depicted as a box, with its name above the box in singular, uppercase form. Square-boxed entities are independent. They rely on no other entity for their identification. Primary keys are attributes that uniquely identify the entity. Primary keys are shown at the top of the box, separated from other listed attributes by a horizontal line. |
| ENTITY2<br>Entity1_PK (FK)<br>Entity2_PK | Dependent entity. Round-cornered entities are dependent on one or more entities for their identification. (FK) following the primary key attribute indicates a foreign key - an attribute in the entity that is the primary key in another, closely related entity. |
| ENTITY2<br>Entity2_PK<br>Entity1_PK (FK) | An independent entity may also include a foreign key as a "non-primary key foreign key". A non-primary key foreign key is shown below the horizontal line separating primary key attributes from other entity atributes. |

Relationship and cardinality conventions are shown in Table 2.

TABLE 2

Relationship/Cardinality Conventions

| Convention | Definition |
|---|---|
| 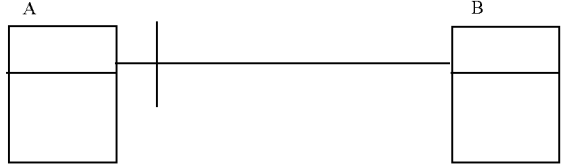 | A single line at the end of a relationship link means that a single record entity B is related to only one record in entity A. |
| 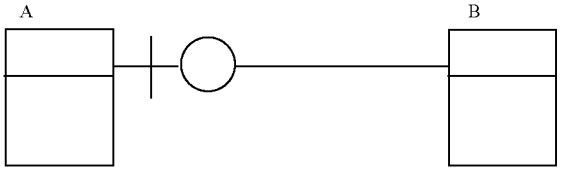 | A circle indicates that the presence of a linked record in entity A is optional. |

TABLE 2-continued

Relationship/Cardinality Conventions

| Convention | Definition |
|---|---|
| 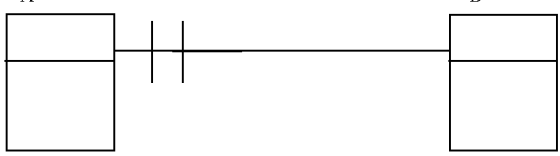 A  B | A double line indicates that the presence of a linked record in entity A is mandatory. |
| 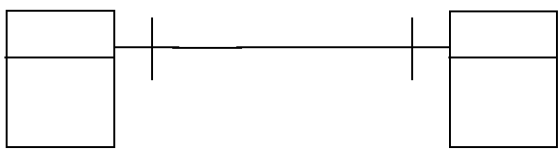 A  B | One-to-one relationship. |
| 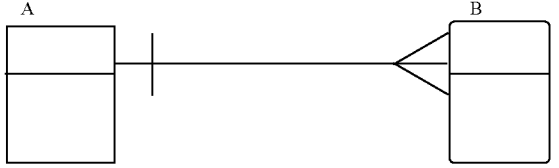 A  B | One-to-many relationship. The crow's foot symbol means that more than one instance of an entity is associated with another entity. |
|  A  B | One-to-one-or-more relationship. A crossbar with a crow's foot symbol means there is at least one instance of an entity associated with the other entity. |
| 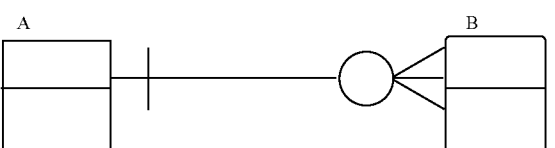 A  B | One-to-zero-one-or-more relationship. A circle with a crow's feet symbol means there may be zero, one, or many instances of the entity associated with the other entity. |
| 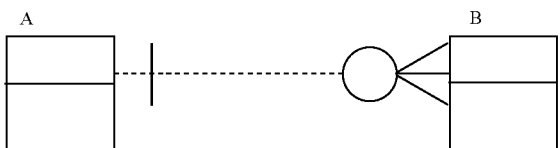 A  B | A dotted relationship line indicates that the identity of entity B is not linked to entity A. |

E-Business Logical Data Model

The E-Business Logical Data Model is a large data model composed of a large number of tables. To effectively view and understand the data model, the data tables have been logically organized into smaller groups called subject areas. Each subject area is comprised of a set of tables that contain information relevant to a particular entity. In addition, the subject areas address particular business questions.

Figure 3:
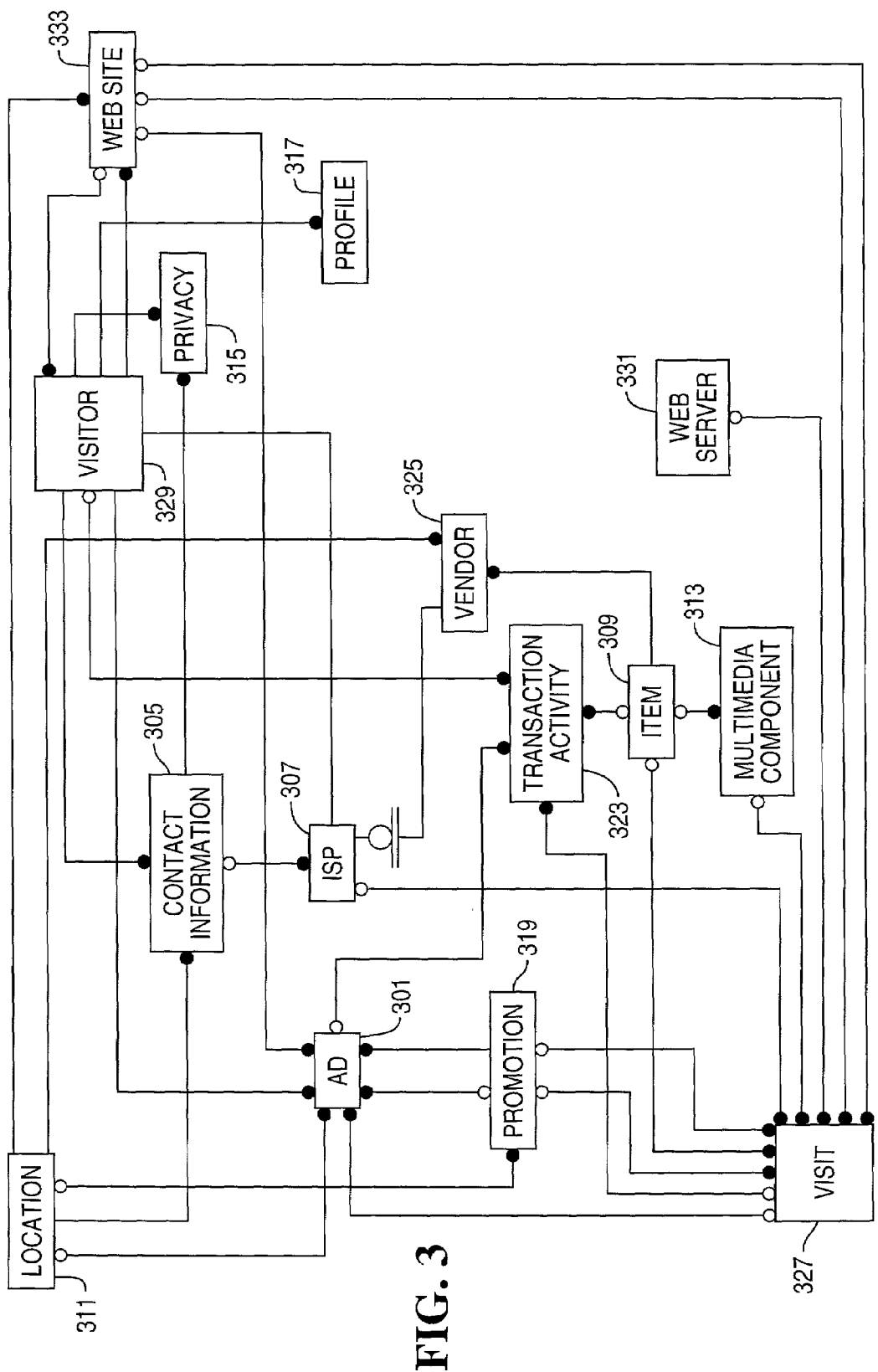
FIG. 3 is a subject area model of an E-Business industry logical data model, illustrating the subject areas included within the LDM, in accordance with the preferred embodiment of the present invention.

FIG. 3 is a subject area model of the E-Business logical data model, illustrating the subject areas included within the LDM. The Subject Area Model is a one-page overview that defines, at a high level, the scope and data requirements of the solution. Each subject area within the logical data model will be illustrated in the Figures and described in greater detail below.

The subject area model shown in FIG. 3 illustrates some of the major relationships between subject areas. The boxes represent the subject areas. Each line represents a relationship between subject areas. The solid circle at the end of a relationship line represents the target of a 'many' relationship. An open circle at the end of a relationship line indicates that the relationship is optional.

The E-Business LDM is organized into seventeen major subject areas titled: AD, CALENDAR DATE, CONTACT INFORMATION, ISP, ITEM, LOCATION, MULTIMEDIA COMPONENT, PRIVACY, PROFILE, PROMOTION, TIME, TRANSACTION ACTIVITY, VENDOR, VISIT, VISITOR, WEB SERVER, WEB SITE. All but the CALANDER DATE and TIME subject areas, with relationships to all of the remaining subject areas, are shown in FIG. 3. All of the subject areas are illustrated detail in FIGS. 4 through 20, discussed below.

A brief description of each subject area follows:

AD (301)—Determines the effectiveness of ad campaigns by collecting information on the cost of ads by type, and comparing this information with the number of times an exposure to the ad delivered a customer to a particular item or site.

CALENDAR DATE (not shown)—Information is tracked by date and season. Holidays are tracked by country.

CONTACT INFORMATION (305)—Stores contact information for customers & organizations, including mailing addresses, email addresses, and telephone numbers.

ISP (307)—The ISP component view covers all aspects of Internet Service Provider activity.

ITEM (309)—Information is tracked on each piece of merchandise or service. Included would be a description, how the item was classified, price, cost, the number in inventory, etc.

LOCATION (311)—Information is stored on all physical and virtual sites owned or leased by the retailer to support the sale of goods, distribution, and storage. Would include kiosks, warehouses, offices, as well as internet sites.

MULTIMEDIA COMPONENT (313)—Stores multimedia elements that can be use to construct a web page, such as ads, catalogues, etc.

PRIVACY (315)—Stores information about privacy permissions from individuals, households and organizations of interest to the enterprise.

PROFILE (317)—Stores information concerning customer segments of interest to the enterprise. This information is typically purchased from a third party.

PROMOTION (319)—Contains information concerning promotions, which are defined as marketing efforts, which are different from normal practice and designed for a specific purpose. Information is stored on the various components of the promotion, including the items and ads included, the type of ad, and the market segments targeted.

TIME (not shown)—Records the time in a given day by hours, minutes and seconds.

TRANSACTION ACTIVITY (323)—Stores information concerning a customer's interaction with the company involving the sale or return of an item and the price and discounts associated with that item. It maps customers to entries in the Address Area, the item(s) of interest, and the associate dealing with the customer.

VENDOR (325)—Stores information about parties from which the company purchases goods and services. This would include information concerning purchase orders, returns, and items shipped directly to the company or drop shipped to a customer.

VISIT (327)—Stores information concerning a customer's history at a virtual store's web site. Included would be information about the ads that triggered the visit, the web pages browsed, and the items of interest to the consumer.

VISITOR (329)—Captures information about the users involved in web transactions and/or interactions. This area maintains information about customer's payment accounts, and household and organizational affiliations, and it maps customers to entries in the Profile Subject Area.

WEB SERVER (331)—Provides summary information, operational metrics and errors about the physical server devices servicing a given web visit by a customer.

WEB SITE (333)—Stores information about the company's web sites including page components, page generation, and web page type.

The E-Business Logical Data Model is intended to be generic so that a wide range of business situations is encompassed. In general, the model reflects major business objects in a retail electronic store, such as products, people, service requests, and market baskets. There are also a variety of subject areas relating to customer sessions that involve browsing, purchasing, or interacting with employees. All subject area information need not be present for the model to be useful. For many types of businesses, all of the subject areas in the model will not apply.

The tables in a subject area represent the logical subset of tables in the data model that provide all the information for the subject area. Note how that a specific table may appear in multiple subject areas. For example, the CONTACT INFO table appears in the CONTACT INFORMATION and PRIVACY subject areas. This means that the information in the CONTACT INFO table is relevant to each of those subject areas; each subject area refers to the same physical item table.

Each Subject area and its Entities will now be described in detail.

AD

Figure 4A:
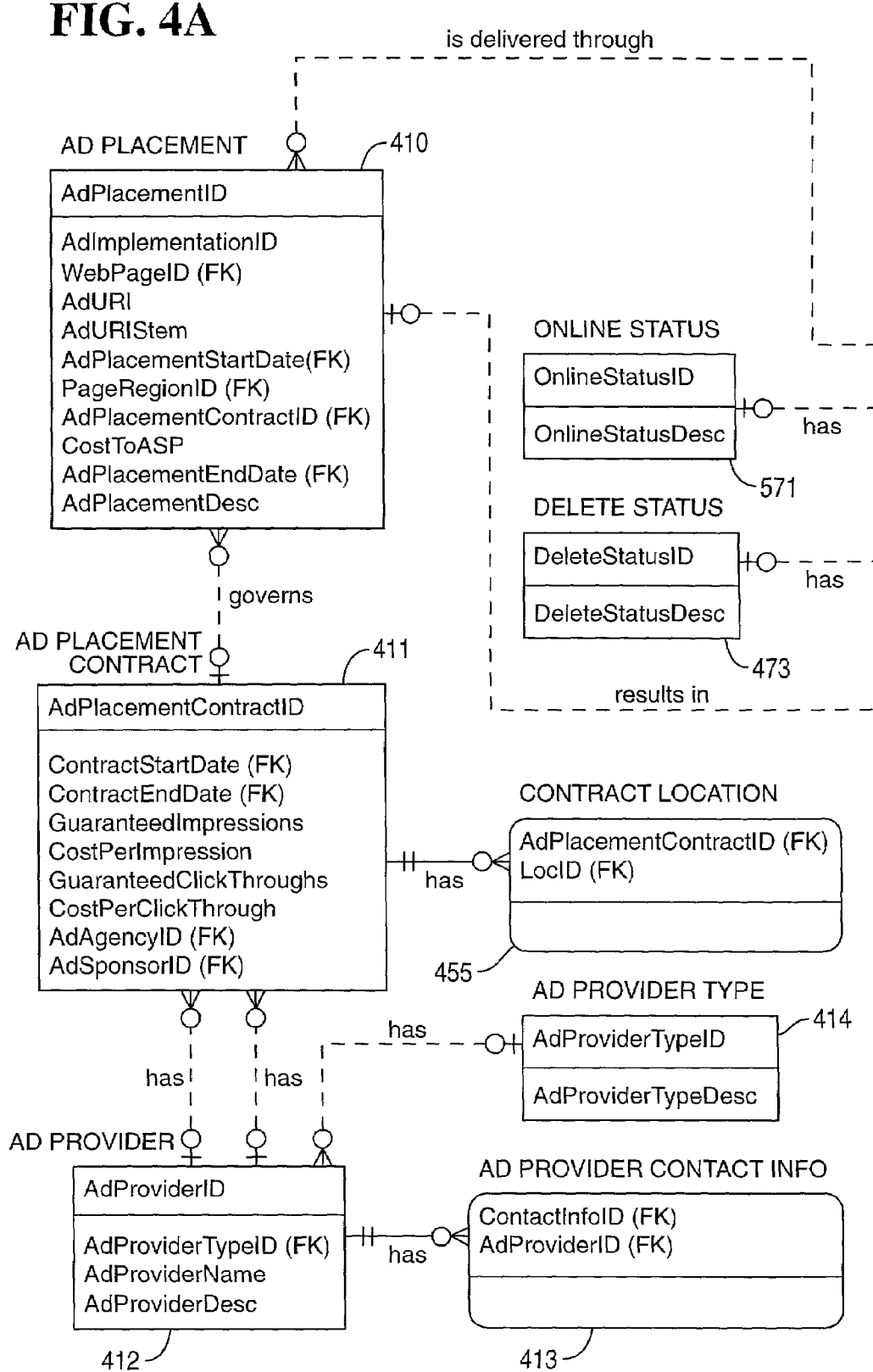
FIGS. 4A and 4B illustrate an entity-relationship diagram of the AD subject area of the logical data model in accordance with the preferred embodiment of the present invention.
Figure 4B:
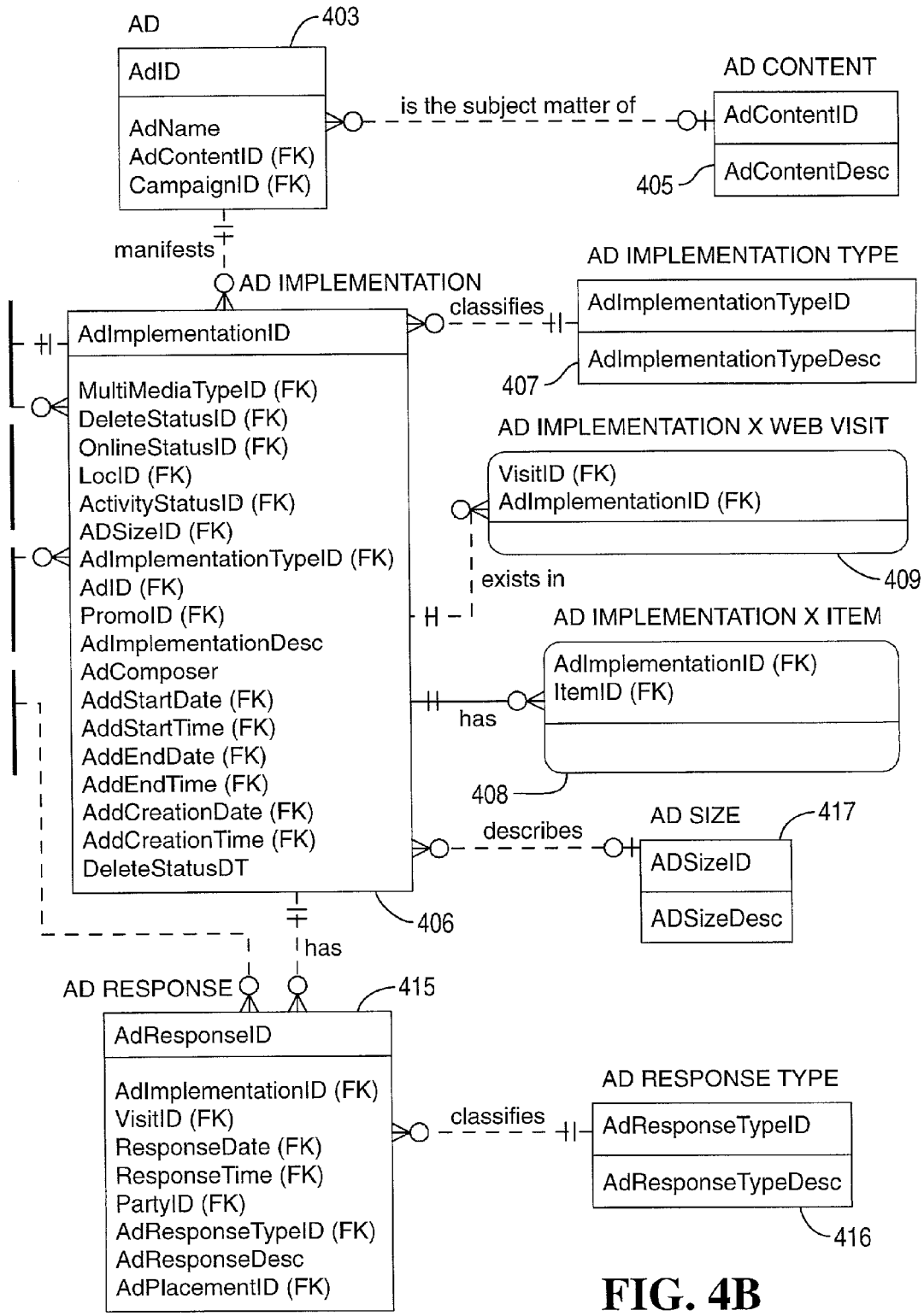

The AD Subject Area, shown in the diagram of FIGS. 4A and 4B, is used to determine the effectiveness of ad campaigns by collecting information on the cost of ads by type, and comparing this information with the number of times an exposure to the ad delivered a customer to a particular item or site.

The entities of the AD Subject Area are defined as follows:

AD (403) A marketing message aimed at a segment of consumers. Usually mentions specific ITEMs. Can be placed in magazines, on web pages, television, etc.

AD CONTENT (405) This entity represents the subject matter contained in an AD.

AD IMPLEMENTATION (406) An instantiation of the marketing message represented by the parent AD entity.

AD IMPLEMENTATION TYPE (407) This entity represents the type of the AD IMPLEMENTATION. Types include WEB AD, BANNER AD, EMAIL AD, HTML TEXT AD, PRINT AD, TV AD.

AD IMPLEMENTATION X ITEM (408) This table associates items with an ad implementation.

AD IMPLEMENTATION X WEB VISIT (409) This entity represents the relationship between an AD IMPLEMENTATION and a WEB VISIT providing the information for determining which AD initiated the WEB VISIT. This represents the Referral to the site.

AD PLACEMENT (410) The entity represents a particular instance of an AD IMPLEMENTATION when an ad is actually displayed to a consumer on a web page.

AD PLACEMENT CONTRACT (411) The entity represents the agreement made between the ad service provider and the advertiser that states the time period for the contract, the number of impressions and click-throughs guaranteed to the advertisers and the cost for each impression and click-through.

AD PROVIDER (412) This entity represents the business that works with the advertisers and publishers to actually get the advertisements and place them on the publishing web sites. This entity represents the company that provides the service for placing Ads.

AD PROVIDER CONTACT INFO (413) Contains information regarding the address of an Ad Provider.

AD PROVIDER TYPE (414) Information regarding the type of Ad provider.

AD RESPONSE (415) This entity represents an action taken in response to an AD PLACEMENT.

AD RESPONSE TYPE (416) This entity represents the type of an AD RESPONSE which can be either IMPRESSION, CLICKTHROUGH, or CONVERSION.

AD SIZE (417) This entity represents the size of a BANNER AD by the number of pixels. Examples of AD SIZES include Full Banner (468×60) and Vertical Banner (120×240).

CONTRACT LOCATION (455) The stores/Web Sites that are covered by this contract.

DELETE STATUS (473) Customer Domain: Indicates if row is deleted or active.

ONLINE STATUS (571) Customer Domain: Whether the ad is online or offline.

CALENDAR DATE

Figure 5A:
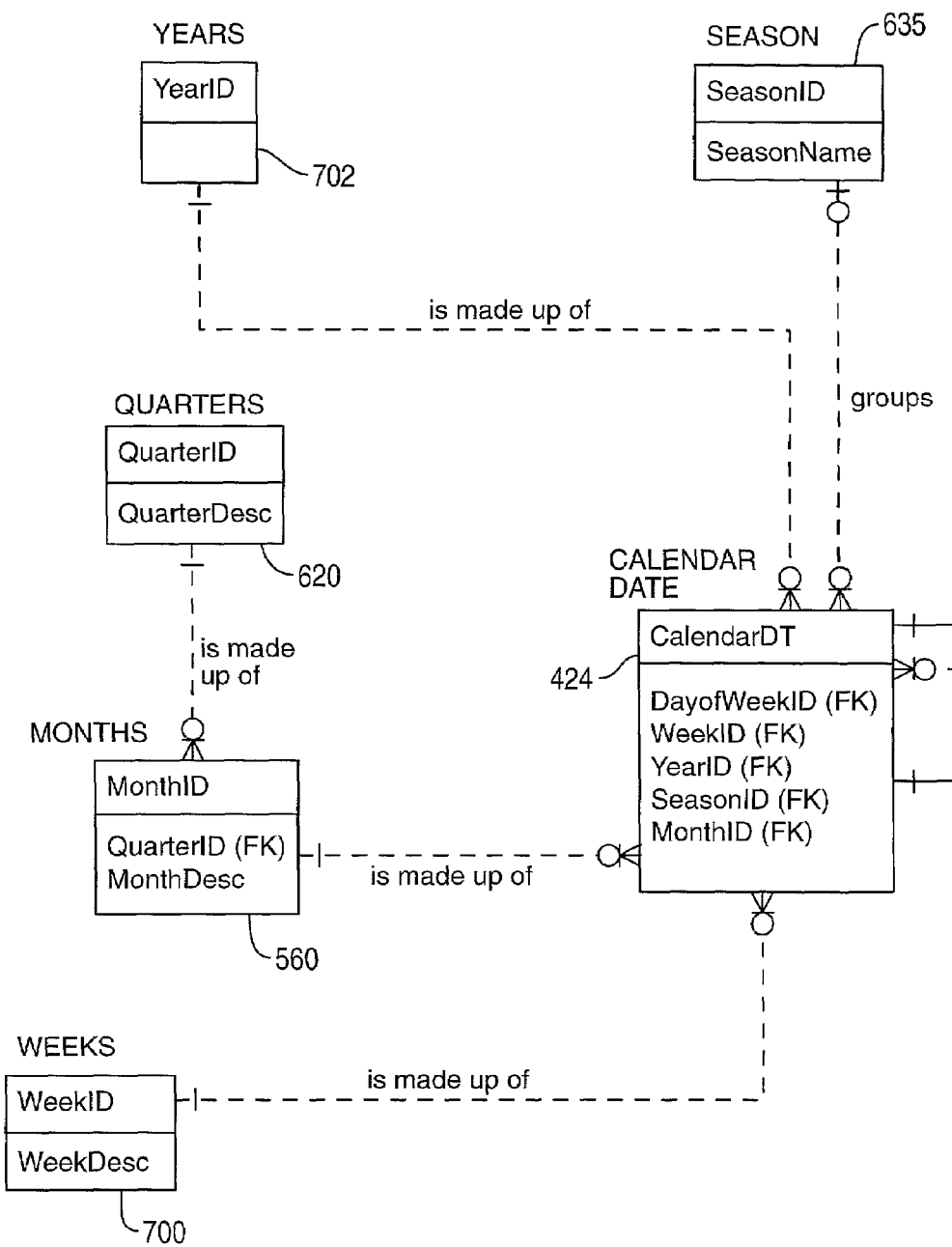
FIGS. 5A and 5B illustrate an entity-relationship diagram of the CALANDER DATE subject area of the logical data model in accordance with the preferred embodiment of the present invention.
Figure 5B:
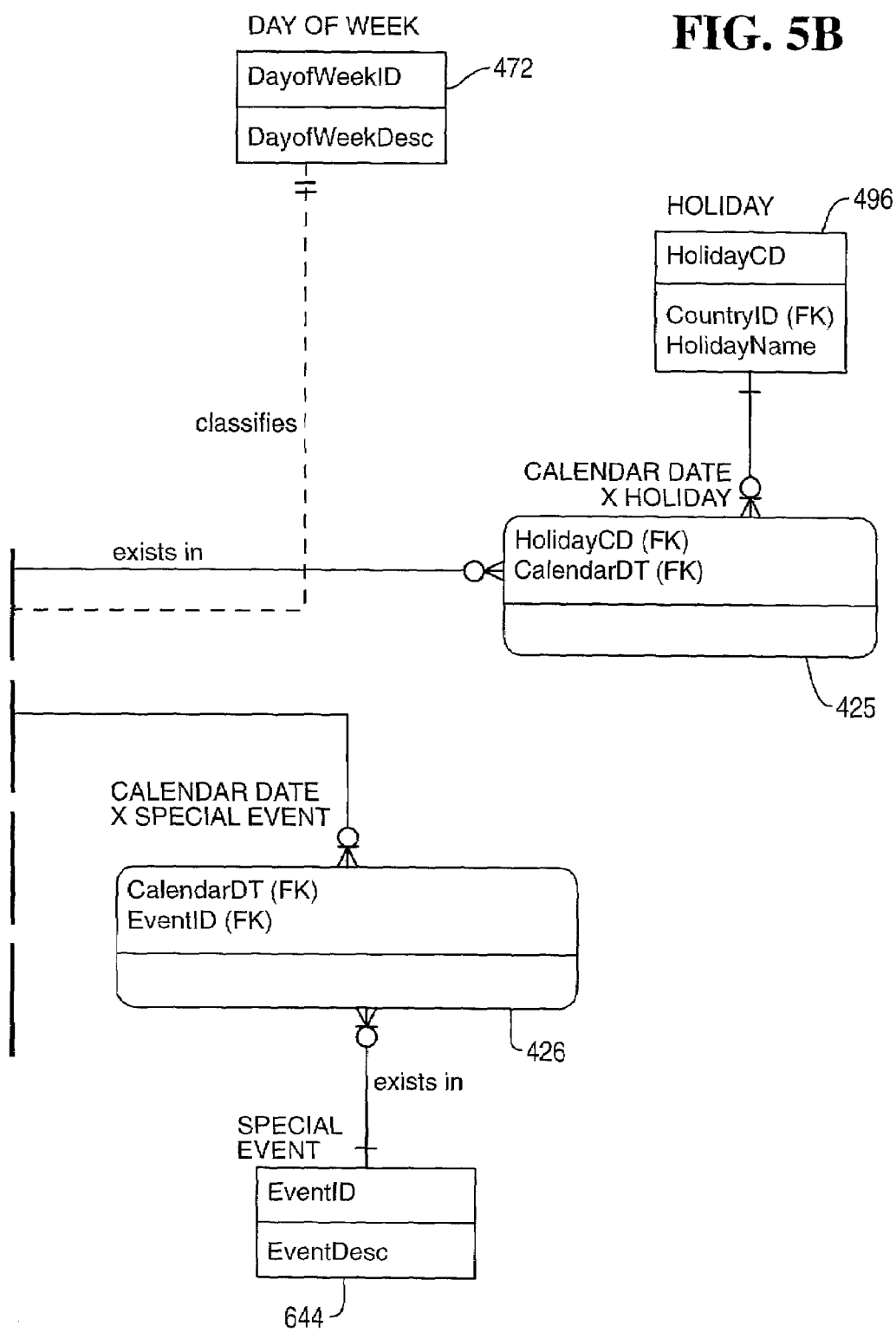

FIGS. 5A and 5B illustrate an entity-relationship diagram of the CALANDER DATE subject area of the E-Business logical data model. The CALENDAR DATE Subject Area contains information tracked by date and season. Holidays are tracked by country.

The entities of the CALANDER DATE Subject Area are defined as follows:

CALENDAR DATE (424) Allows for the grouping of Gregorian dates by any period defined by the enterprise. The attributes shown here represent possible rollup periods.

CALENDAR DATE X HOLIDAY (425) This entity serves as a relationship table between CALENDAR DATE and HOLIDAY to represent the many-to-many relationship.

CALENDAR DATE X SPECIAL EVENT (426) This entity represents the relationship table between CALENDAR DATE and SPECIAL EVENT to represent the many-to-many relationship.

DAY OF WEEK (472) This entity represents the names of the days in a week (Sunday, Monday . . . ).

HOLIDAY (496) A declared non-working day. Differs by Country. Examples include Christmas, New Years Day, Bastille Day, Independence Day, etc.

LAST YEAR DATE (547) Provides a specific reference to a previous years date to the current date.

MONTH TO DATE (559) Provides a specific reference for a month to the current date.

MONTHS (560) This entity represents the months of the year. The id column uniquely identifies a month by including the number of the month in the year (1–12) and the year it belongs in. Example: 011999. The description column is the actual name of the month.

QUARTERS (620) This entity represents the quarters of a year. A QUARTER is uniquely identified by a quarter number (1–4) and the year. Example: 041999.

SEASON (635) A contiguous period of time of interest to the enterprise. Can be climate and/or marketing based. Examples include Summer, 'Christmas season', etc.

SPECIAL EVENT (644) This entity represents a day or group of days that a certain notable event occurred on. Examples include Super Bowl Sunday and Hurricane Hugo.

WEEKS (700) This entity represents the weeks of a year. The unique identifier for a WEEK consists of the week number (1–52) combined with the year in which the week occurs. Example: 521999.

YEAR TO DATE (701) Provides a reference of a specific date to the current date.

YEARS (702) The entity represents a calendar year.

CONTACT INFORMATION

Figure 6A:
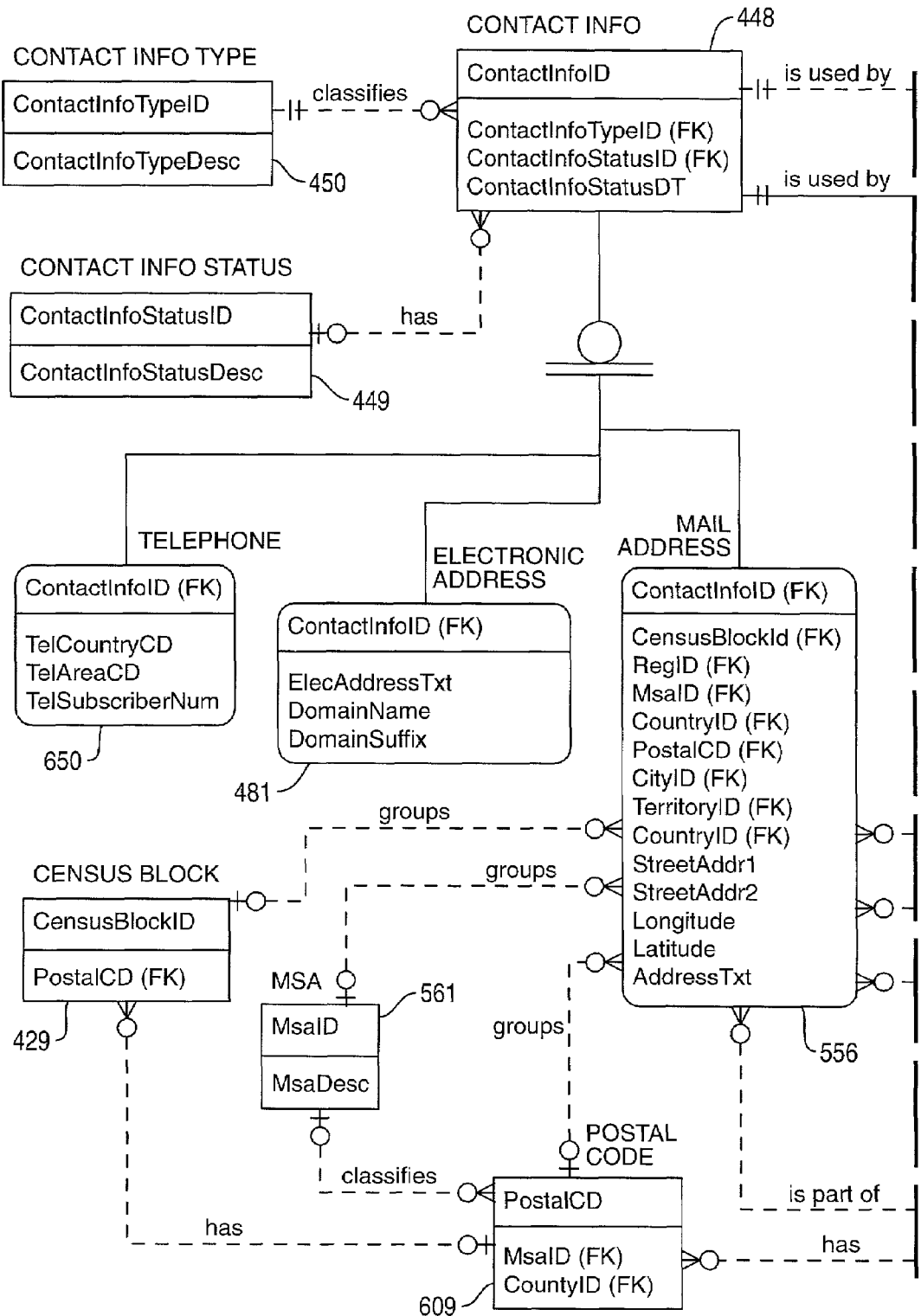
FIGS. 6A and 6B illustrate an entity-relationship diagram of the CONTACT INFORMATION subject area of the logical data model in accordance with the preferred embodiment of the present invention.
Figure 6B:
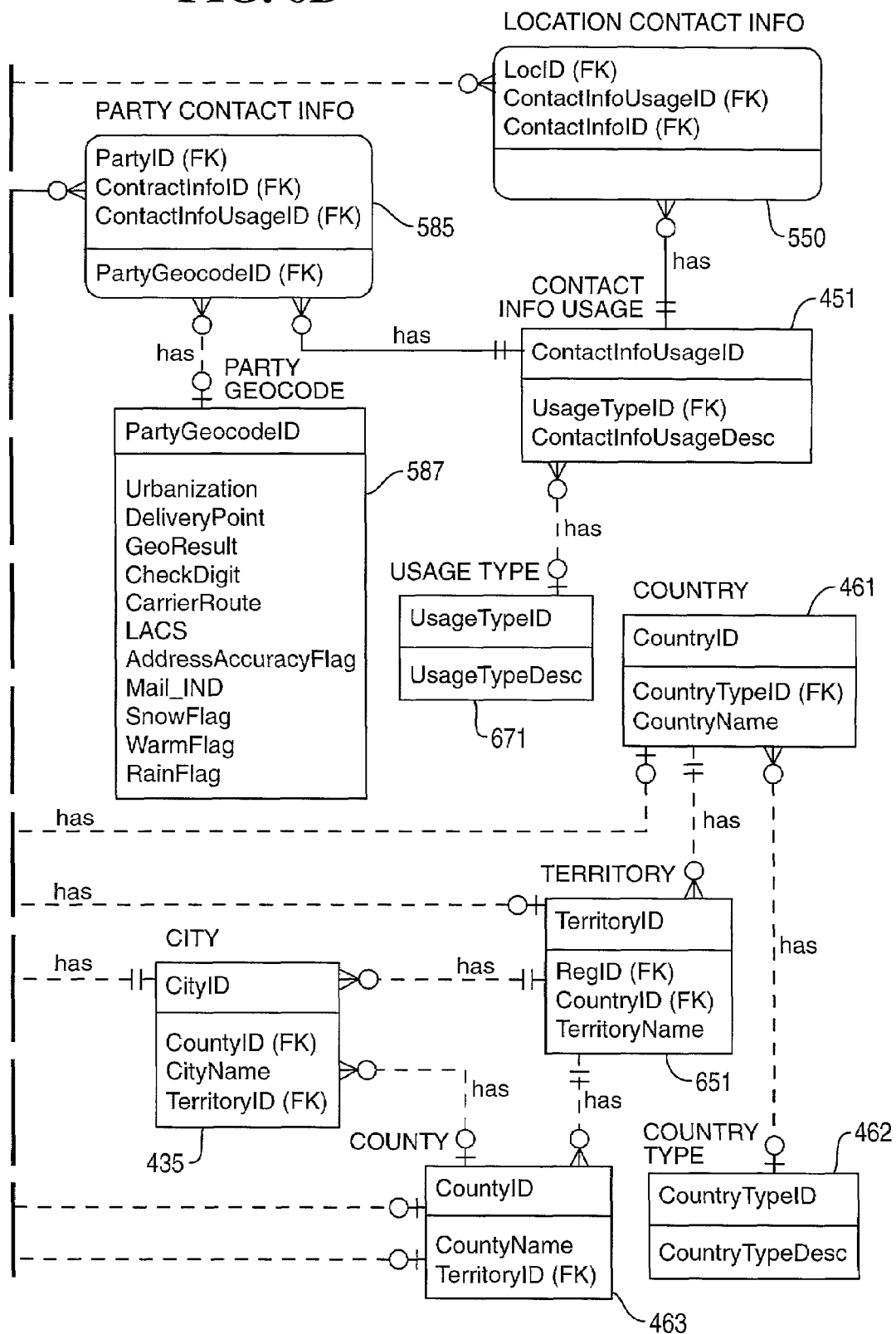
Figure 7A:
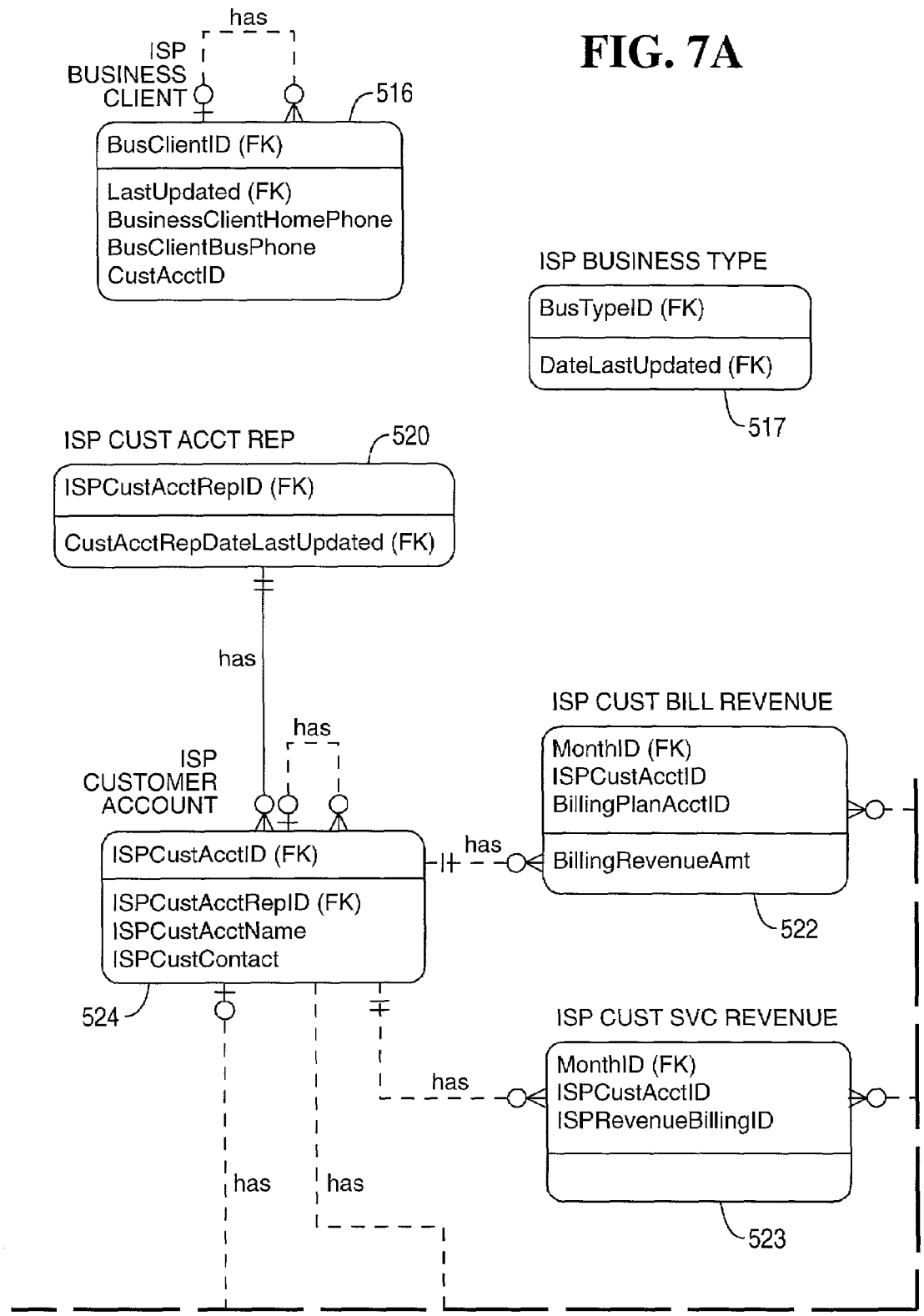
Figure 7B:
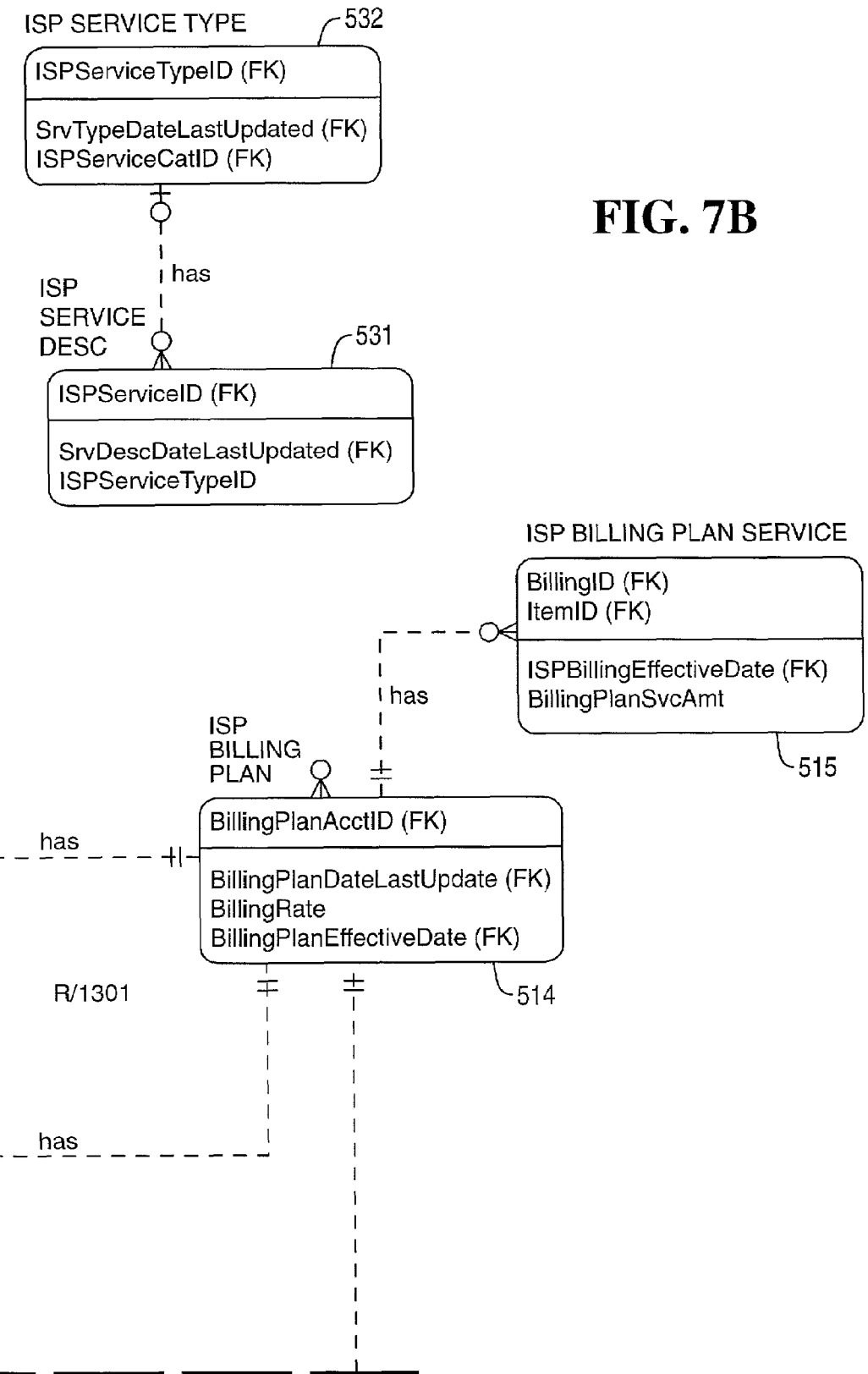
Figure 7D:
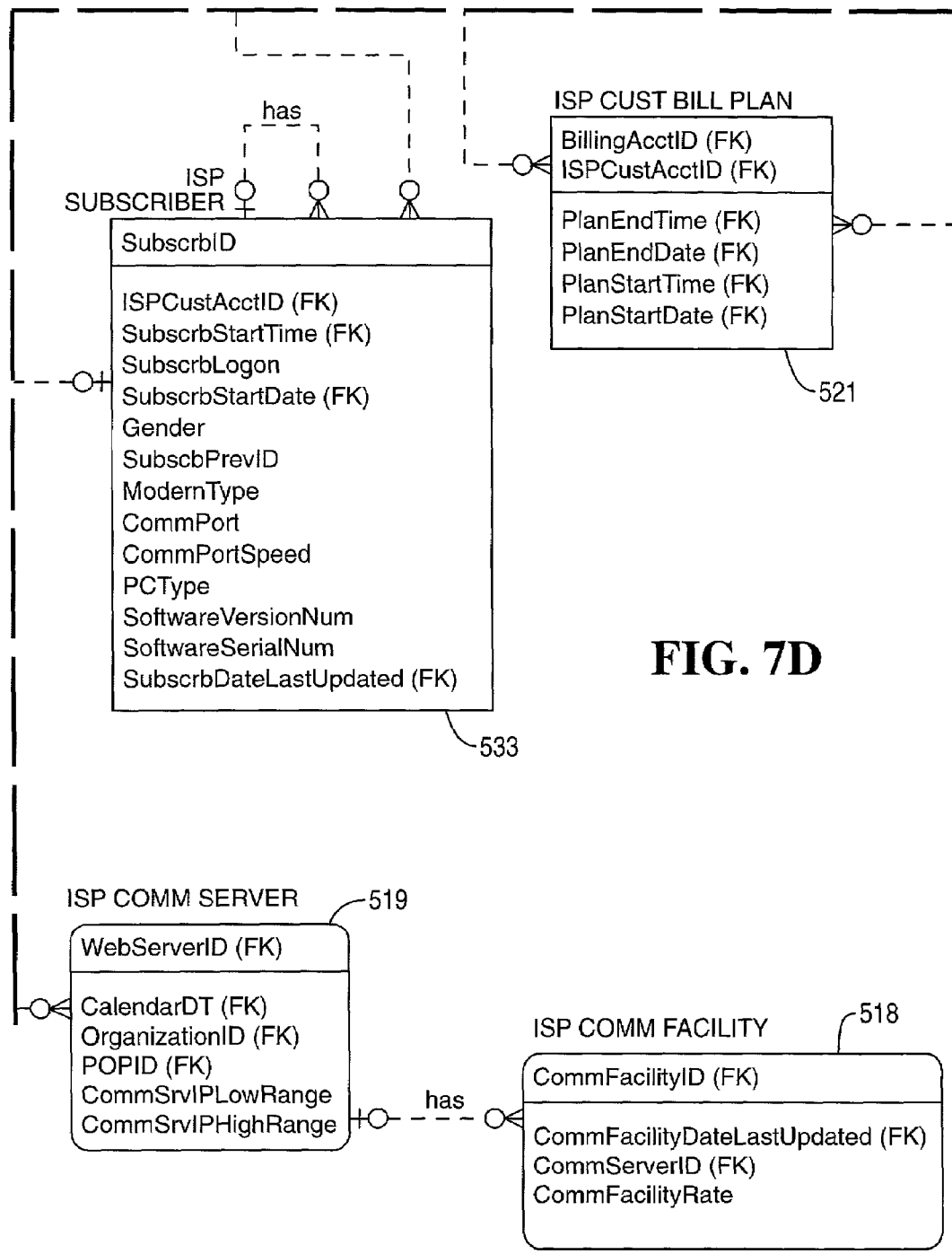

The CONTACT INFORMATION Subject Area, illustrated in the entity-relationship diagram of FIGS. 6A and 6B, stores contact information for customers & organizations, including mailing addresses, email addresses, and telephone numbers.

The entities of the CONTACT INFORMATION Subject Area are defined as follows:

CENSUS BLOCK (429) A grouping of ADDRESSes used by the government for census statistics. Usually a subset of POSTAL CODE. The number of three family household in a small geographical area, according to 1998 census data.

CITY (435) A geographical region within a TERRITORY. Can also be a hamlet, village, township, etc. Examples include: Los Angeles, Dijon, etc.

CONTACT INFO (448) A way to communicate with, or contact, PARTYs. It can be MAIL ADDRESS (P.O. Box, or street), ELECTRONIC ADDRESS, or TELEPHONE number.

CONTACT INFO STATUS (449) Indicates whether the address is still valid or not.

CONTACT INFO TYPE (450) Indicates if an ADDRESS is MAIL, ELECTRONIC, or TELEPHONE.

CONTACT INFO USAGE (451) Specifies the usage of an address.

COUNTRY (461) A geographical-political region with sovereign governing.

COUNTRY TYPE (462) Contains information about country types.

COUNTY (463) A geographic region within a TERRITORY. Example: Los Angeles County.

ELECTRONIC ADDRESS (481) A non-physical/virtual ADDRESS. Could be an e-mail, ftp, URL, etc.

LOCATION CONTACT INFO (550) Describes how a specific combination of ADDRESS and LOCATION is used. For example, '123 Main Street' is used by 'Distribution Center 23' as 'Ship To'; '310-555-2342' is used by 'Call Center 46' as 'Customer Service Fax number'.

MAIL ADDRESS (556) An ADDRESS where ITEMs can physically be delivered to. For example: 123 Main Street, P.O. Box 2001, etc.

MSA (561) Metropolitan Statistical Area. Predefined geographic areas for marketing use, center around large metropolitan areas. Such as: Miami MSA, San Francisco MSA, etc.

PARTY CONTACT INFO (585) Describes how a specific combination of ADDRESS and PARTY is used. For example: '123 Main Street' is used by 'Rachel' as 'Ship To'; '310-555-2342' is used by 'John' as 'Fax number'.

PARTY GEOCODE (587) Contains detail contact information for a specific party entity. This table is present to support NCR's Customer Relationship Management (CRM) application.

POSTAL CODE (609) A grouping of MAIL ADDRESSes assigned by the Post Office. Frequently used in marketing analysis and planning. Examples include USA: 90210, Canada: G1s 1C1 U.K.: W1P 7HE.

TELEPHONE (650) Telephone number. Could be voice, data, fax, pager.

TERRITORY (651) A geographic region within a COUNTRY. Can be a State, Province, etc., e.g., California, Quebec, Gauteng, etc.

USAGE TYPE (671) Customer Domain. Details whether the address is used for personal or business.

ISP

FIGS. 7A through 7E illustrate an entity-relationship diagram of the INTERNET SERVICE PROVIDER (ISP) subject area of the logical data model. The ISP component view covers all aspects of Internet Service Provider activity.

The entities of the INTERNET SERVICE PROVIDER Subject Area are defined as follows:

ISP BILLING PLAN (514) ISP Billing plan information.

ISP BILLING PLAN SERVICE (515) Information concerning an ISPs billing services.

ISP BUSINESS CLIENT (516) Captures information concerning an ISP's business customers.

ISP BUSINESS TYPE (517) Provides information regarding the ISPs business interest.

ISP COMM FACILITY (518) Information concerning an ISP's communication facilities.

ISP COMM SERVER (519) Information regarding an ISP's communication servers.

ISP CUST ACCT REP (520) Information regarding the customer account reps for an ISP.

ISP CUST BILL PLAN (521) Information regarding an ISP's customer billing plans.

ISP CUST BILL REVENUE (522) Information regarding ISP's customer revenue from bills.

ISP CUST SVC REVENUE (523) Information regarding an ISPs customer service revenue.

ISP CUSTOMER ACCOUNT (524) This entity represents the accounts held by a customer.

ISP NETW ROUTER (525) ISP network router information.

ISP NETWORK FACILITY (526) Information regarding the physical facility components of an ISP's network.

ISP POP (527) ISP POP information.

ISP POP AREA (528) Information concerning an ISPs POP's areas.

ISP POP REGION (529) Information concerning an ISPs POPs regions.

ISP SERVICE CATEGORY (530) Category of services provided by an ISP.

ISP SERVICE DESC (531) Contains information regarding the types of services that have been provided by an ISP.

ISP SERVICE TYPE (532) Information regarding the types of services provided by an ISP.

ISP SUBSCRIBER (533) This entity represents the subscribers to the ISP.

ISP SUBSCRIBER SESSION (534) Information regarding a customers session.

ITEM

Within the ITEM subject area shown in FIGS. 8A through 8D, information is tracked on each piece of merchandise or service provided by the E-Business company. Included within the subject area tables would be a description of each piece of merchandise or service, how the item was classified, price, cost, the number in inventory, etc.

The entities of the ITEM Subject Area are defined as follows:

BRAND (420) A unique name created by an ORGANIZATION to build customer recognition and affinity for a group of related ITEMs. Some ORGANIZATIONs own many BRANDs, while others build their Corporate name into a BRAND, e.g., Coke, Ruffles, Wonder Bra, Dreamcast, Dockers, etc.

BRAND OWNER ORG (421) The ORGANIZATION that created, owns, and controls a specific BRAND. For example: Nabisco, Victoria's Secret, Pepsi Co., etc.

CHARACTERISTIC (432) Describes a trait of an ITEM, such as Color, Height, Suitable Age rating, etc.

CHARACTERISTIC GROUP (433) A cluster of relater ITEM CHARACTERISTICs. 'Size' could be a CHARACTERISTIC GROUP, with each of the dimensions (height, width, depth) being a separate CHARACTERISTIC.

CHARACTERISTIC VALUE (434) The actual value describing the specific CHARACTERISTIC of a specific ITEM. For example: Color='blue', Suitable Age rating='12 years and older'.

CLASS (436) A subgrouping of like merchandise, usually created along the enterprises reporting hierarchy and associated with a certain grouping of ITEMs and ASSOCIATE (s) managing said ITEMs, e.g., a 'buyer'. A CLASS belongs to exactly one DEPARTMENT and is considered one of the highest levels at which purchasing and sales are planned. CLASS may be a level member of a retail organization's ITEM hierarchy. The actual naming convention for PRODUCT hierarchy may vary across organizations.

DEPARTMENT (474) Represents a broad group of merchandise appealing to a particular CUSTOMER's needs or an administrator's needs. A DEPARTMENT represents one of the highest, if not the highest, PRODUCT hierarchy levels in an organization. The actual naming convention for ITEM hierarchy may vary across organizations. A DEPARTMENT may be end use based, e.g., Women's Hosiery, or may be VENDOR based, e.g., Liz Claiborne Sportswear. The scope of a DEPARTMENT will largely depend on the size of the organization, but might typically cover twenty to thirty manageable categories.

DIVISION (478) Represents an administrative grouping of DEPARTMENTs. DIVISIONs exist to further cluster merchandise into groups for administrative or organizational reporting purposes. A DIVISION often represents the highest ITEM hierarchy level in an organization. The actual naming convention for ITEM hierarchy may vary across organizations.

FRANCHISE (491) A concept with consumer recognition and value. Often used in marketing and tie-in PROMOTIONs For example: Indiana Jones, Batman, Star Wars, Pokemon, etc.

INVENTORY CONTROL (512) A cross-reference of ITEMs to LOCATIONs for the purpose of managing INVENTORY. It specifies the required, re-ordering, and safety levels of stock.

ITEM (535) An ITEM is the lowest level for which inventory and sales records are retained within the STORE. It is analogous to a SKU (Stock Keeping Unit).

ITEM CHARACTERISTIC (536) The actual value describing the specific CHARACTERISTIC of a specific ITEM. An ITEM can have an unlimited number of ITEM CHARACTERISTICs. For example the "Entrapment" Movie DVD has the following ITEM CHARACTERISTICs: Aspect Ration: '1:2.35,' Encoding: 'Anamorphic', Genre: 'Action', Age Rating: '12 and above', etc.

ITEM CONTENT (537) Describes the 'bill of material' of an ITEM that contains other ITEMs. For example the "Indiana Jones Deluxe Pack" contains: I.J Coloring Book, I.J. movie, and I.J. Action Figure.

ITEM COST (538) Cost information of an ITEM keyed by time and LOCATION. The key structure may vary as per enterprise requirements.

ITEM GROUP (539) A cluster of ITEMs grouped together for analytical or merchandising reasons. Can be used for permanent, global, or ad-hoc reasons.

ITEM GROUP XREF (540) Defines which ITEMs are contained in which GROUPs. An ITEM can be in multiple ITEM GROUPs at the same time.

ITEM PRICE (541) Pricing information of an ITEM by LOCATION. The key structure may vary in accordance with enterprise requirements.

LEAD TIME (548) Contains information concerning inventory replenishment for the seasons of the year.

PRODUCT (612) A PRODUCT is a physical type of ITEM (as opposed to a SERVICE). A PRODUCT can be inventoried, and shelved.

PRODUCT INVENTORY (613) Represents history On Hand Stock position for a specific PRODUCT, within a specific LOCATION, for a specific PERIOD.

RELATED ITEM (629) Information concerning the relationship between two items.

SALES PLAN (632) A detailed plan of action of how ITEMs are marketed, sold, and distributed to each STORE.

SCAN CODE (633) A barcode or similar graphic placed upon a PRODUCT and remotely scan-able (usually optically). Can be internally or externally, e.g., UPC, created. Examples include: UPC code, the scan tickets placed upon ITEMs bought in the meat, deli, and bakery departments, etc.

SERVICE (639) A non-physical type of ITEM sold to a customer. Examples include: Installation of a new PC, Carpet cleaning, Repair service, etc.

STORE DEPARTMENT ITEM (646) A Cross reference of the actual ITEMs that are sold in a specific DEPARTMENT of a specific STORE. For example: 'Store 243' sells 'Fuji 100 Sensia Film' in it's 'Photo Department'.

SUBCLASS (648) A level of the ITEM hierarchy description in a retail organization. It is a member of exactly one CLASS. The actual naming convention for PRODUCT hierarchy may vary across organizations.

Figure 8A:
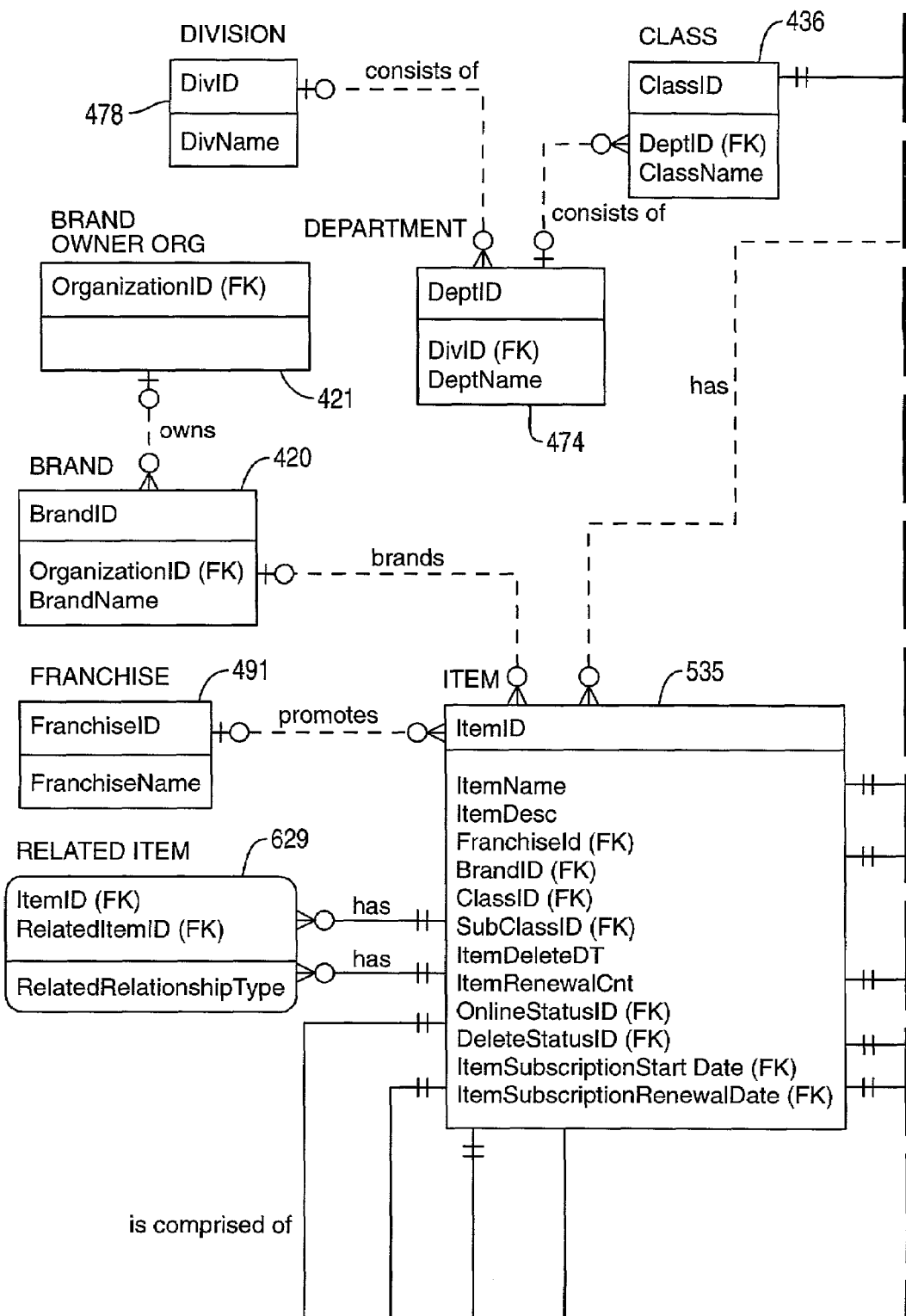
Figure 8B:
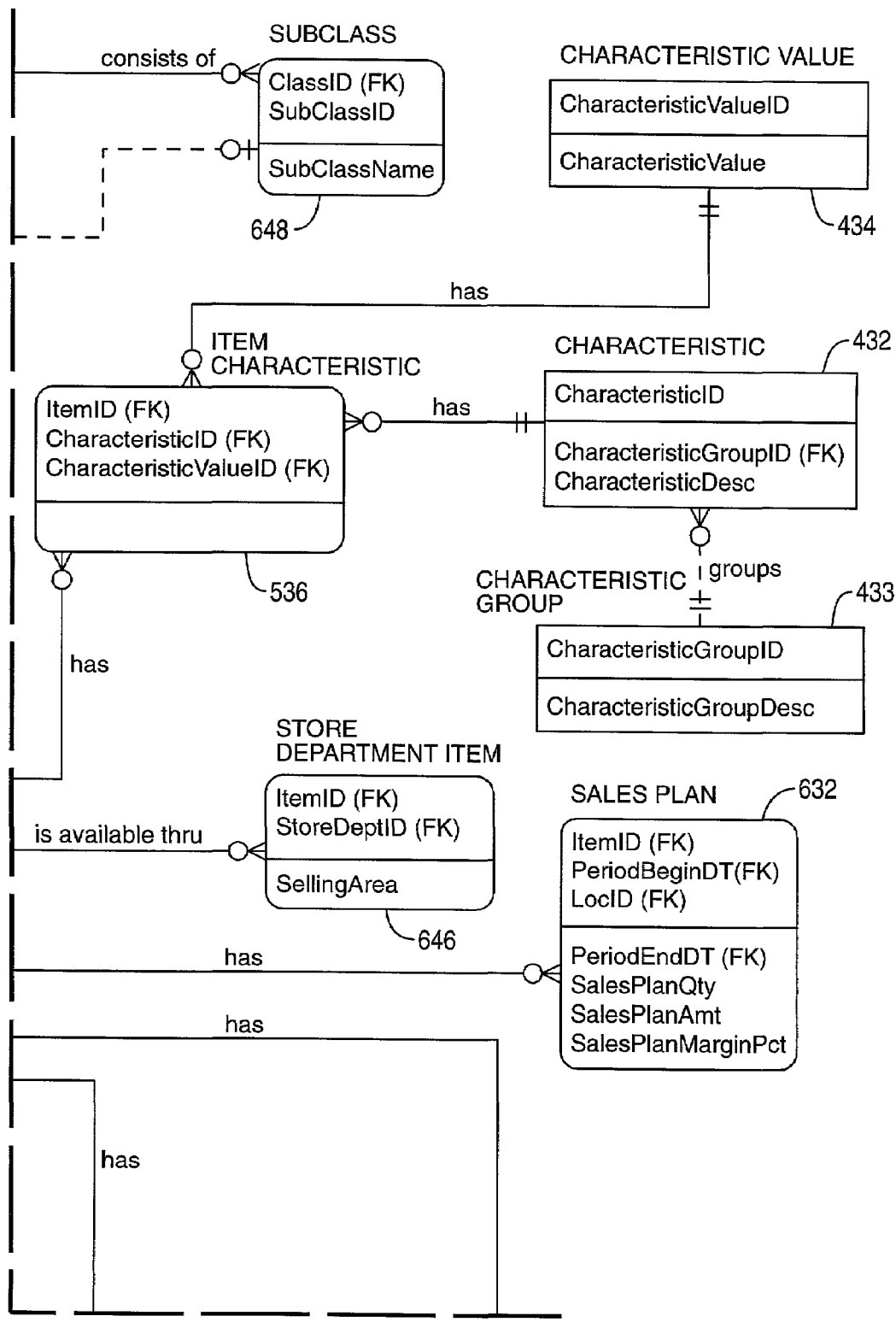
Figure 8C:
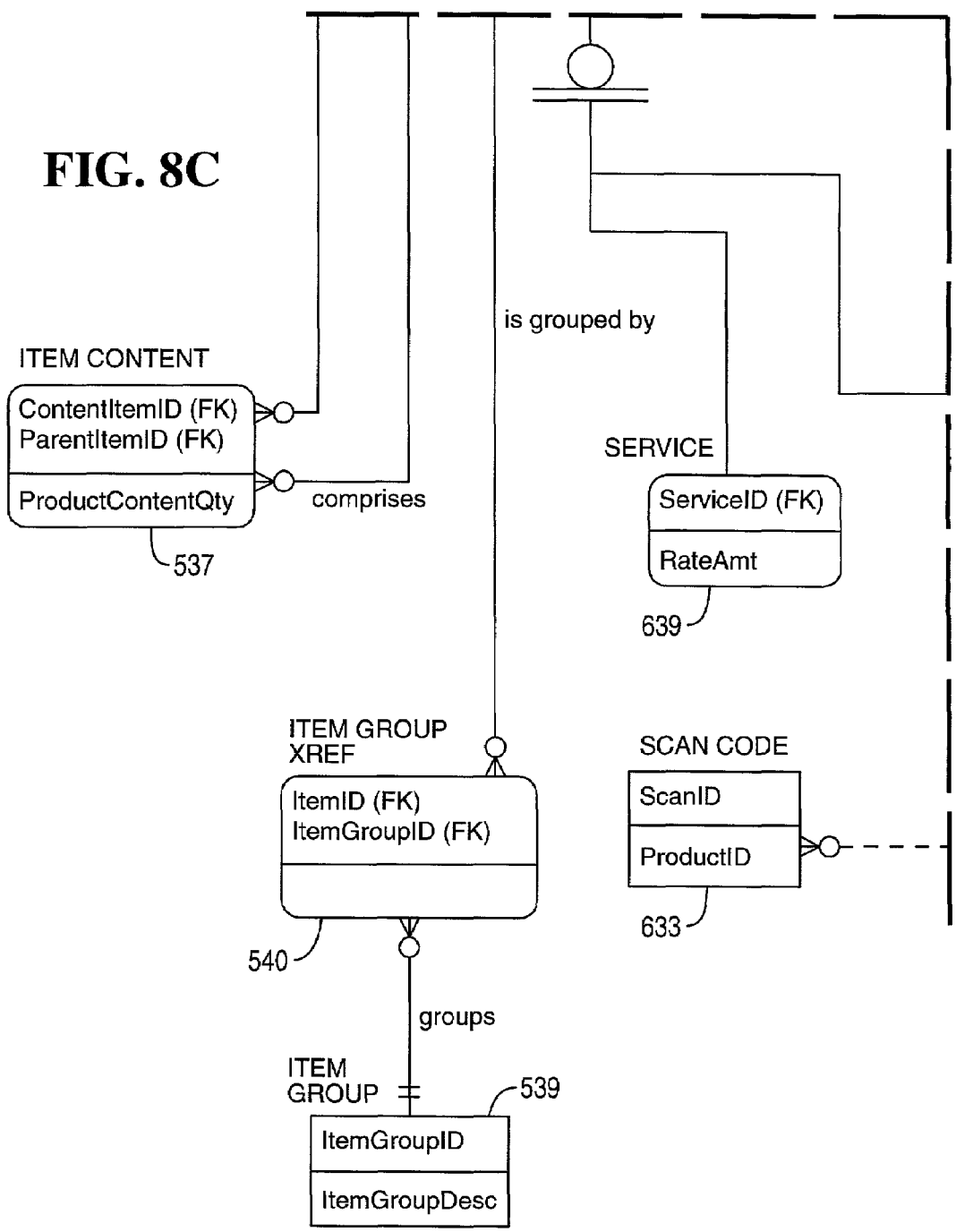
Figure 8E:
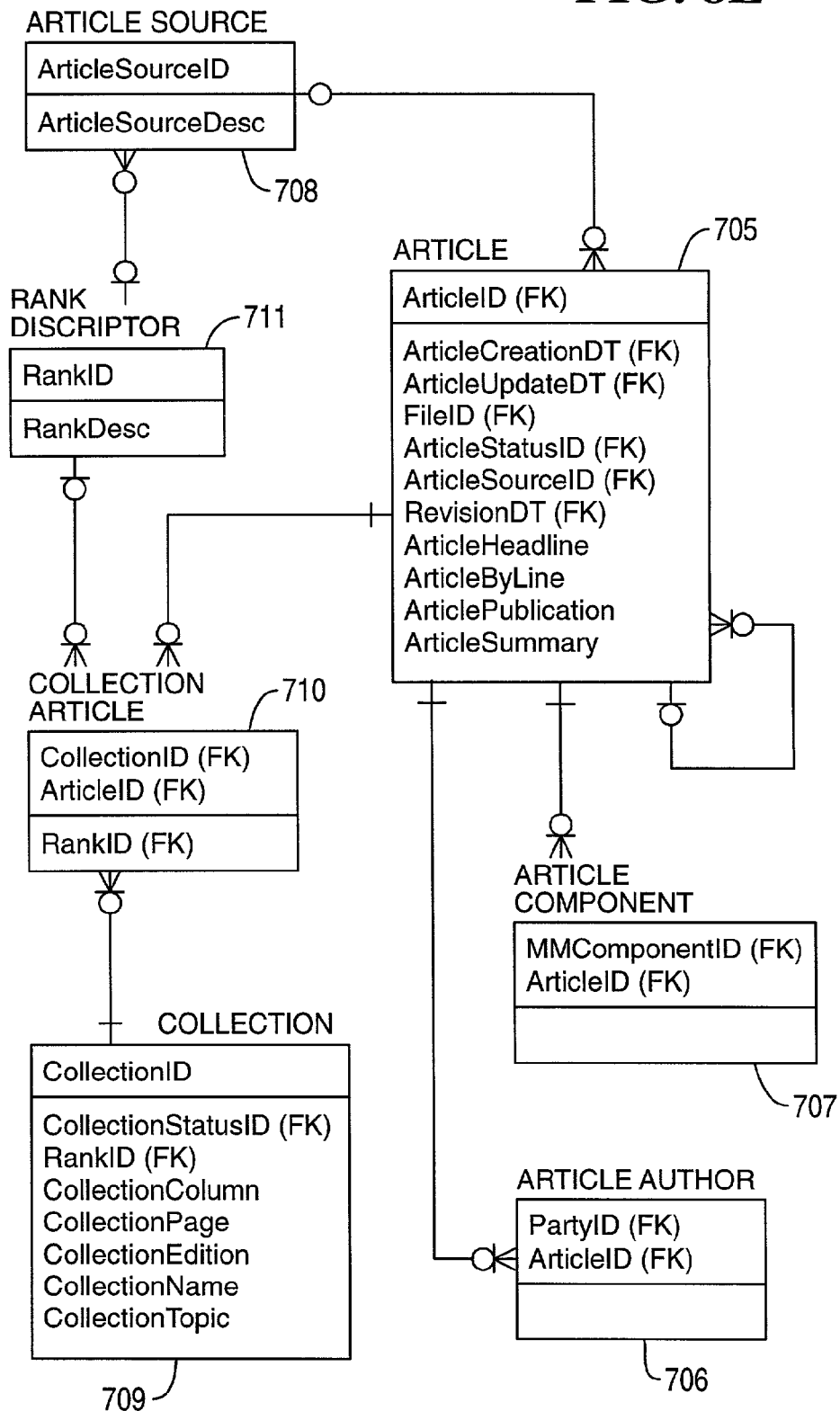

Additional entities concerning items that are articles or publications that may be included within the ITEM Subject Area are shown in FIG. 8E and described below.

ARTICLE (705) A piece of writing, such as a magazine or newspaper article, provided as an ITEM for sale.

ARTICLE AUTHOR (706) Identifies the author of an ARTICLE.

ARTICLE COMPONENT (707) An entity that tracks MULTIMEDIA COMPONENTs associated with an ARTICLE.

ARTICLE SOURCE (708) Identifies the source of an ARTICLE, such as a news service or publisher.

COLLECTION (709) An entity that identifies a group of ARTICLEs that are related.

COLLECTION ARTICLE (710) An identification of an ARTICLE that is a member of a COLLECTION.

RANK DISCRIPTOR (711) A ranking of ARTICLEs within a COLLECTION.

LOCATION

The LOCATION subject area provides for the storage of information concerning on all physical and virtual sites owned or leased by the retailer to support the sale of goods, distribution, and storage. Would include kiosks, warehouses, offices, as well as internet sites.

Figure 9A:
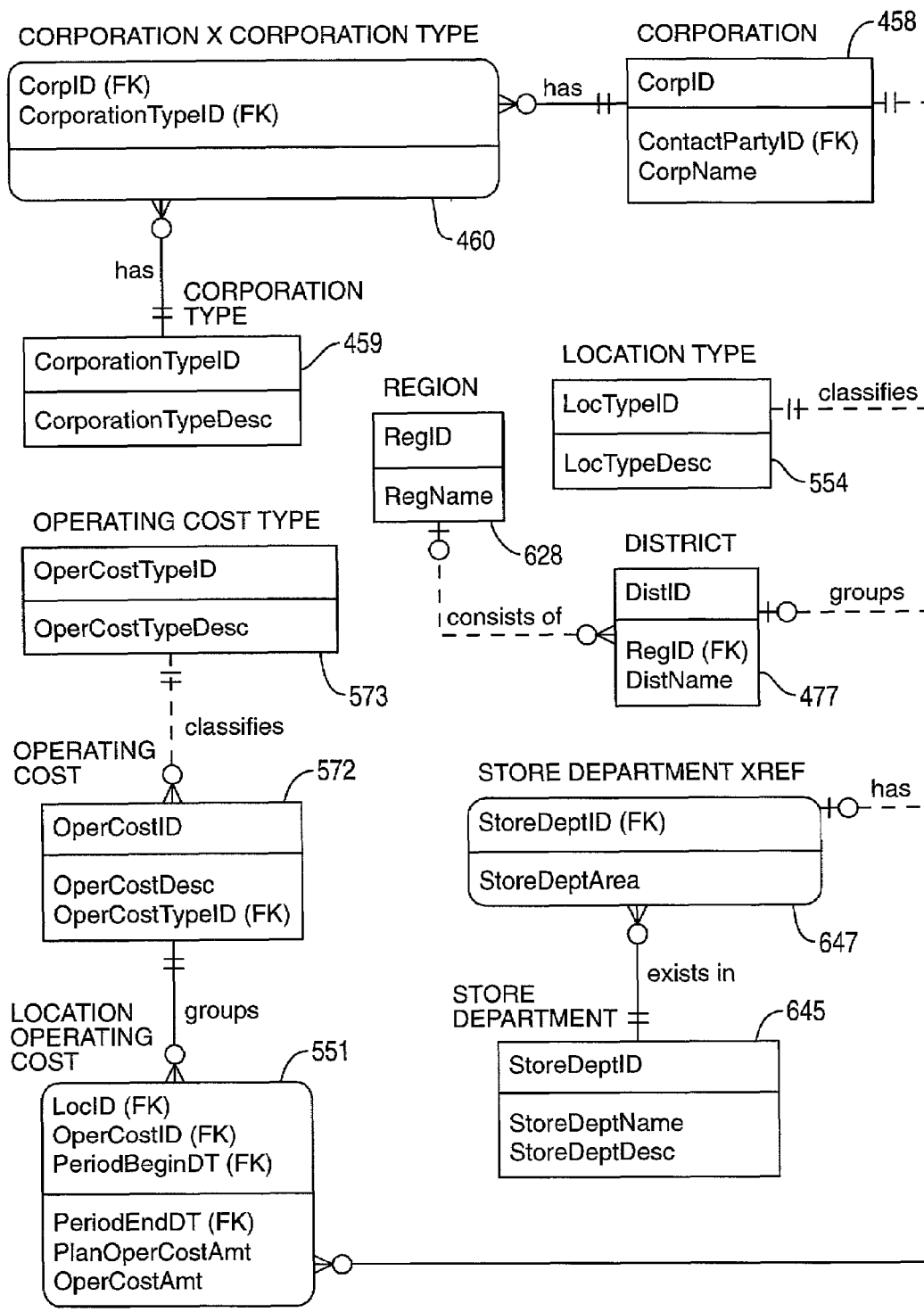
FIGS. 9A and 9B illustrate an entity-relationship diagram of the LOCATION subject area of the logical data model in accordance with the preferred embodiment of the present invention.
Figure 9B:
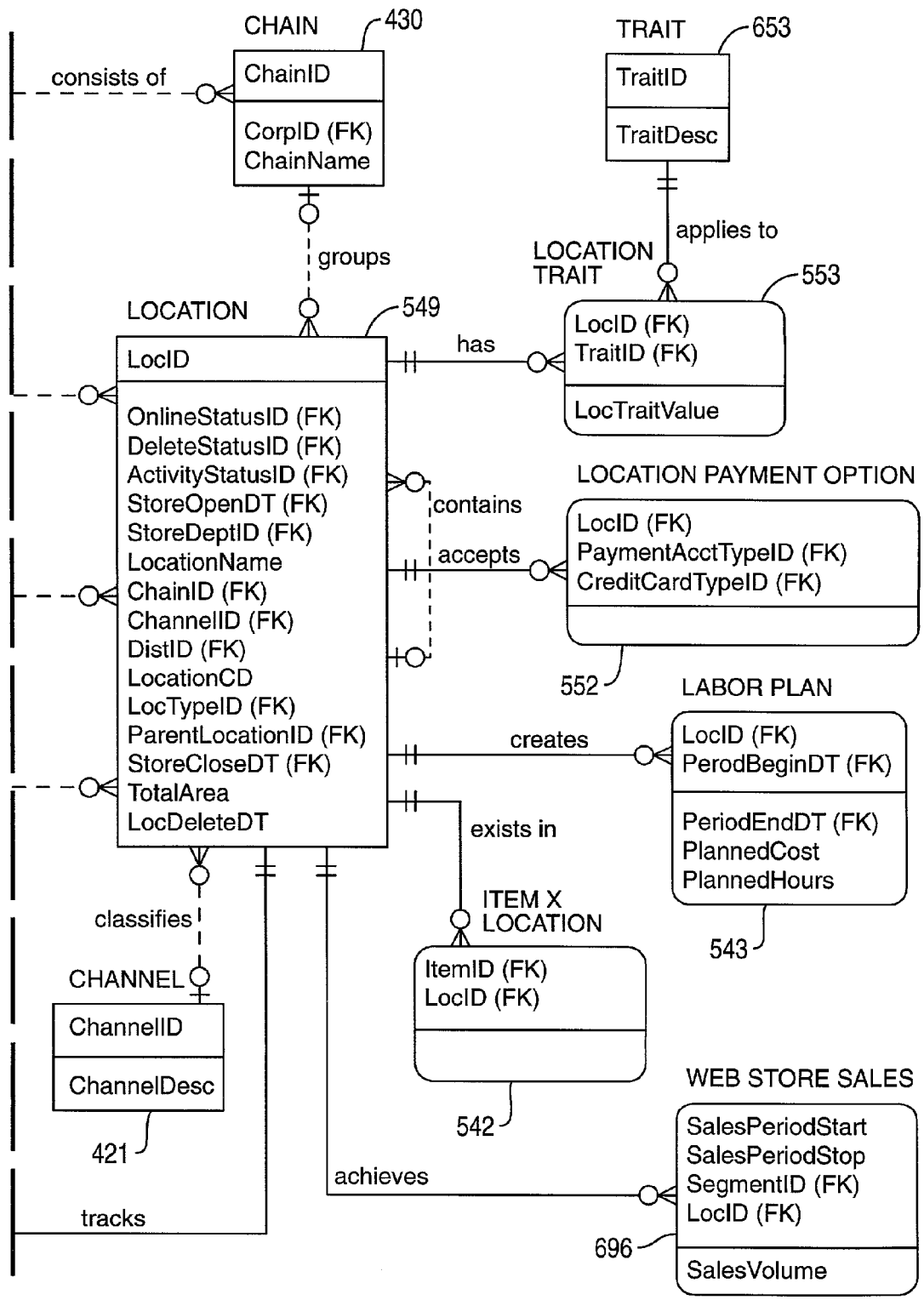

The entities of the LOCATION Subject Area, illustrated in FIGS. 9A and 9B, are defined as follows:

CHAIN (430) Represents all stores owned by a CORPORATION or retail organization, which perform the same business activity using the same consumer brand identity.

CHANNEL (431) The various CHANNELs in which the ITEMs are sold. ITEM prices may vary across CHANNELs., e.g., STORE (P.O.S), WEB, and CATALOG.

CORPORATION (458) The internal parent company of the enterprise's chains or subsidiaries. A CORPORATION represents the highest level, constituting the total of all CHAINs, STOREs and DEPARTMENTs within the enterprise.

CORPORATION TYPE (459) This entity represents a classification type for a Corporation. Possible examples include Advertiser, Publisher, etc.

CORPORATION X CORPORATION TYPE (460) This entity provides for the many-to-many relationship between CORPORATION and CORPORATION type, allowing a single CORPORATION to be classified by more than one CORPORATION TYPE.

DISTRICT (477) A grouping of STORE LOCATIONs that fall within a specific geographic area. DISTRICT is used to organize groups of STOREs for the purposes of planning, reporting and analysis.

ITEM X LOCATION (542) This entity provides for the many-to-many relationship between ITEM and LOCATION.

LABOR PLAN (543) Denotes the planned labor cost and hours for a specific PERIOD, within a specific LOCATION.

LOCATION (549) A physical or virtual site which is owned or leased by the business to support its business operations.

LOCATION OPERATING COST (551) Denotes the planned and actual OPER COST HISTORY by OPER COSTs, for specific PERIOD, for a DEPARTMENT within a STORE.

LOCATION PAYMENT OPTION (552) Provides information concering a specific locations payment options.

LOCATION TRAIT (553) A cross-reference between TRAITs and LOCATIONs, describing the specific TRAITs that belongs to a LOCATION.

LOCATION TYPE (554) Identifies the type of LOCATION, for example, STORE or DISTRIBUTION CENTER. A finer level of differentiation can also be used, for example: a Mall, Stand Alone Center, SuperStore, Clearance Warehouse, or Mini Mall.

OPERATING COST (572) Denotes the types of OPERATING COSTs for a LOCATION. The expenditure items can include: Rent, Service Charge, Heat and Electricity, Distribution, Repairs, Facility Maintenance and Grounds, Equipment Maintenance, Security, Cleaning, Refuse, Communication—Telephone, Mail, FedEx, Bank Charges, Stationary and Supplies, and Labor.

OPERATING COST TYPE (573) Classifies the different OPERATING COSTs into logical groupings. For example: utilities, office-related, maintenance, etc.

REGION (628) An intermediate organization grouping level within the geographic hierarchy, which groups LOCATIONs. A specific regional geographic area of the country or county.

STORE DEPARTMENT (645) A physical area and/or clustering of ITEMs within a STORE STORE DEPARTMENT XREF (647) A cross-reference showing the specific DEPARTMENTs within a specific STORE.

TRAIT (653) A generic construct to describe characteristics of a LOCATION.

WEB STORE SALES (696) This is an aggregating entity. If the advertiser chooses not to share detailed sales information with the advertising service provider (or the marketing systems integrator), then this summary information is enough for the broadest cost-benefit analysis. Note that sales figures are not aggregated on a per-item basis. Since web ads refer visitors to the web store in general, not to specific items, it makes sense to track sales for the store as a whole. Conversely, when ads are bought with guaranteed exposure to specific target markets it makes sense to track store sales grouped by the same segmentation.

MULTIMEDIA COMPONENT

Figure 10:
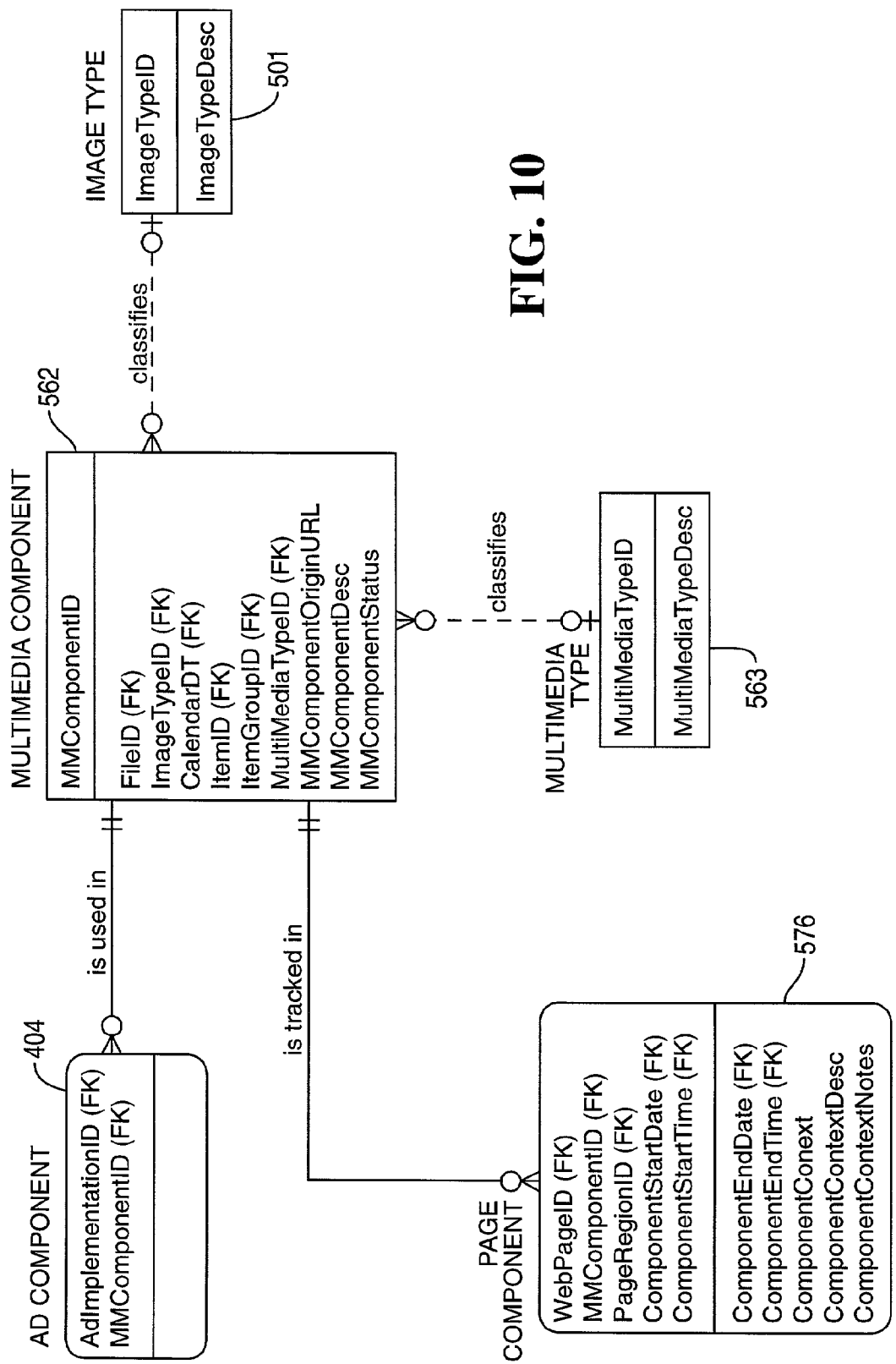
FIG. 10 is an entity-relationship diagram of the MULTIMEDIA COMPONENT subject area of the logical data model in accordance with the preferred embodiment of the present invention.
Figure 11A:
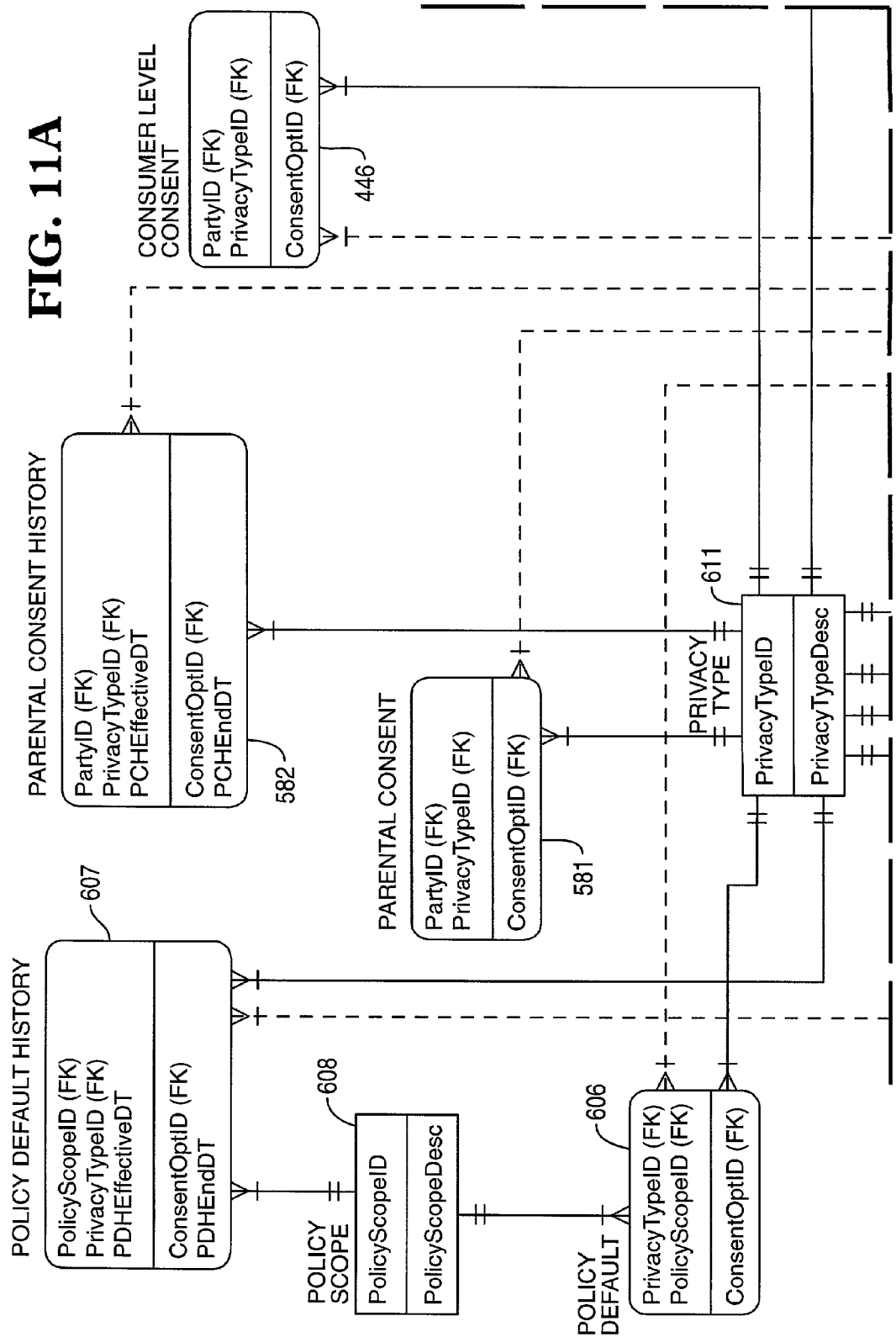
Figure 11C:
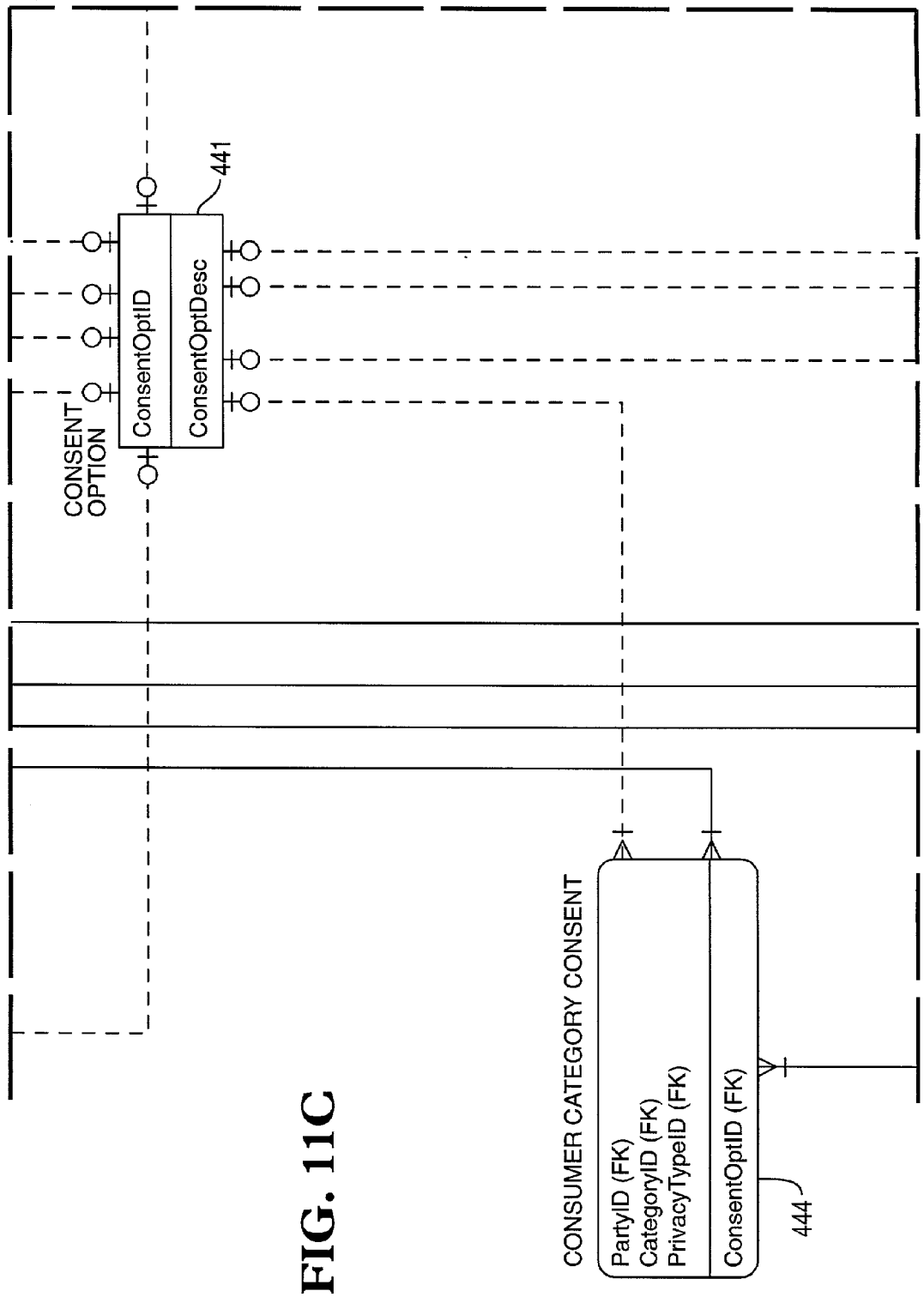
Figure 11D:
Figure 11E:
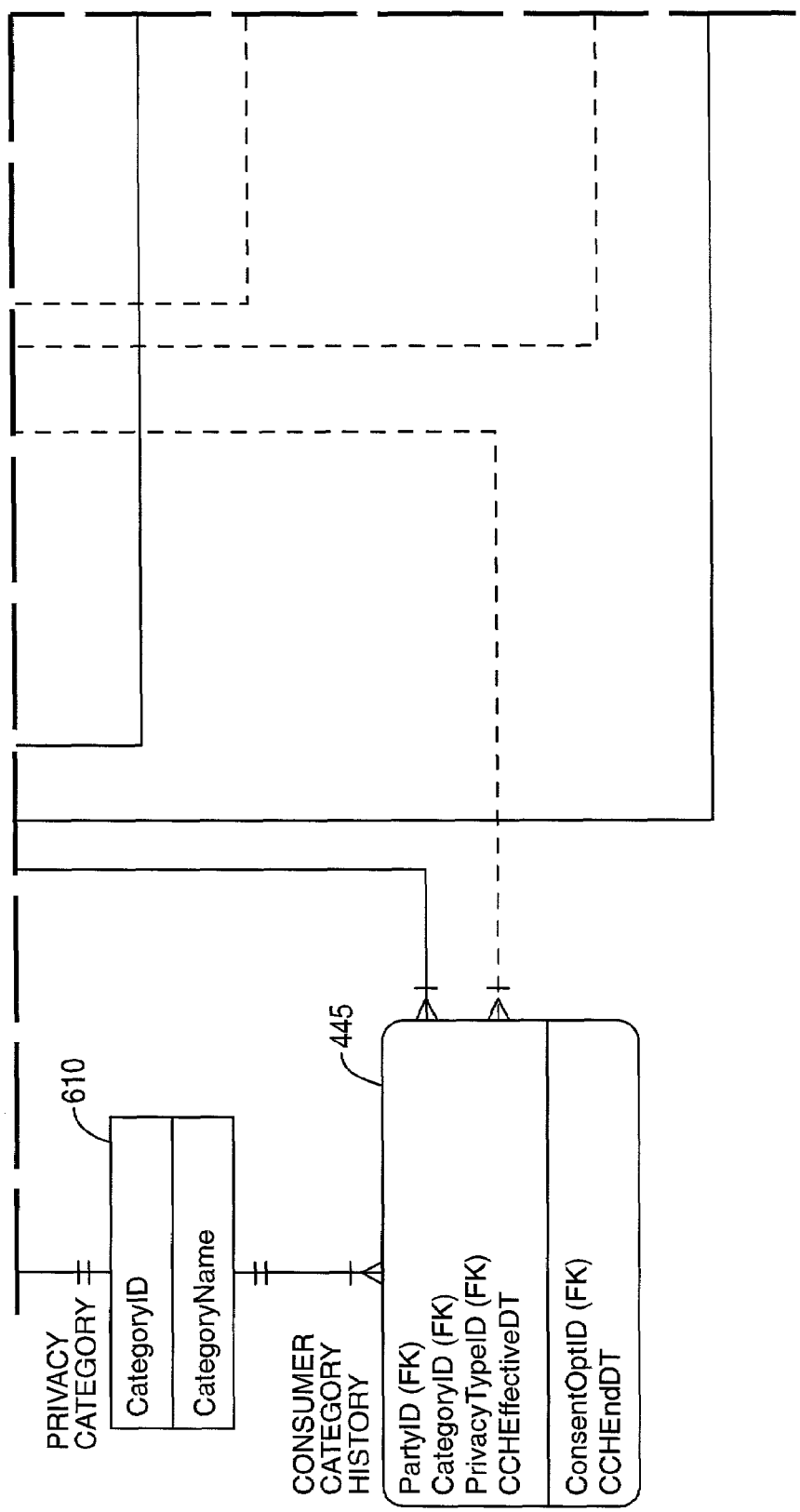
Figure 11F:
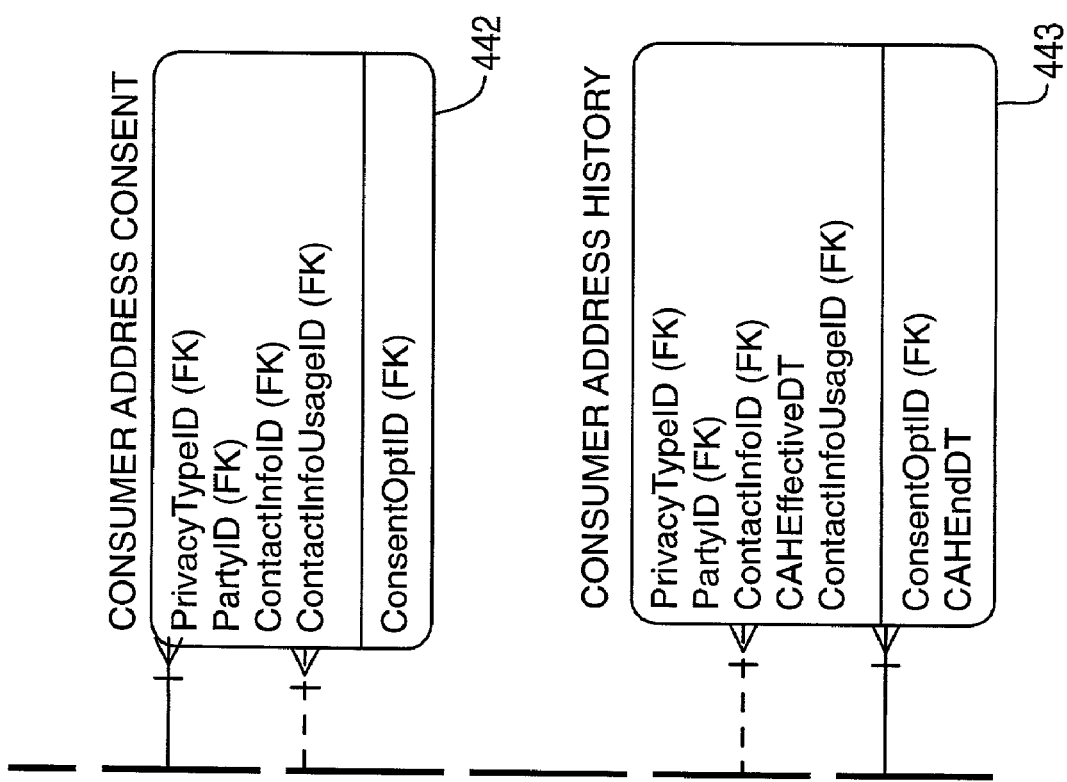
Figure 12A:
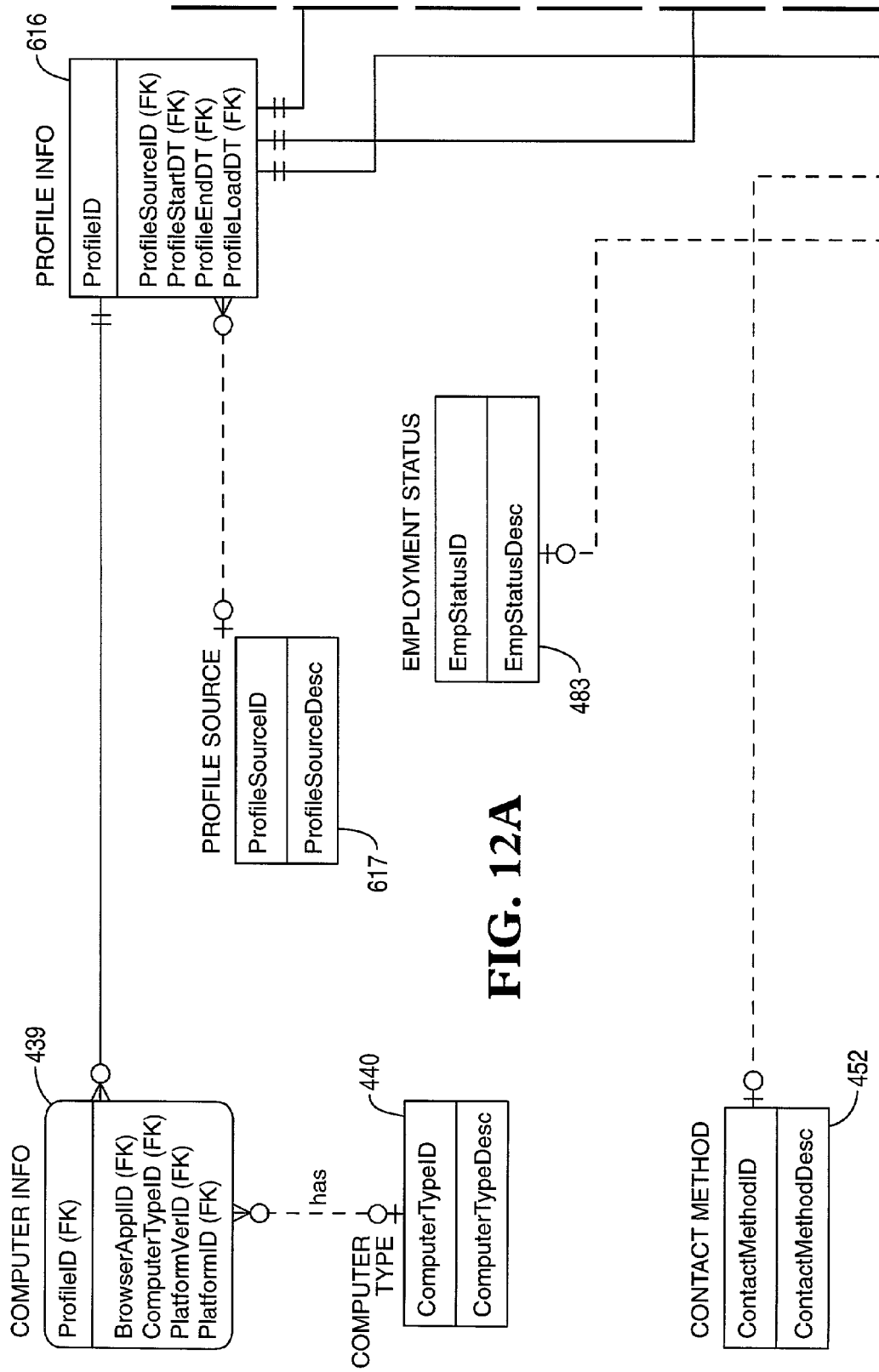
Figure 12B:
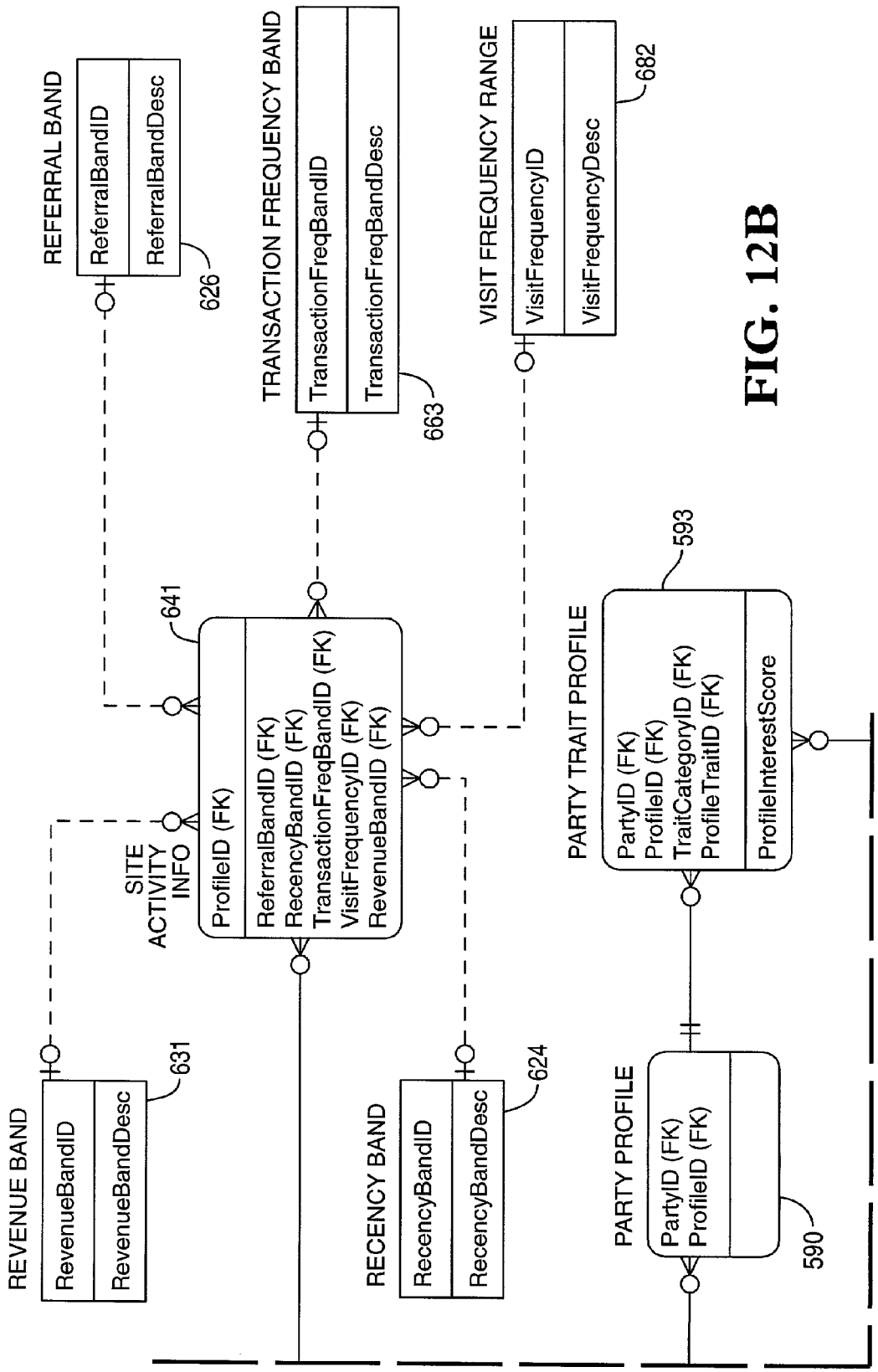
Figure 12D:
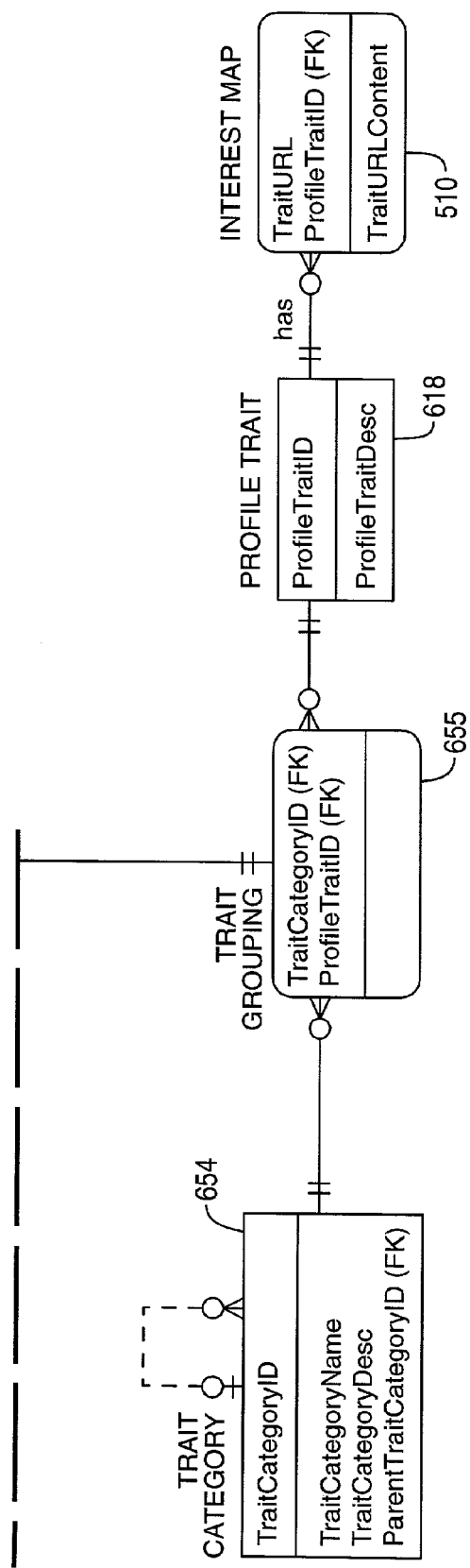
Figure 12E:
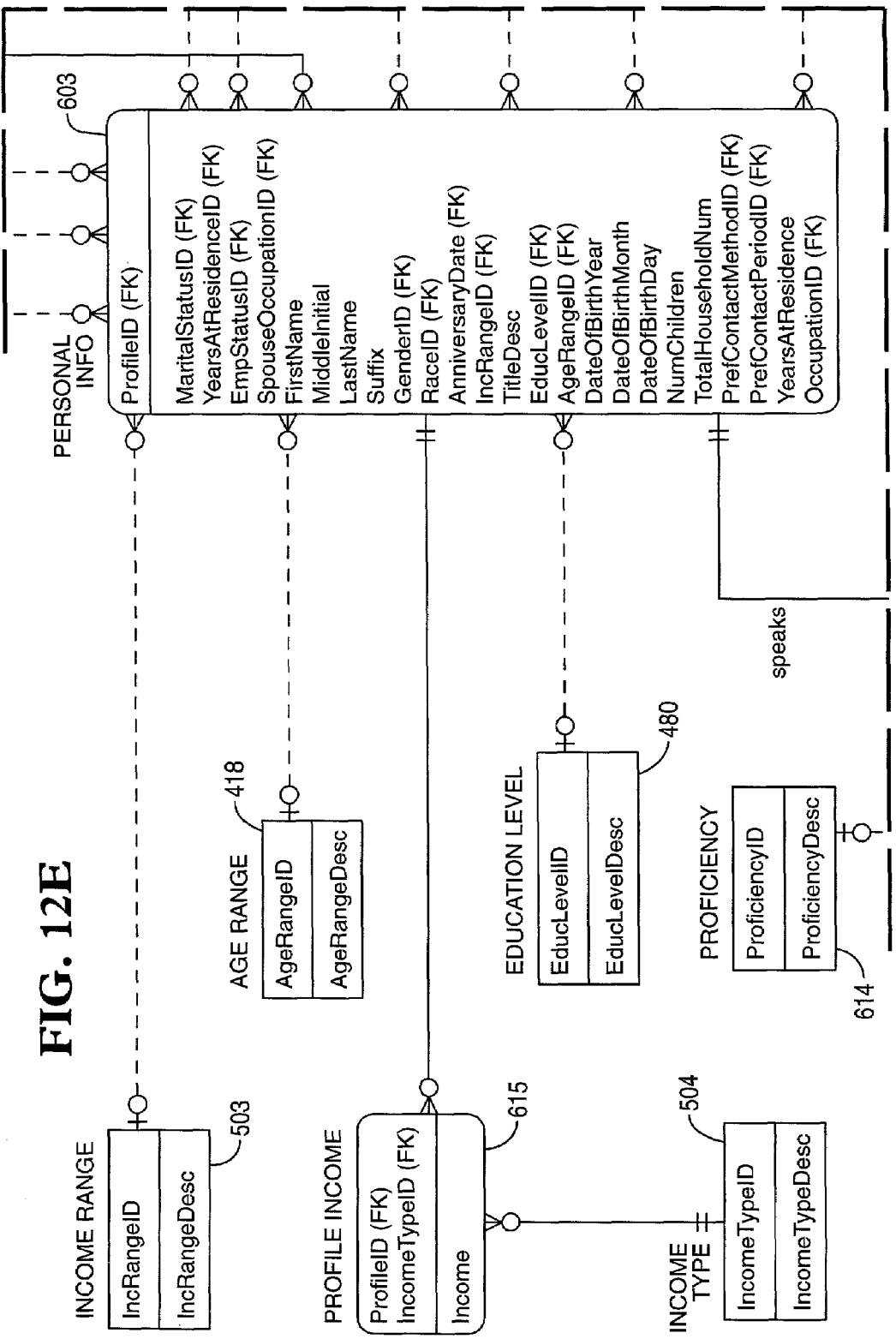
Figure 12F:
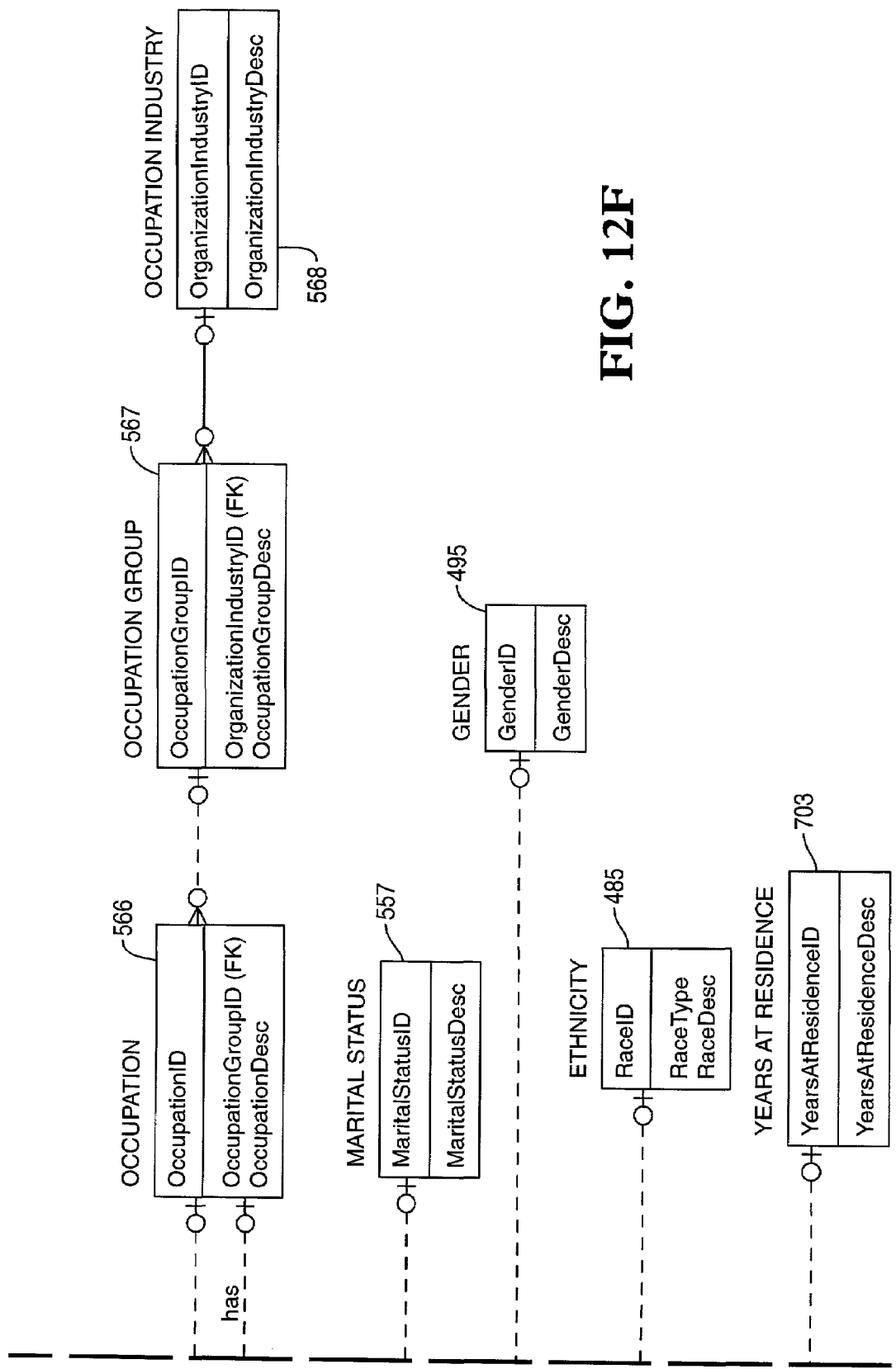
Figure 12G:
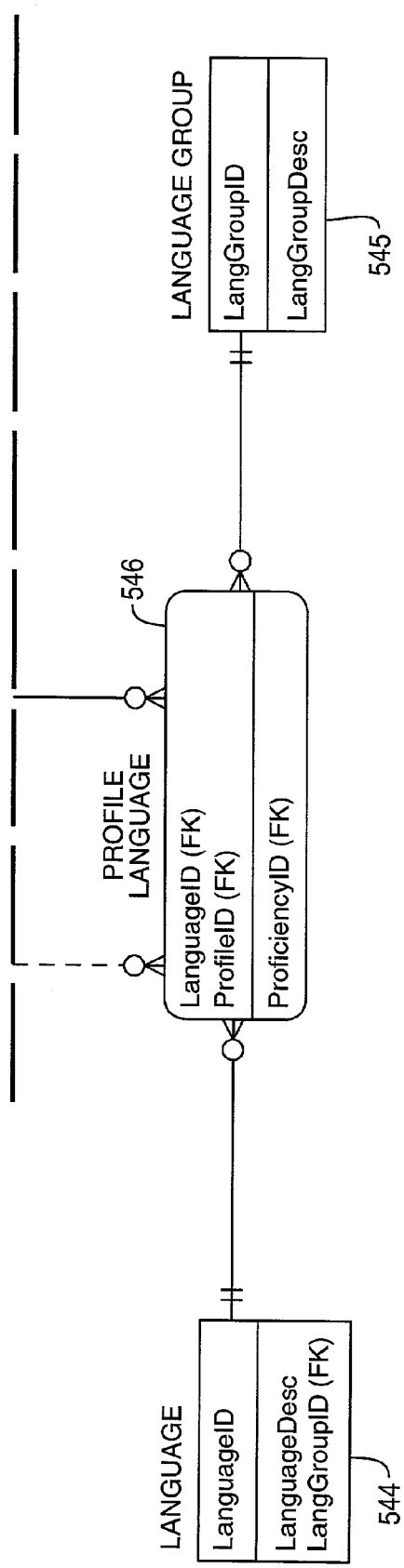

FIG. 10 is an entity-relationship diagram of the MULTIMEDIA COMPONENT subject area. The MULTIMEDIA COMPONENT subject area stores multimedia elements that can be use to construct a web page, such as ads, catalogues, etc.

The entities of the MULTIMEDIA COMPONENT subject area are defined as follows:

AD COMPONENT (404) An associative entity that tracks MULTIMEDIA COMPONENTs involved in the creation of an AD.

COMPONENT CONTENT TYPE (438) This domain identifies the types of multimedia components (vs web pages) source. The COMPONENT CONTENT TYPE is prepopulated with the standard suffixes of multimedia objects.

IMAGE TYPE (501) This entity represents the type of image for a MULTIMEDIA COMPONENT that is an image, i.e., Preview or Full. MULTIMEDIA COMPONENT (562) MULTIMEDIA COMPONENT refers to various multimedia elements that can be use to construct a WEB PAGE, AD, catalog, etc.

MULTIMEDIA TYPE (563) Classification scheme used to categorize MULTIMEDIA COMPONENTs. Useful in tracking components at a summary level.

PAGE COMPONENT (576) An associative entity that tracks various components appearing on a WEB PAGE.

PRIVACY

The PRIVACY Subject Area stores information about privacy permissions from individuals, households and organizations of interest to the enterprise.

The entities of the PRIVACY subject area, illustrated in FIGS. 11A through 11F, are defined as follows:

CONSENT OPTION (441) This is the actual opt-in and opt-out domain.

CONSUMER ADDRESS CONSENT (442) This table allows for explicit consent to be given per address. An address in this context can be the postal mail address, a phone number or an email address. This granularity allows consumers to accept marketing promotions at specific email addresses, for example their yahoo or hotmail account, but not their work address. A consumer can opt-out of phone marketing at home, but accept them by regular mail etc.

CONSUMER ADDRESS HISTORY (443) Keeps the history of changes in the consumer_address table. A trigger may be used to keep this table up to date.

CONSUMER CATEGORY CONSENT (444) This level offers more granularity and conforms the most to P3P. P3P defines fifteen base categories. A domain table for the different categories called PRIVACY_CATEGORY is provided to contain the base P3P categories as well as any additional custom category the business chooses to support. The consent table for this level is per party per category.

CONSUMER CATEGORY HISTORY (445) Keeps the history of changes in the consumer_category_consent table. A trigger may be provided to keep this table up to date.

CONSUMER LEVEL CONSENT (446) The privacy option that this PARTY has given his/her consent for the enterprise to make use of information. This level is used to track high level preferences per consumer. It can be used independent of category level preferences, or in an inheritance scheme in conjunction with the lower level tables. The privacy views should use the codes from this table in the absence of explicit consents at the category level. The more detailed preferences should always prevail and override the codes in this table.

CONSUMER LEVEL HISTORY (447) Keeps the history of changes in the consumer_level_history table. A trigger may be provided to keep this table up to date.

CONTACT INFO (448) A way to communicate with, or contact, PARTYs. It can be MAIL ADDRESS (P.O. Box, or street), ELECTRONIC ADDRESS, or TELEPHONE number.

CONTACT INFO TYPE (450) Indicates if an ADDRESS is MAIL, ELECTRONIC, or TELEPHONE.

CONTACT INFO USAGE (451) Specifies the usage of an address.

PARENTAL CONSENT (581) This table is added to support COPPA, which requires explicit parental consent for children under thirteen years of age. Any web site catering to children must offer an easy to understand privacy policy which requires children under thirteen years of age to get parental permission before the site can use or sell any personal information about them. If the site does not collect such information, then the policy will simply indicate that fact. However, if the site does collect such personal information COPPA requires the web site to offer the children's parents three types of consent options: Collection and Use Consent, Disclosure Consent and No Consent.

PARENTAL CONSENT HISTORY (582) Keeps the history of changes in the parental_consent table. A trigger may be used to keep this table up to date.

PARTY (583) Any INDIVIDUAL, HOUSEHOLD, or ORGANIZATION of interest to the enterprise.

PARTY CONTACT INFO (585) Describes how a specific combination of ADDRESS and PARTY is used. For example: '123 Main Street' is used by 'Rachel' as 'Ship To'; '310-555-2342' is used by 'John' as 'Fax number'.

POLICY DEFAULT (606) This table holds the business' privacy policy defaults. These default values can be used to automatically populate the consumer related consent tables when the consumer accepts the default policy or in the absence of explicit consumer preferences.

POLICY DEFAULT HISTORY (607) Keeps the history of changes in the policy default. A trigger may be provided to keep this table up to date.

POLICY SCOPE (608) The scope of a privacy policy. POLICY SCOPE allows support for children and adult privacy default preferences. COPPA requires only three preference options: Collection and Use, Disclosure and None.

PRIVACY CATEGORY (610) This table holds the privacy category domain. The values are minimally the base P3P categories. They can be augmented by any business specific category such as employer.

PRIVACY TYPE (611) This is a continuously expanding domain, as consumers become more aware of privacy.

PRIVACY TYPE stores the different types of preferences that people can opt-in or opt-out of.

PROFILE

FIGS. 12A through 12G illustrate an entity-relationship diagram of the PROFILE subject area. The PROFILE subject area stores information concerning customer segments of interest to the enterprise. This information is typically purchased from a third party.

The entities of the PROFILE subject area are defined as follows:

AGE RANGE (418) Information regarding age ranges.

COMPUTER INFO (439) Profile data for entity.

COMPUTER TYPE (440) Stores computer hardware type information.

CONTACT METHOD (452) Describes contact preferences.

CONTACT PERIOD (453) Information regarding preferred contact periods.

EDUCATION LEVEL (480) Information regarding education levels.

EMPLOYMENT STATUS (483) Information regarding employment statuses.

ETHNICITY (485) Information regarding ethnicity.

GENDER (495) Information concerning gender.

INCOME RANGE (503) Information regarding income ranges.

INCOME TYPE (504) Describes types of income.

INTEREST MAP (510) Contains information linking web page URLs to interest.

LANGUAGE (544) List of language types.

LANGUAGE GROUP (545) List of language groups.

MARITAL STATUS (557) Contains information regarding marital statuses.

OCCUPATION (566) Specifies occupations.

OCCUPATION GROUP (567) Specifies occupation groups.

OCCUPATION INDUSTRY (568) Specifies organizational industries.

PARTY PROFILE (590) Information linking party entities and profiles.

PARTY TRAIT PROFILE (593) Contains information linking party entities to their profiles, trait categories and traits with interest level scores.

PERSONAL INFO (603) Provides personal profile information.

PROFICIENCY (614) Standard Domain: Language Proficiency Level.

PROFILE INCOME (615) Income.

PROFILE INFO (616) Unique identifier for entity profile information.

PROFILE LANGUAGE GROUP (546) Information linking language, language group and language proficiency.

PROFILE SOURCE (617) Specifies the source of profile information.

PROFILE TRAIT (618) Describes specific interest within a demographic type.

RECENCY BAND (624) How long ago was the last purchase made.

REFERRAL BAND (626) How many people has this person referred REVENUE BAND (631) Customer Domain to track the revenue generated by this customer.

SITE ACTIVITY INFO (641) Contains information regarding activities tracked during web visits.

TRAIT CATEGORY (654) Contains information concerning different types of profile information.

TRAIT GROUPING (655) Describes specific interest groupings within a demographic type.

TRANSACTION FREQUENCY BAND (663) Information regarding transaction frequency bands.

VISIT FREQUENCY RANGE (682) Information regarding browsers visit frequency.

YEARS AT RESIDENCE (703) Information regarding years at residence.

PROMOTION

The PROMOTION subject area contains information concerning promotions, which are defined as marketing efforts, which are different from normal practice and designed for a specific purpose. Information is stored on the various components of the promotion, including the items and ads included, the type of ad, and the market segments targeted.

Figure 13A:
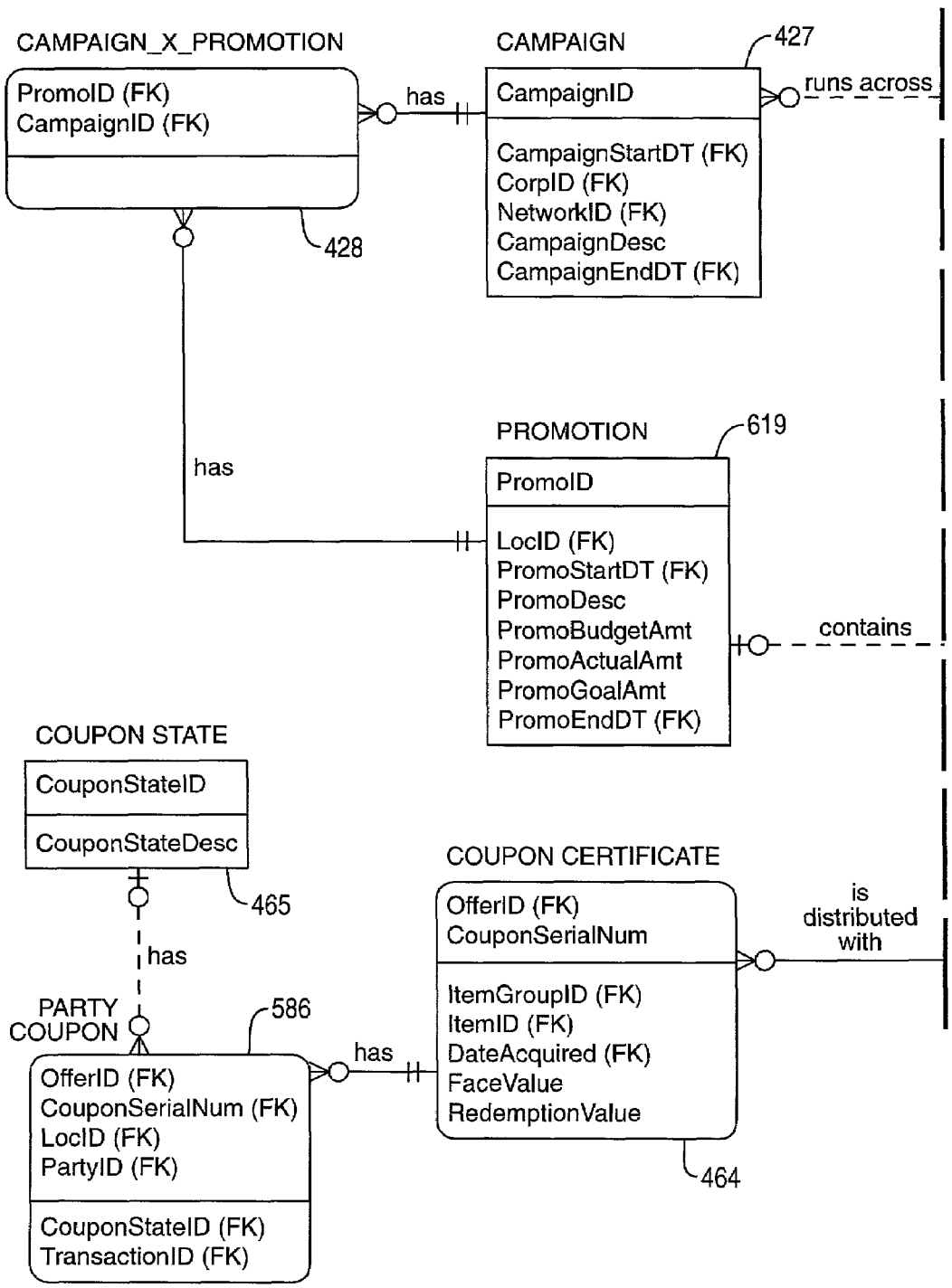
FIGS. 13A and 13B illustrate an entity-relationship diagram of the PROMOTION subject area of the logical data model in accordance with the preferred embodiment of the present invention.
Figure 13B:
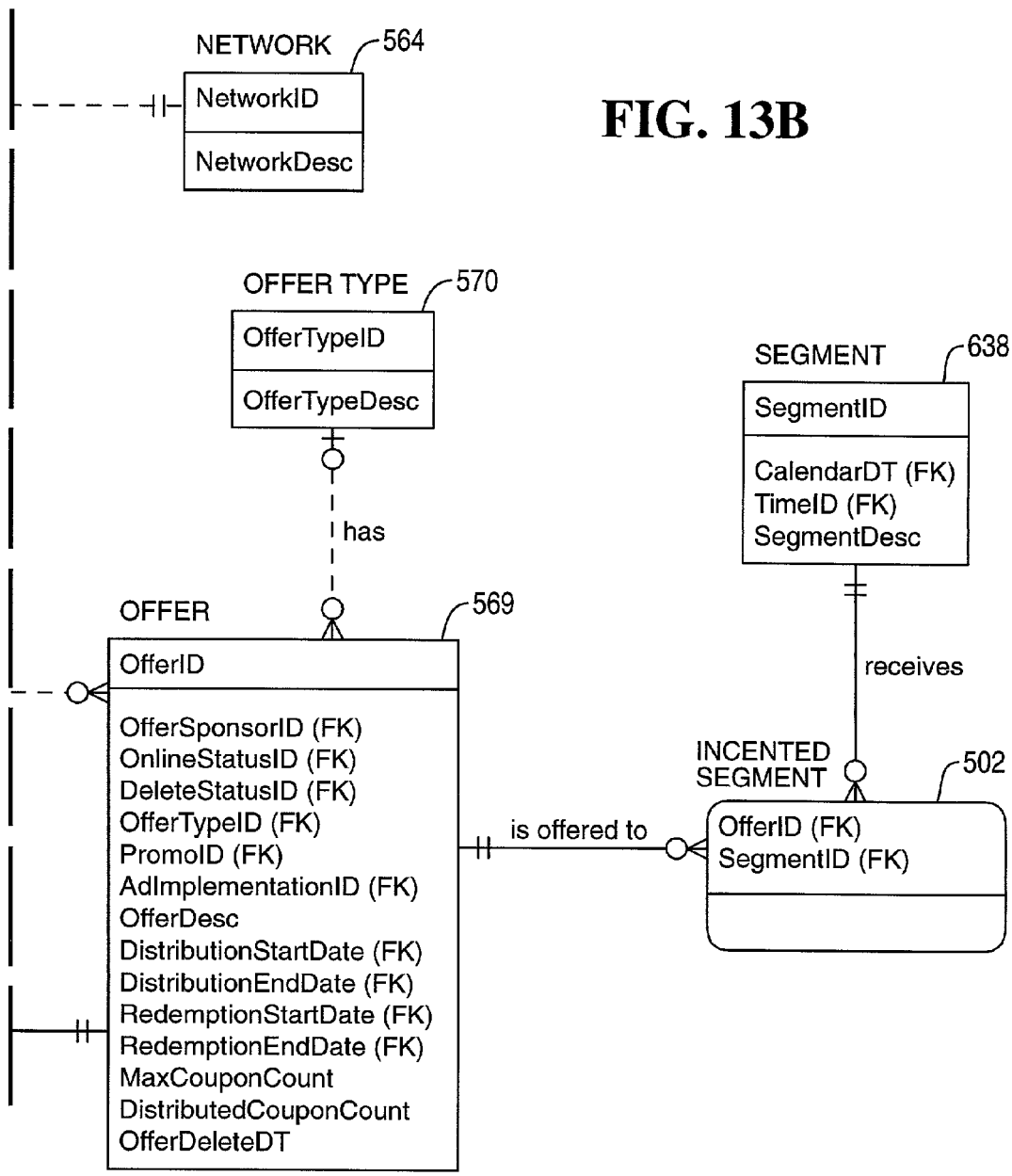

The entities of the PROMOTION subject area, illustrated in FIGS. 13A and 13B, are defined as follows:

CAMPAIGN (427) A marketing effort with a specific start and end date. Typically a large effort, that can consist of multiple PROMOTIONs. The goal of a CAMPAIGN is usually to enhance the image of the enterprise, and/or drive more business and/or obtain more customers. Example: Sony launches a 3-month CAMPAIGN to build brand awareness, and creates several consumer oriented PROMOTIONs, TV ADs, etc. to support the CAMPAIGN.

CAMPAIGN_X_PROMOTION (428) Information regarding linkage between promotions and campaigns.

COUPON CERTIFICATE (464) A specific instance of a COUPON that is trackable through a unique number. The intent is to provide targeted INDIVIDUALs with trackable COUPONs that enable the customer to be identified at redemption time, even if the redemption transaction is cash. A direct mail piece with a specific OFFER, containing a barcode with a unique code, or an individualized e-mail code.

COUPON STATE (465) Provided for BroadVision Support.

INCENTED SEGMENT (502) A mapping of a group of SEGMENTs to a specific OFFER. An OFFER can be made to more than one SEGMENT. For example, all customers whose purchases declined over 50% over the last 6 months are offered $20 off their next order. This is a calculated table, the calculations occurring after data has been loaded into the warehouse. This could also be a Customer Domain table.

NETWORK (564) This entity represents a group of Publisher sites that an Ad or Campaign is run on. Ad Networks commonly have predefined Networks that Advertisers can choose to run their ads on. Examples include a Computers & Technology Network that would include all of the Computer & Technology related sites the Ad Network has space on, or a Sports Network that includes all of the networks sports related sites.

OFFER (569) A specific incentive made available to customers. The OFFER entity usually contains 2 parts: a.) condition(s) to be met, and b.) the reward for a.). For example: Buy a Macintosh G4, and get a free Epson 700 printer.

OFFER TYPE (570) Customer Domain: Types of Offers.

PARTY COUPON (586) Information linking party entities, coupons and locations.

PROMOTION (619) A narrowly defined marketing effort designed for a specific purpose. Can be part of a larger CAMAPAIGN. A PROMOTION has a specific start and end date. A PROMOTION can contain multiple OFFERS and ADs. For example: A PROMOTION can be created to drive DVD sales. It consists of two OFFERS: one for free shipping, and one for 10% off orders over $100; and two 2 ADs: a TV AD and a BANNER AD placed on selected websites.

SEGMENT (638) A cluster of PARTYs for marketing purposes. A SEGMENT can be re-used, and can receive multiple OFFERs. This is a calculated table, the calculations occurring after data has been loaded into the warehouse. This could also be a Customer Domain table.

TIME

Figure 14:
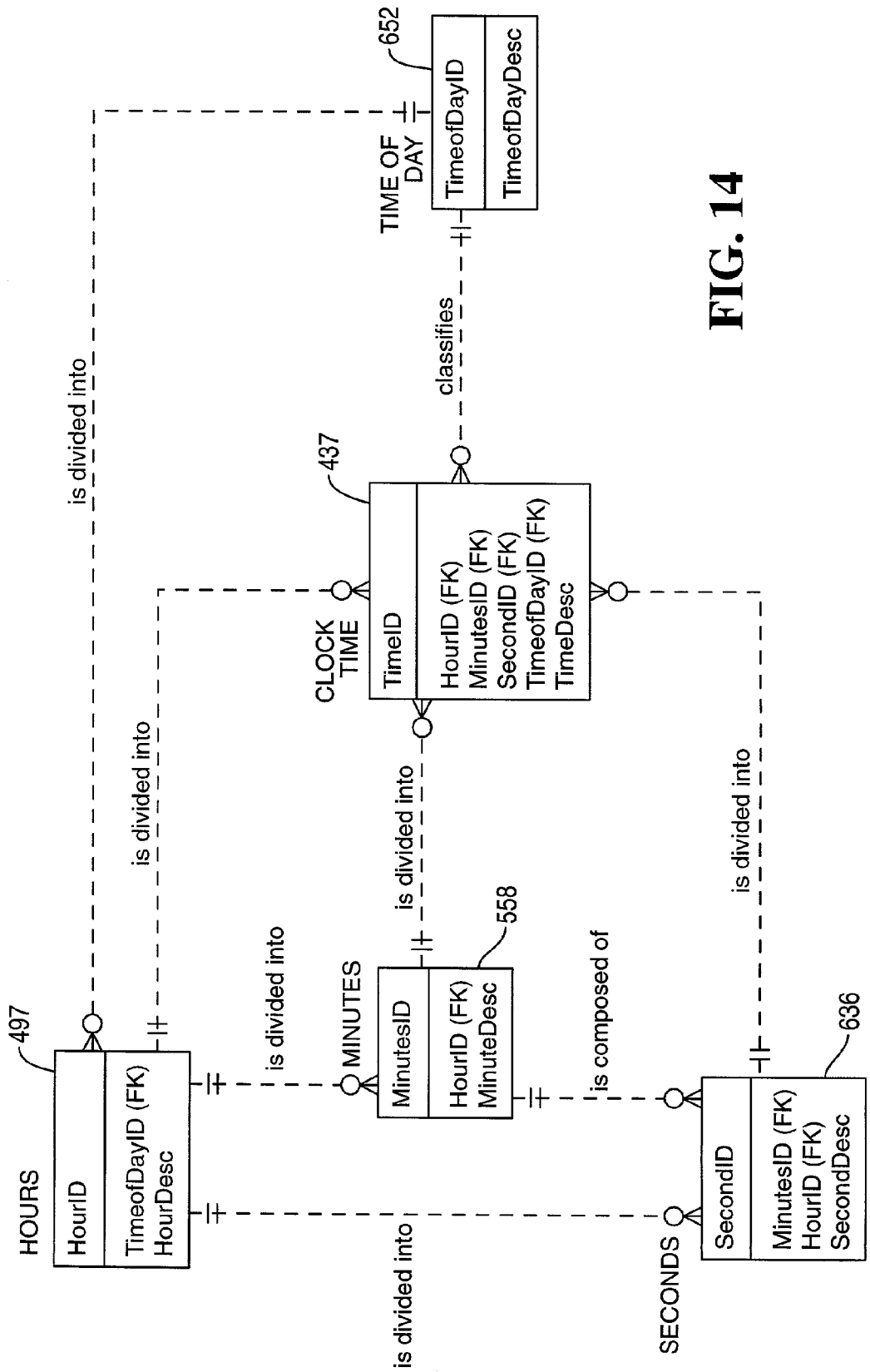
FIG. 14 is an entity-relationship diagram of the TIME subject area of the logical data model in accordance with the preferred embodiment of the present invention.

The TIME subject area contains information concerning the time in a given day by hours, minutes and seconds. The entities of the TIME subject area, illustrated in FIG. 14, are defined as follows:

CLOCK TIME (437) This entity represents a specific instance time most likely represented in military time. Each row indicates a particular instance in time down to the second.

HOURS (497) This entity represents the hours of the time field.

MINUTES (558) This entity represents the minutes of the time field.

SECONDS (636) This entity represents the seconds of the time field.

TIME OF DAY (652) This entity represents a division of a day, i.e., morning, afternoon, night, etc. This may be defined in 4 or 6 hour periods or into however many segments the company wants to divide up a day.

TRANSACTION ACTIVITY

Figure 15A:
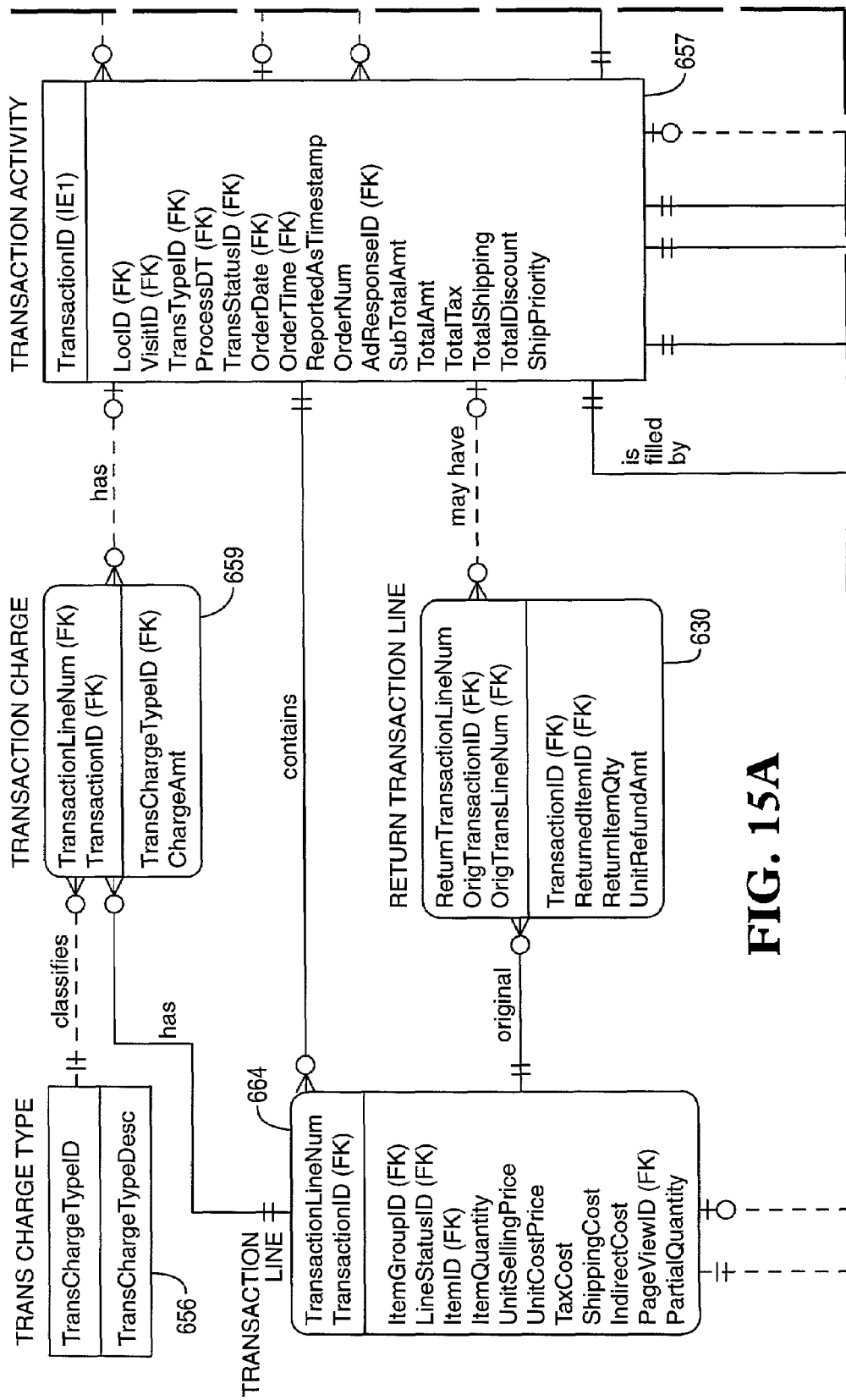
FIGS. 15A thorough 15E illustrate an entity-relationship diagram of the TRANSACTION ACTIVITY subject area of the logical data model in accordance with the preferred embodiment of the present invention.
Figure 15B:
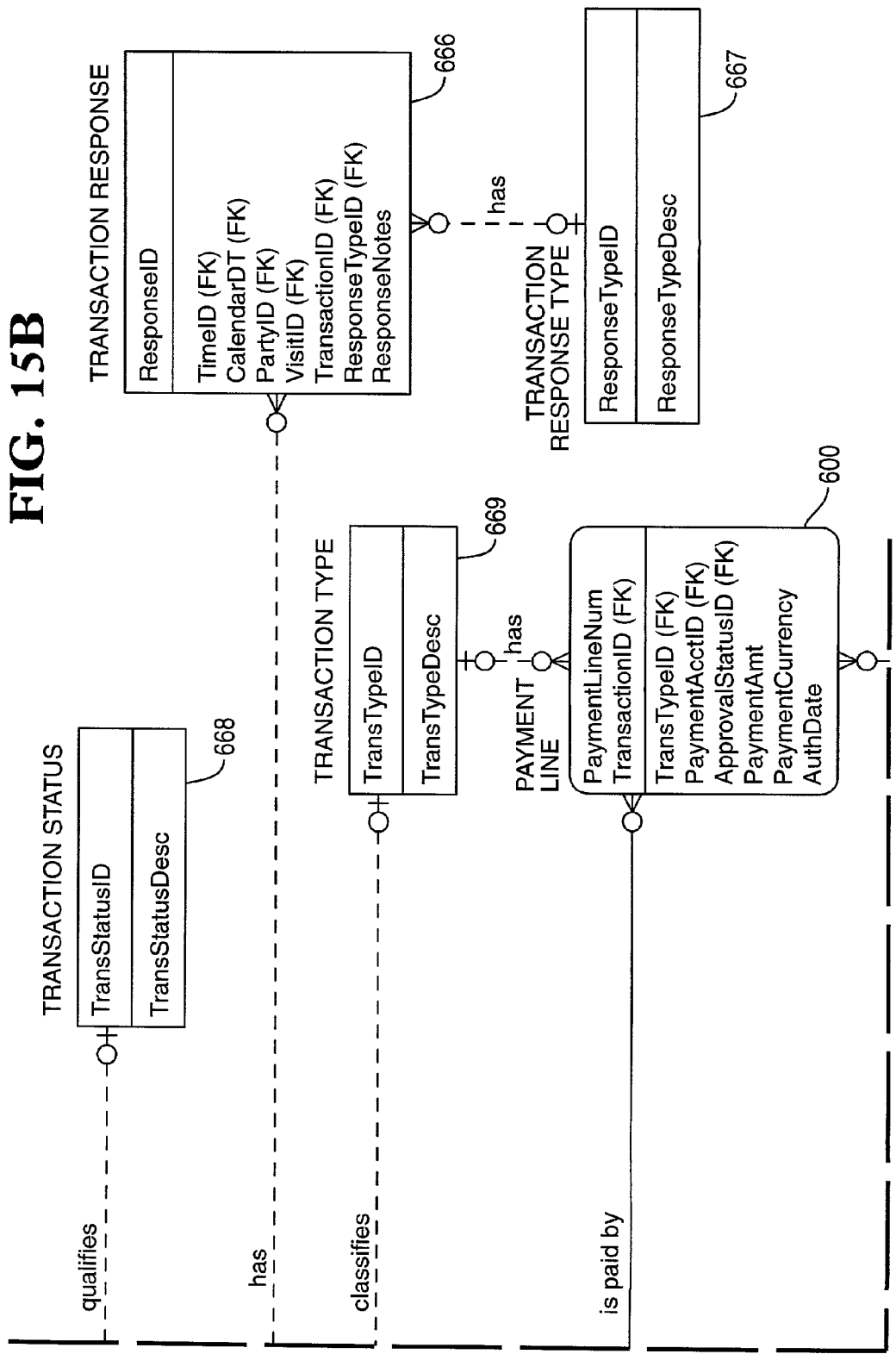
Figure 15C:
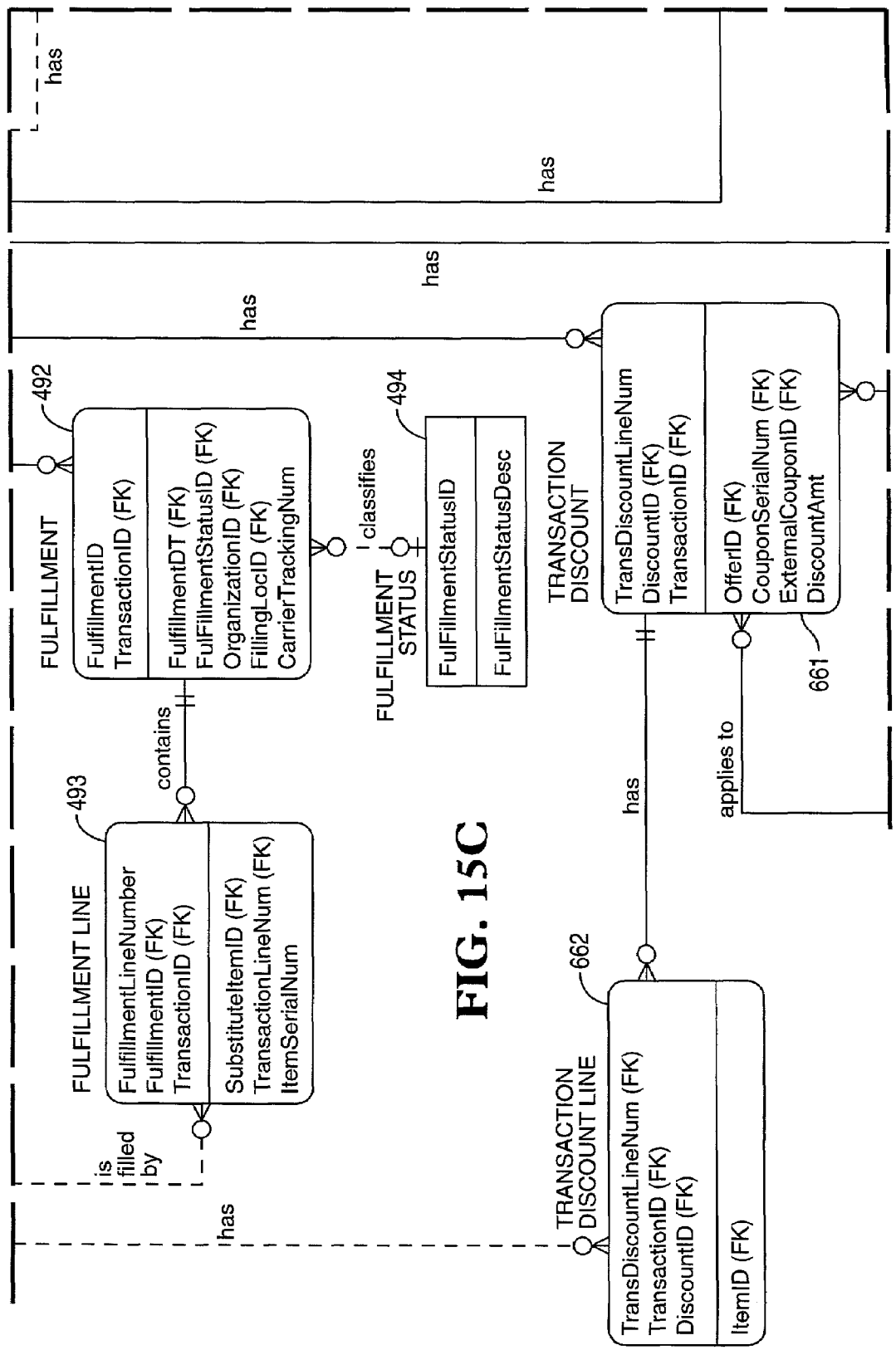
Figure 15D:
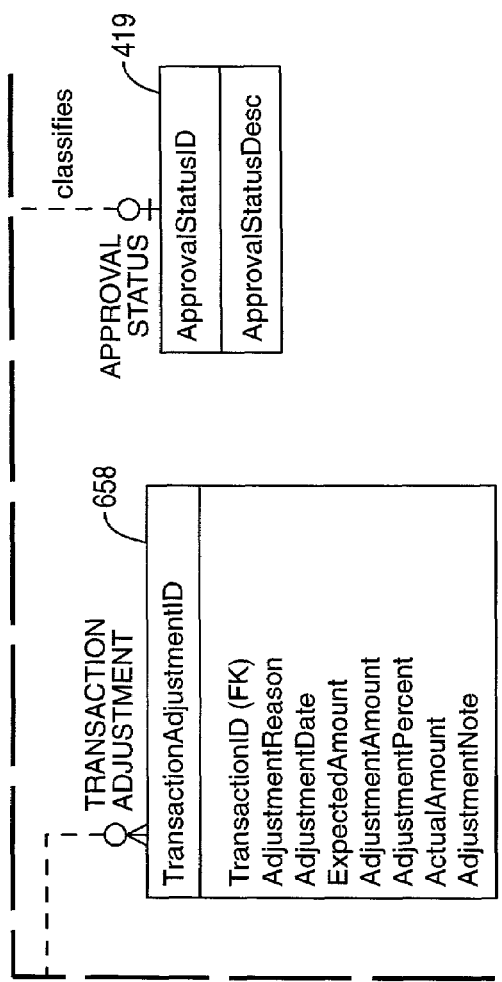
Figure 15:
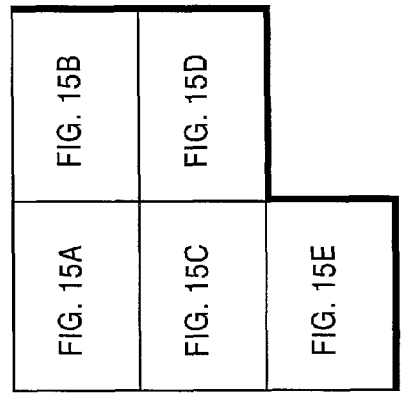
Figure 15E:
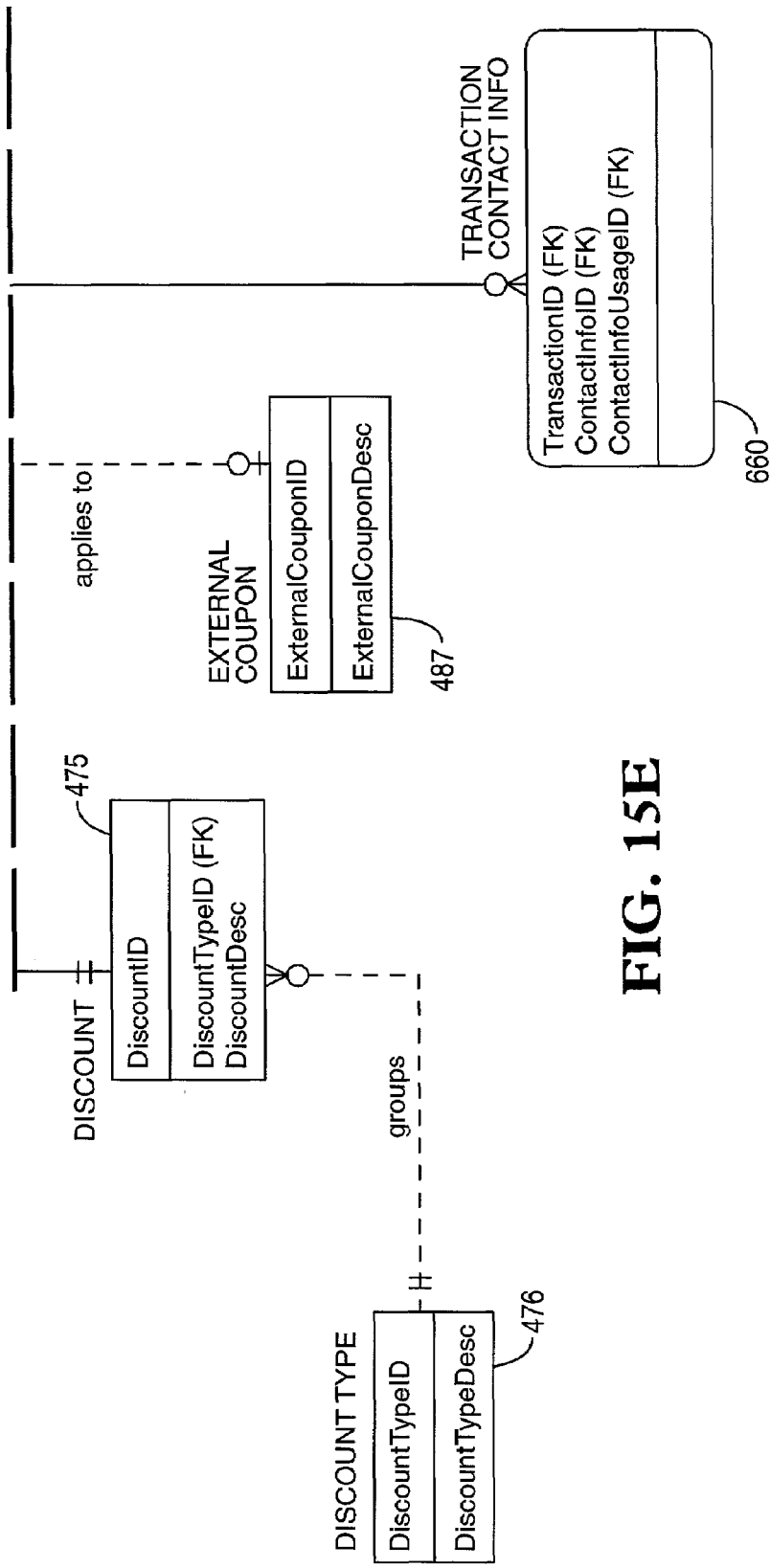

FIGS. 15A thorough 15E illustrate an entity-relationship diagram of the TRANSACTION ACTIVITY subject area. The TRANSACTION ACTIVITY stores information concerning a customer's interaction with the company involving the sale or return of an item and the price and discounts associated with that item. It maps customers to entries in the Address Area, the item(s) of interest, and the associate dealing with the customer.

The entities of the TRANSACTION ACTIVITY subject area are defined as follows:

APPROVAL STATUS (419) The outcome of a request for approval of a non-cash transaction from a financial ORGANIZATION. Examples include: confirm identity of INDIVIDUAL only, deny purchase, etc.

DISCOUNT (475) The types of reasons why the total tender required for a given purchase may be reduced. May be based on the total SALES TRANSACTION, or can be ITEM specific. Reasons for reduction may include: loyalty card, summer sale, 2-for-1 sale, etc.

DISCOUNT TYPE (476) Denotes types of discounts, which reduce the selling price that is normally charged as an expense to the STORE's general ledger. Can be applied by transaction line item or to the whole transaction.

EXTERNAL COUPON (487) An external coupon redeemed during a SHOPPING TRANSACTION. EXTERNAL COUPONs include 3rd party coupons, such as manufacturer's or competitor's coupons.

FULFILLMENT (492) The act of providing previously ordered or purchased ITEMs to a customer. It can be fulfilled by the enterprise or an external VENDOR, such as through drop shipment, etc.

FULFILLMENT LINE (493) The actual ITEMs contained in a FULFILLMENT.

FULFILLMENT STATUS (494) This entity represents the status of the FULFILLMENT to a customer. Possible values include: Complete Order On Time, Complete Order Late, Partial Order On Time, etc.

PARTY TRANSACTION (594) Contains information associating transactions to buyers and sellers.

PAYMENT LINE (600) A tender amount applied to a specific SALES TRANSACTION. One SALES TRANSACTION can have multiple PAYMENT LINES associated with it.

RETURN TRANSACTION LINE (630) Details PRODUCTs returned to a LOCATION by a customer for a refund or an exchange.

TRANS CHARGE TYPE (656) Defines the types of charges that are added to a SHOPPING TRANSACTION that are not related to any particular item. Charges may include: shipping, handling, insurance, overnight, etc.

TRANSACTION ACTIVITY (657) A single CUSTOMER interaction or transaction involving the sale or return of one or more ITEMs.

TRANSACTION ADJUSTMENT (658) Contains information concerning transaction adjustments.

TRANSACTION CHARGE (659) Revenue obtained from customers that are not ITEM related, such as shipping & handling, insurance, etc.

TRANSACTION CONTACT INFO (660) Information linking transactions to physical locations.

TRANSACTION DISCOUNT (661) An amount that reduces the total TENDER amount required from the customer for a given purchase. This could be due to an OFFER, coupon, sale, markdown, damaged merchandise, etc. It can be related to an entire SHOPPING TRANSACTION, or more specifically related to ITEMs in a SHOPPING TRANSACTION LINE. Example: The amount of $3.25 to be subtracted from total tender required due to the purchase of 750 ml Kahlua by a loyalty card member.

TRANSACTION DISCOUNT LINE (662) A cross-reference mapping a SHOPPING TRANSACTION DISCOUNT to the actual ITEMs that was purchased to qualify for the DISCOUNT and/or the ITEMs that received the DISCOUNT. Example: Cross-reference the full retail purchase of a 'six-pack of Coke a Cola' and the resultant 50% off 'Dodgers baseball cap' to the SALES DISCOUNT.

TRANSACTION LINE (664) The actual ITEMs purchased by a customer within a SALES TRANSACTION.

TRANSACTION LINE STATUS (665) This entity represents the status of a SHOPPING TRANSACTION LINE. It is used to determine whether items are currently in a shopping basket, have been dropped from the basket, or have been purchased.

TRANSACTION RESPONSE (666) Captures responses based on customer transactions.

TRANSACTION RESPONSE TYPE (667) Defines the various types of customer transaction response types.

TRANSACTION STATUS (668) Denotes the current phase of a SHOPPING TRANSACTION, such as: canceled order, abandoned shopping cart, shopping cart that had been converted into an order, etc.

TRANSACTION TYPE (669) Differentiates a SHOPPING TRANSACTION. TRANSACTION TYPEs may include: Web Shopping Cart, Web Wish-list, Store Sale, Catalog Order, etc.

VENDOR

The VENDOR subject area stores information about parties from which the company purchases goods and services. This includes information concerning purchase orders, returns, and items shipped directly to the company or drop shipped to a customer.

Figure 16A:
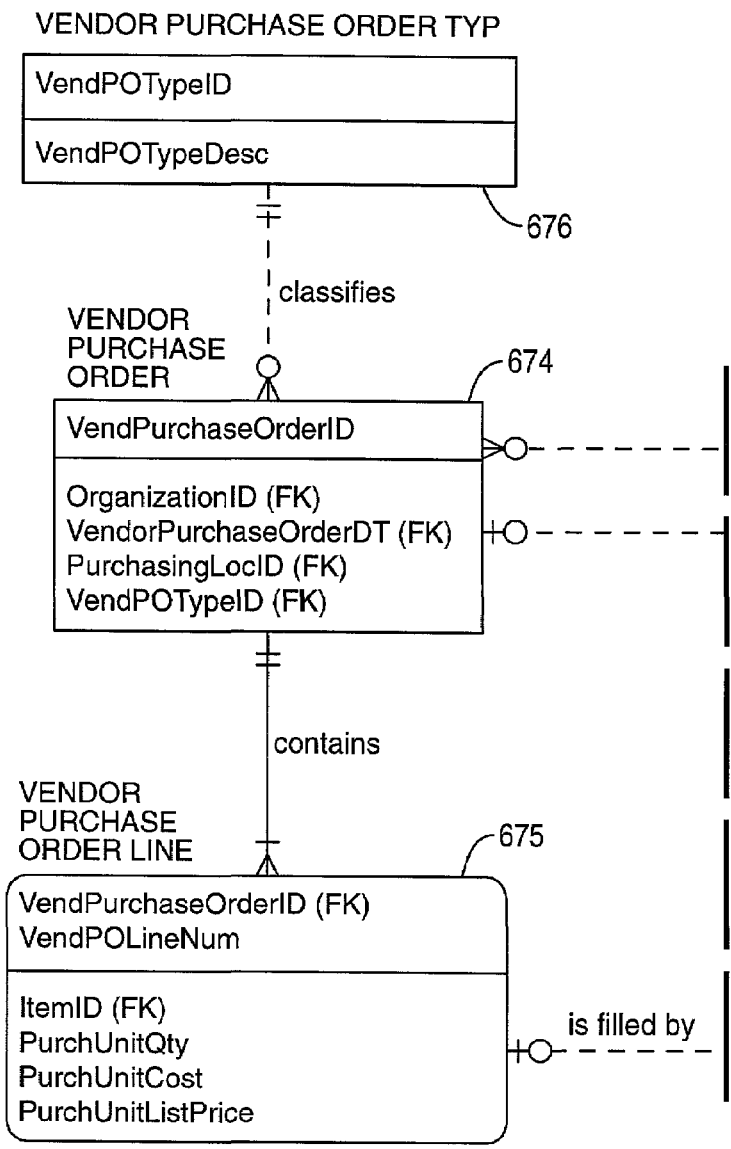
FIGS. 16A and 16B illustrate an entity-relationship diagram of the VENDOR subject area of the logical data model in accordance with the preferred embodiment of the present invention.
Figure 16B:
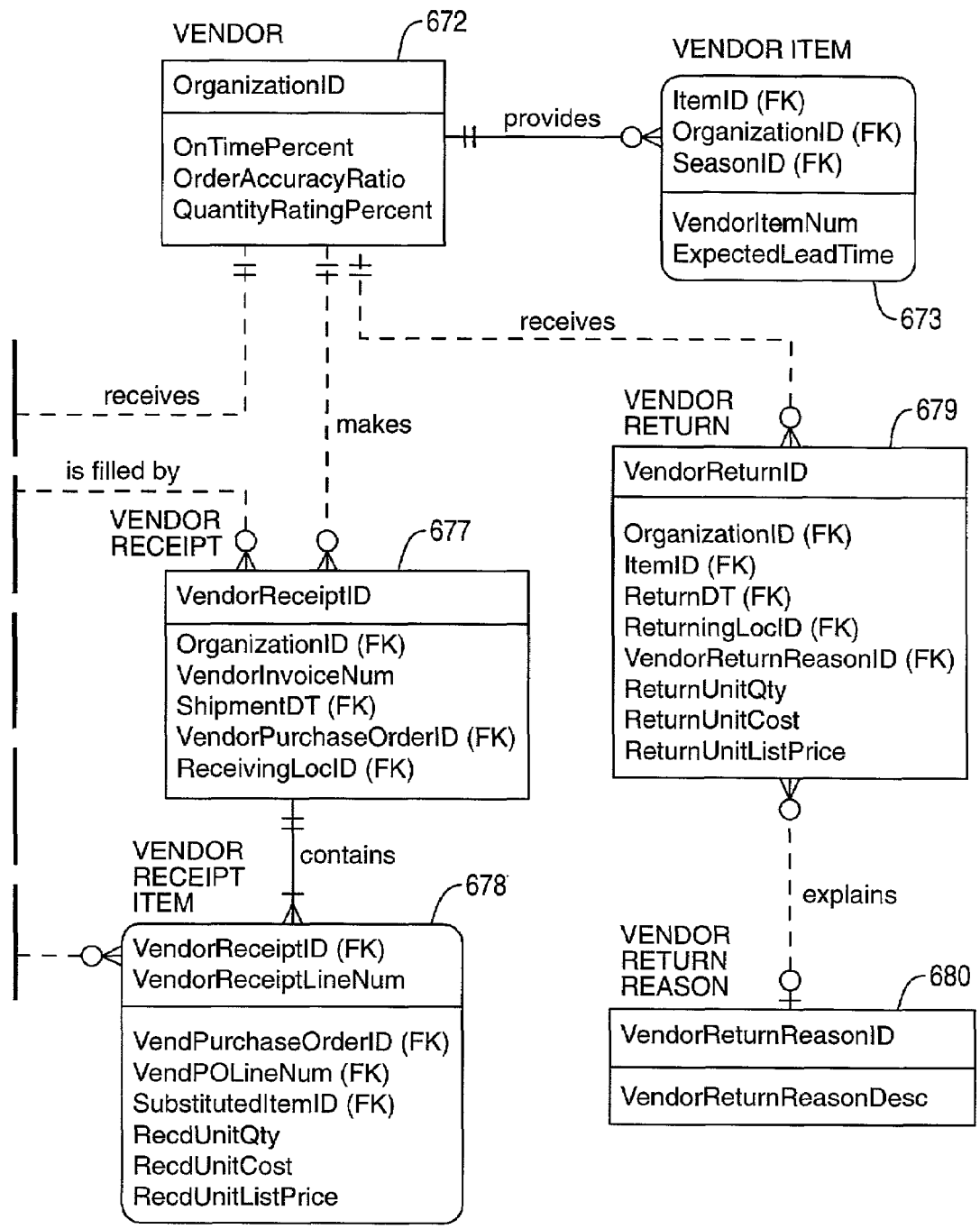
Figure 17A:
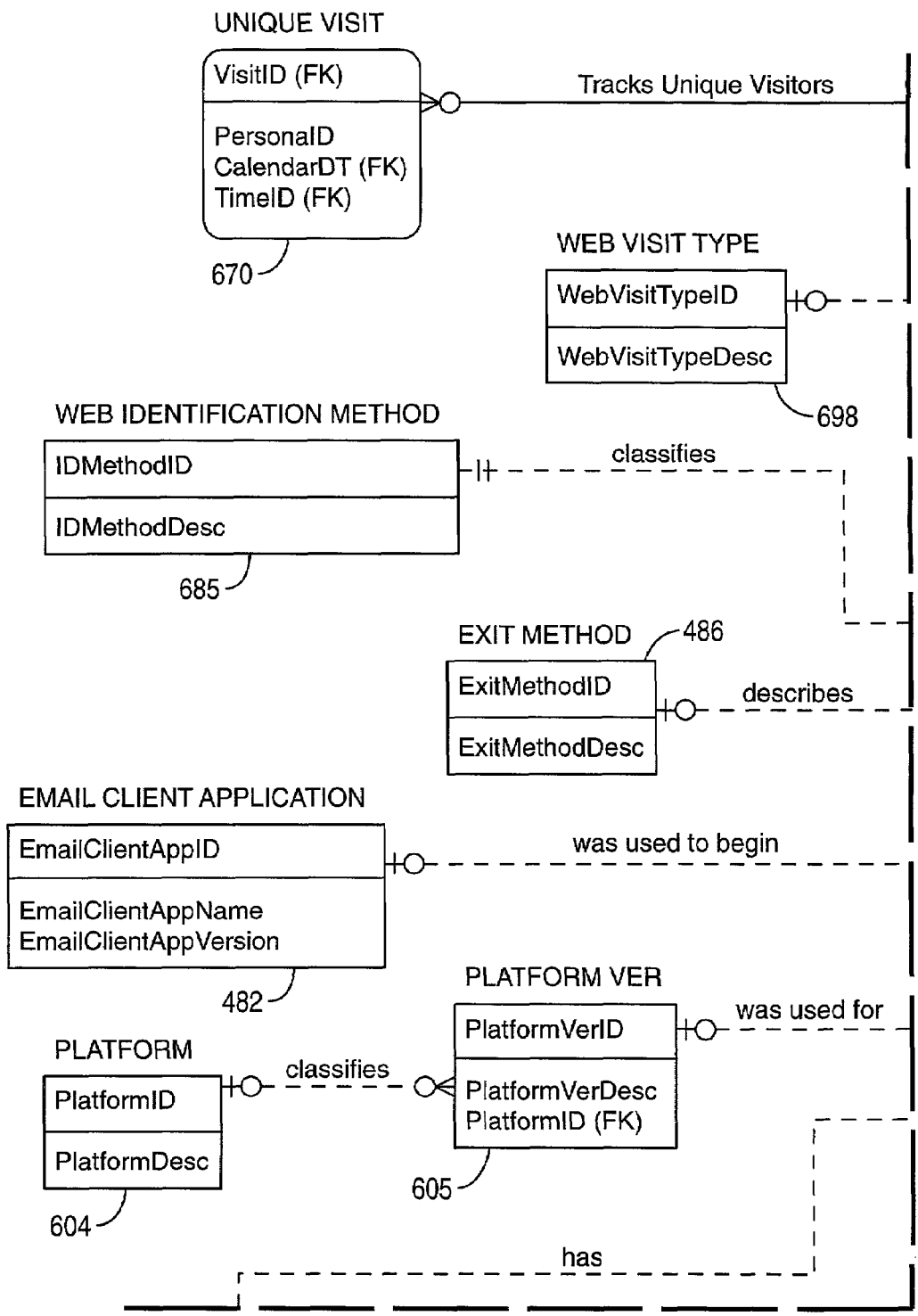
FIGS. 17A through 17F illustrate an entity-relationship diagram of the VISIT subject area of the logical data model in accordance with the preferred embodiment of the present invention.
Figure 17B:
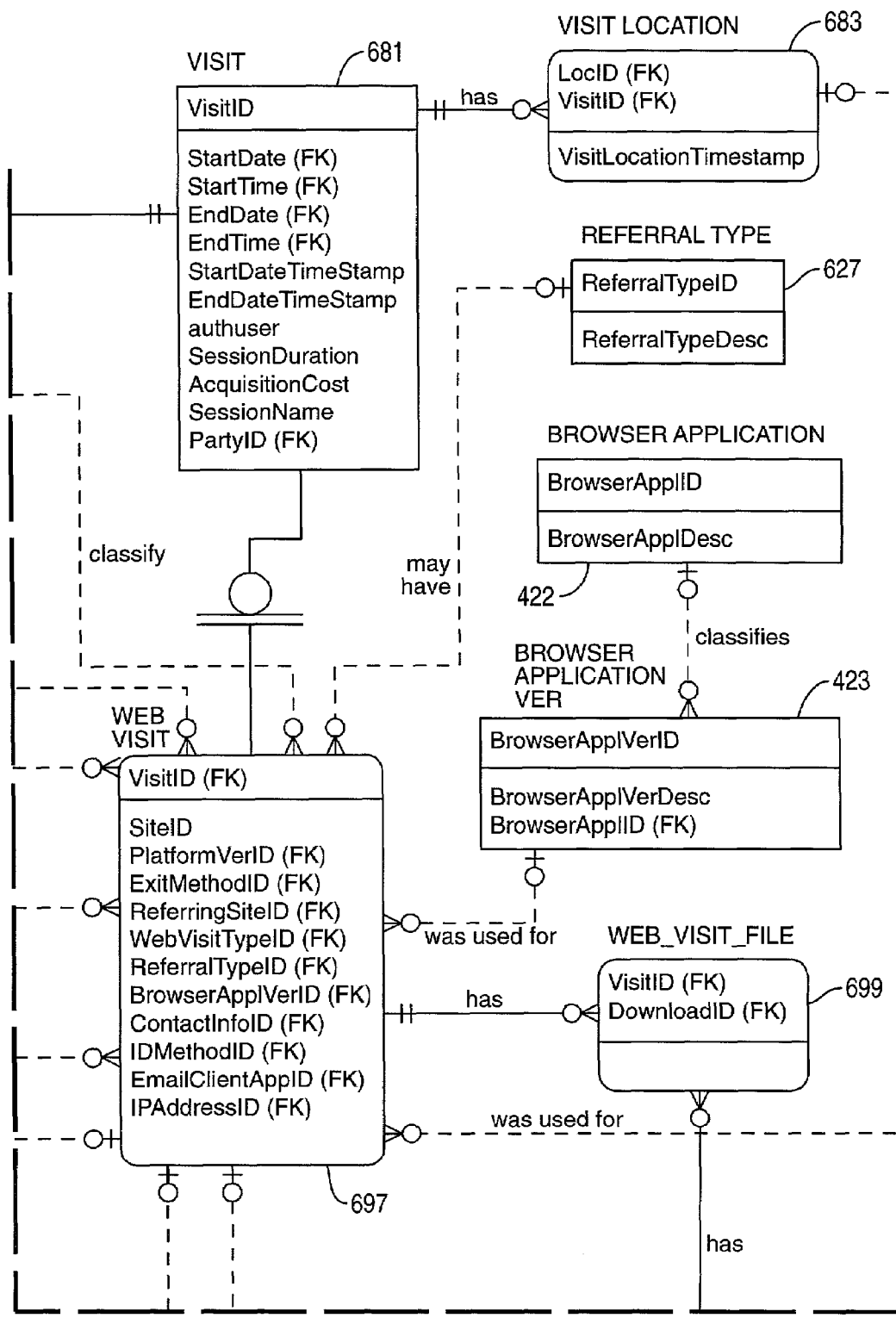
Figure 17C:
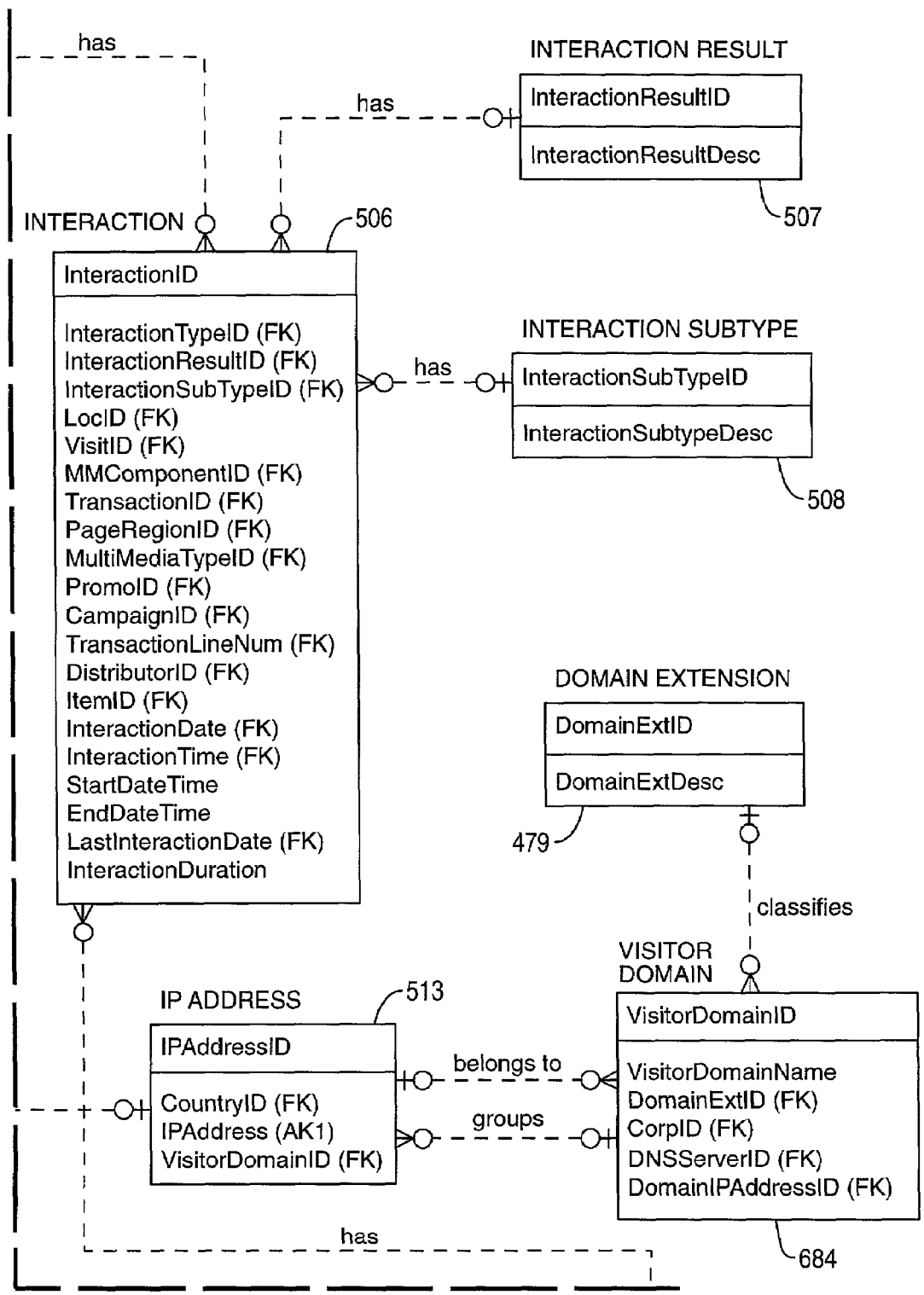
Figure 17D:
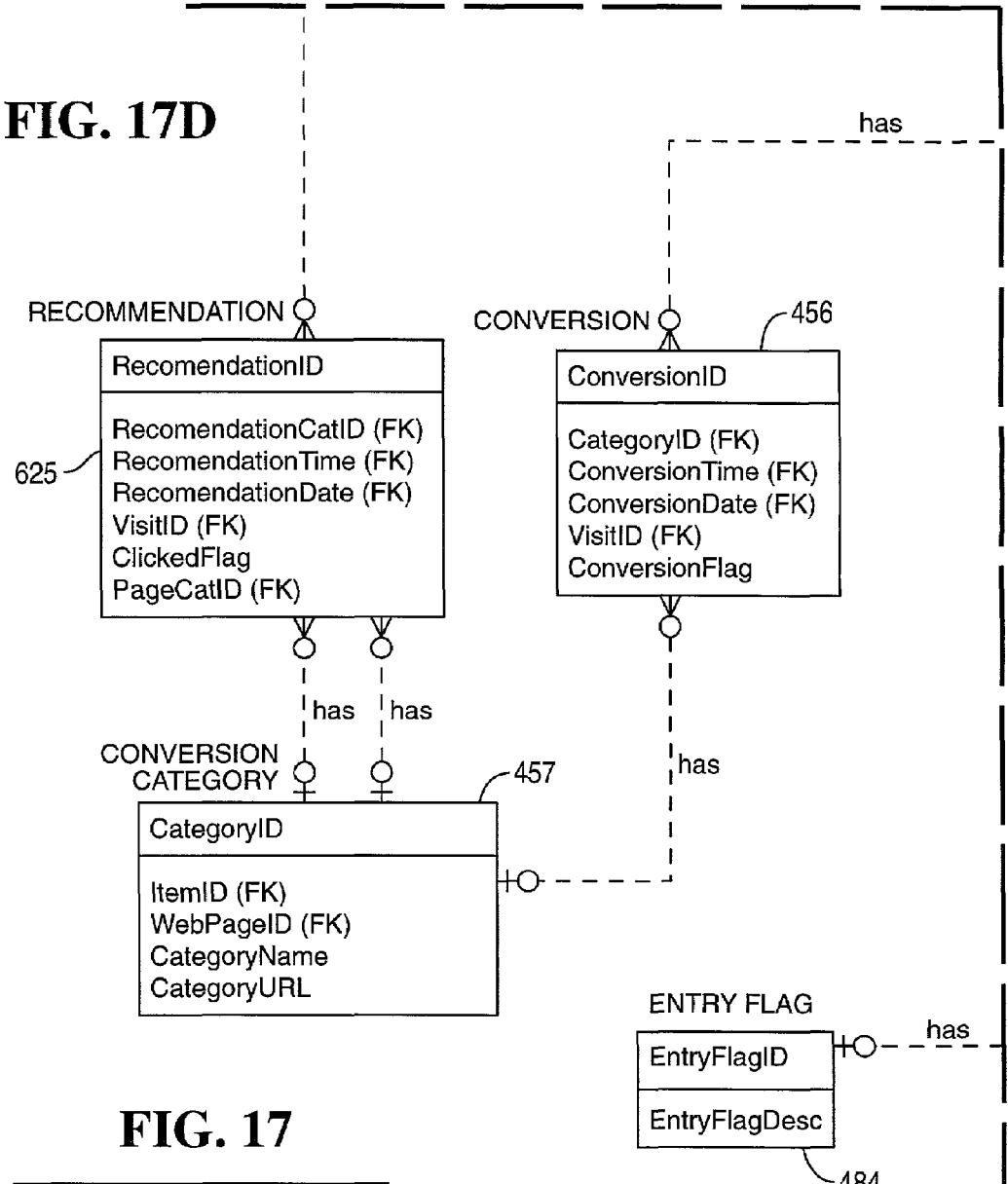
Figure 17:
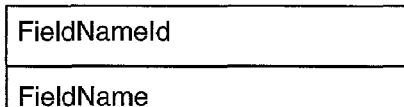
Figure 17E:
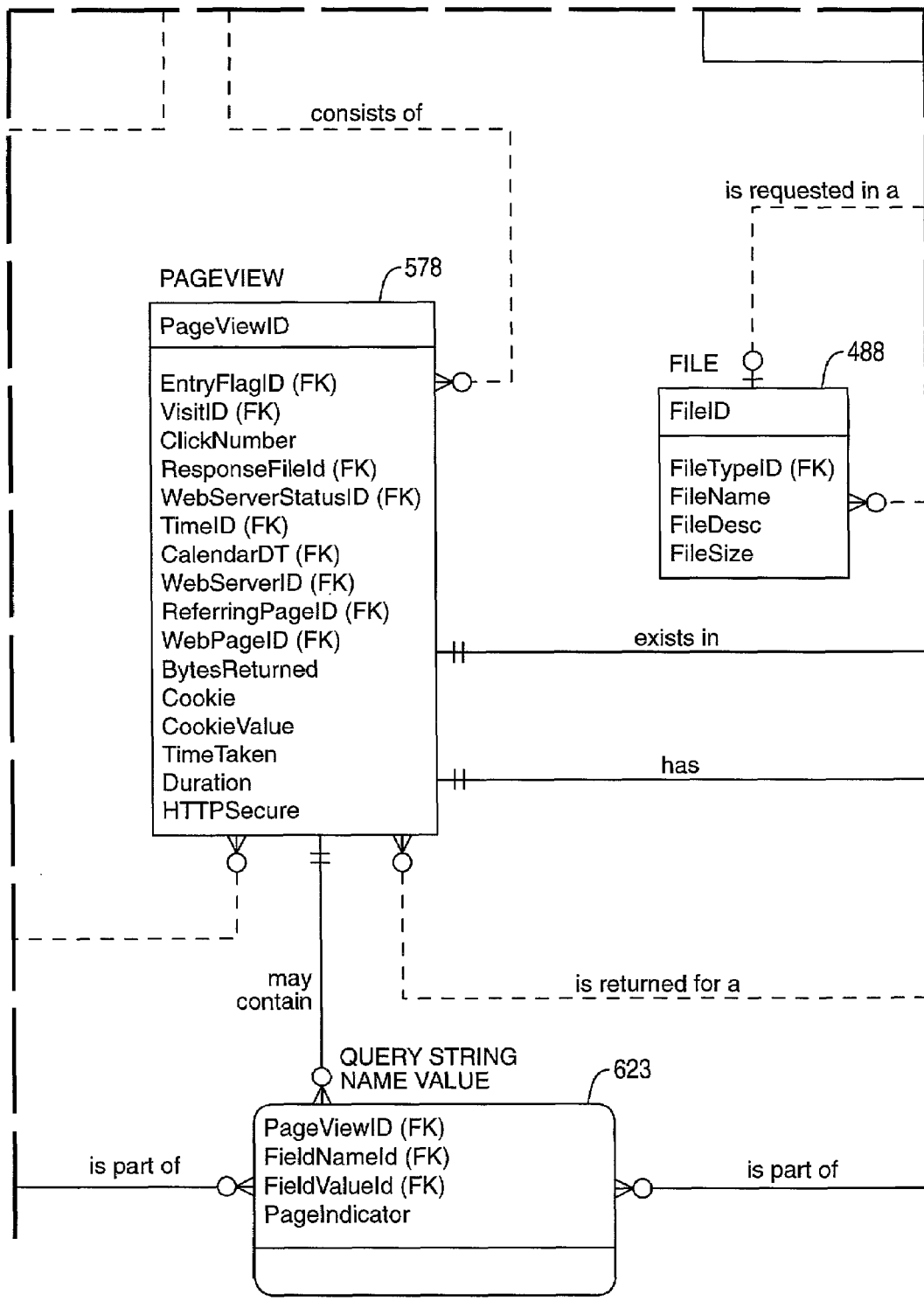
Figure 17F:
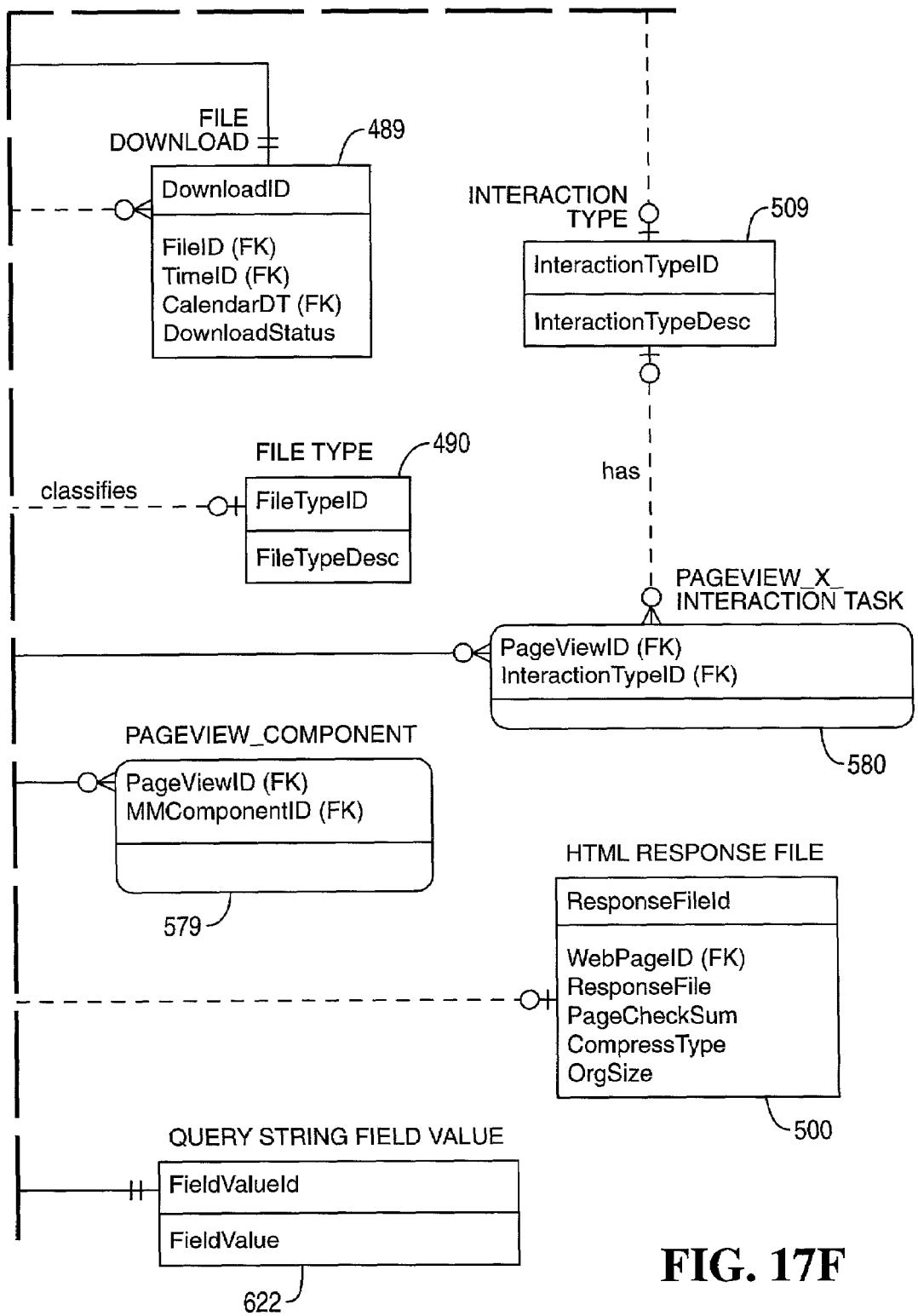
Figure 18A:
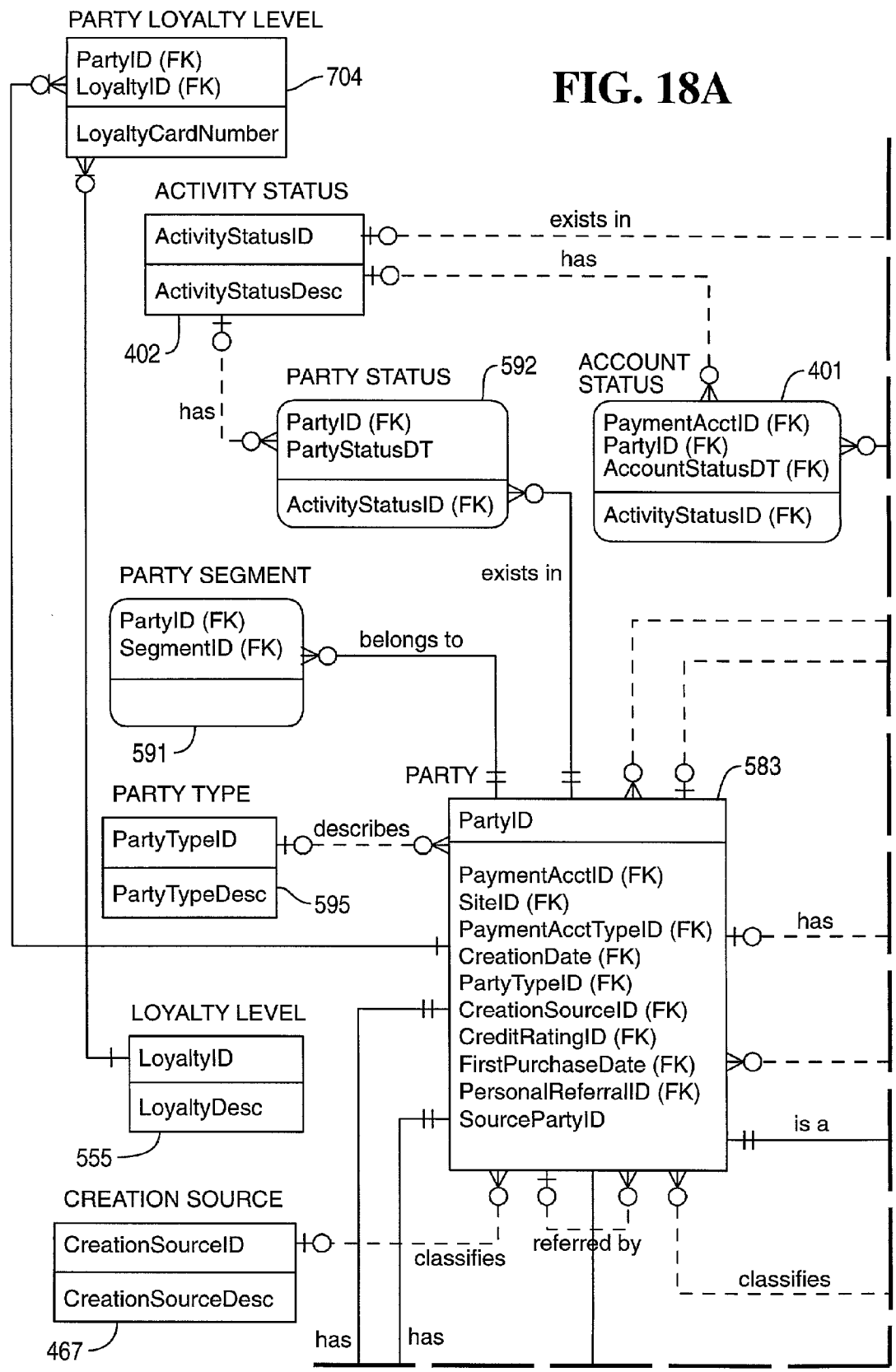
FIGS. 18A through 18E illustrate an entity-relationship diagram of the VISITOR subject area of the logical data model in accordance with the preferred embodiment of the present invention.
Figure 18B:
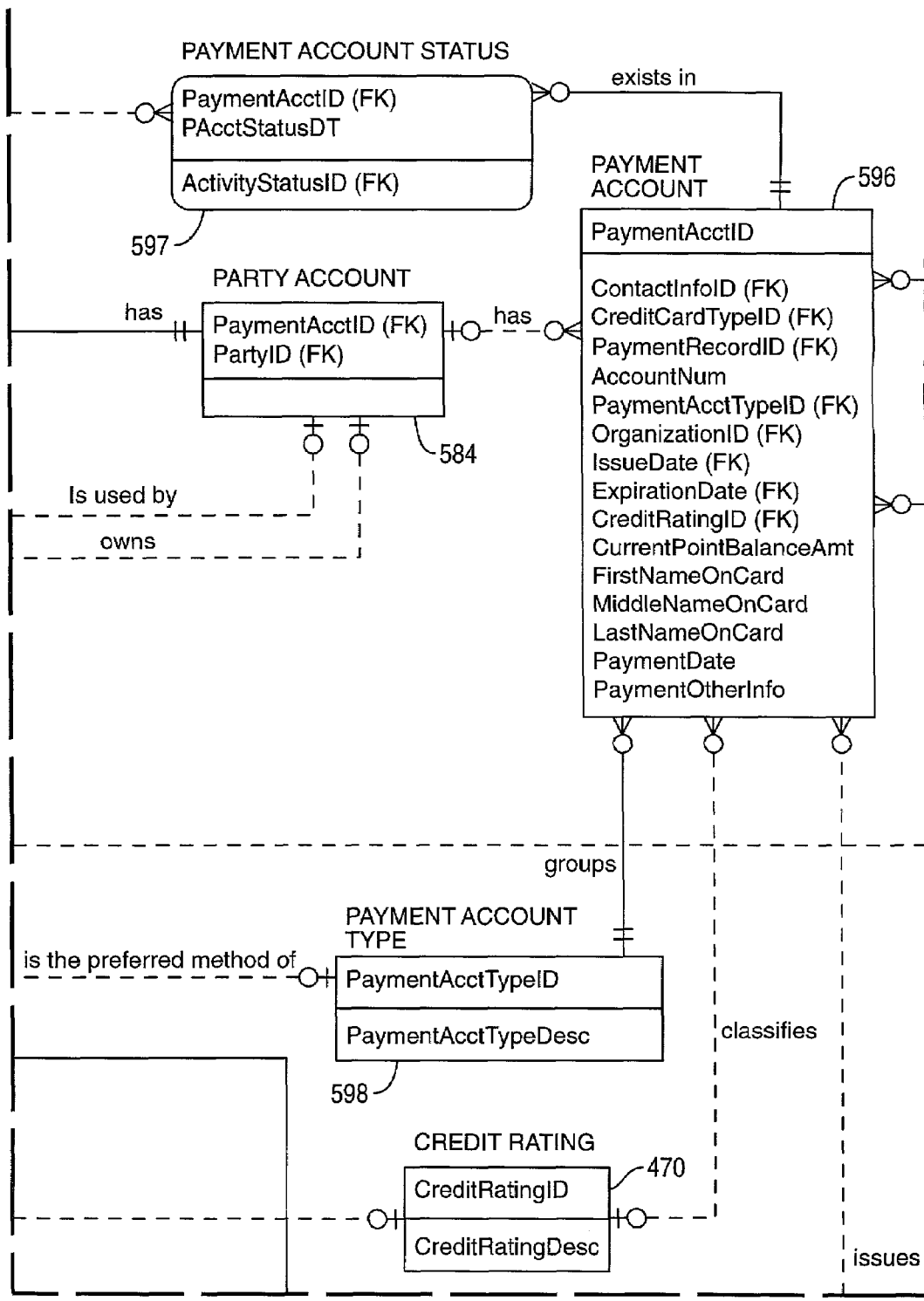
Figure 18C:
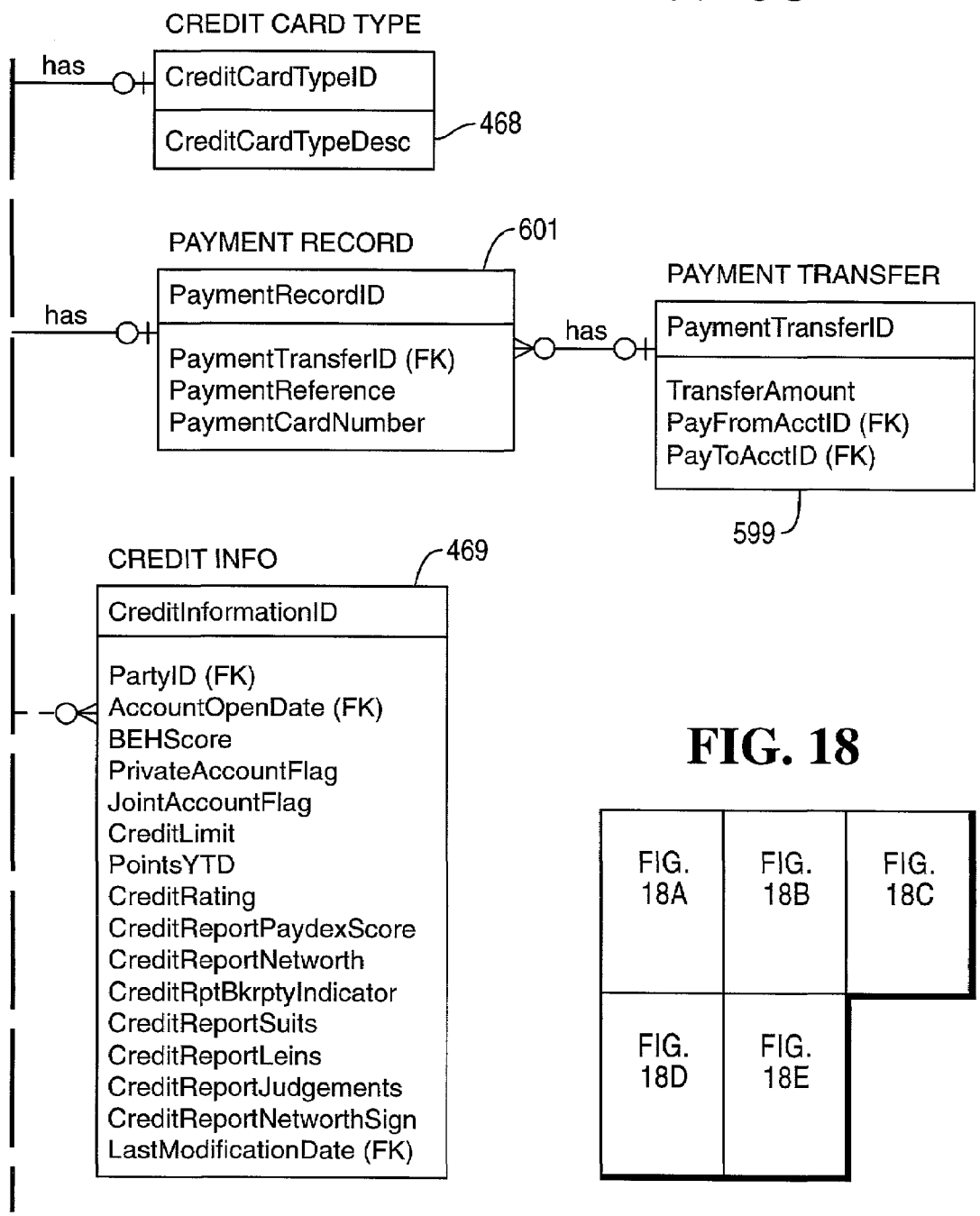
Figure 18:
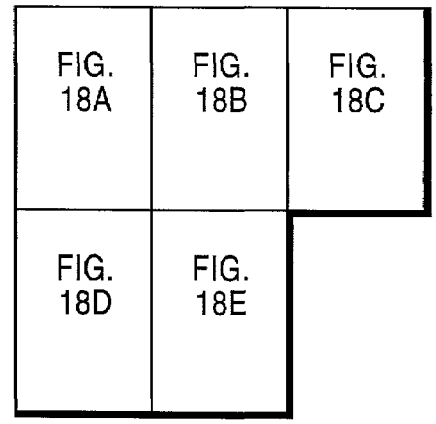
Figure 18D:
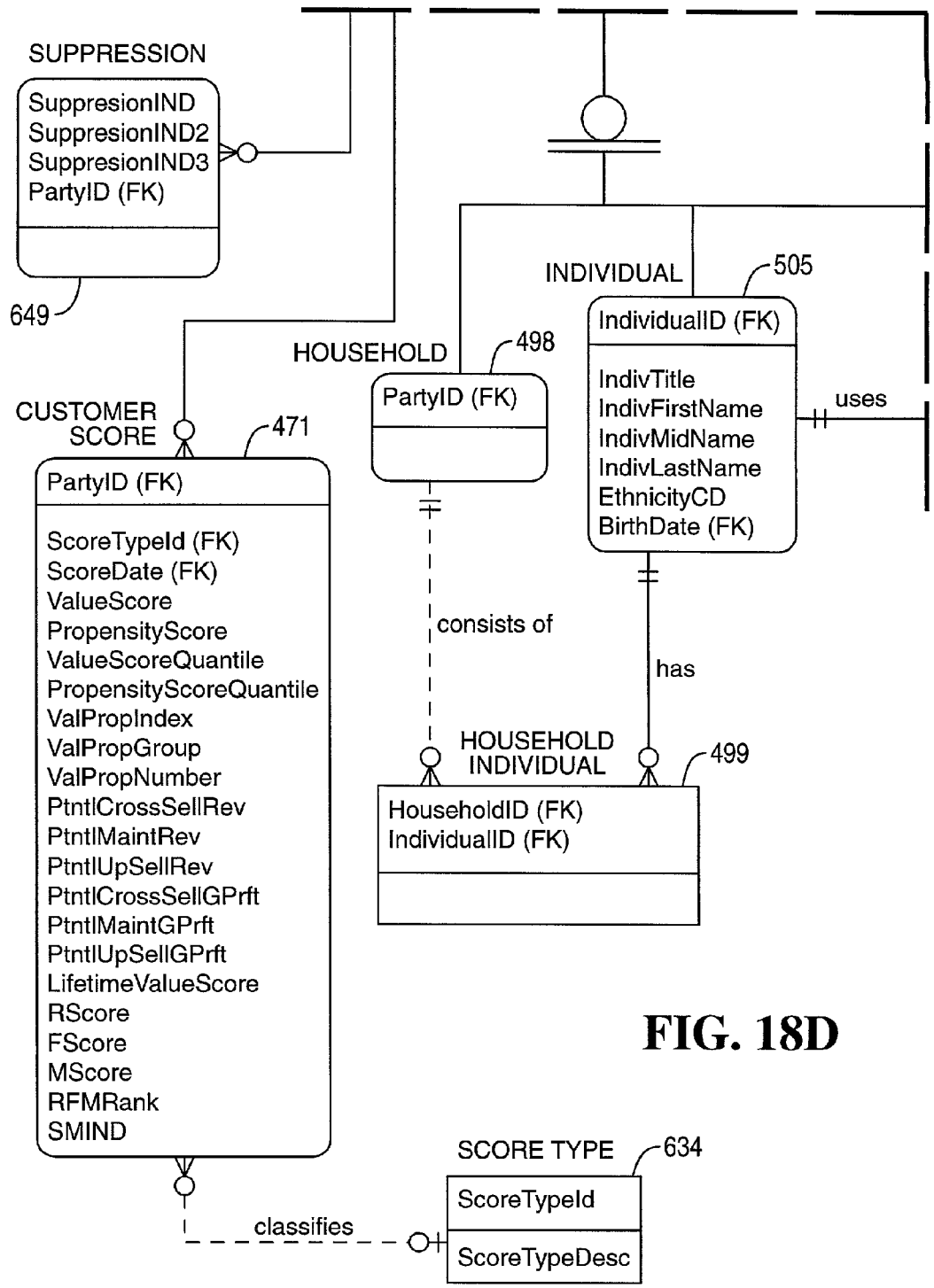
Figure 18E:
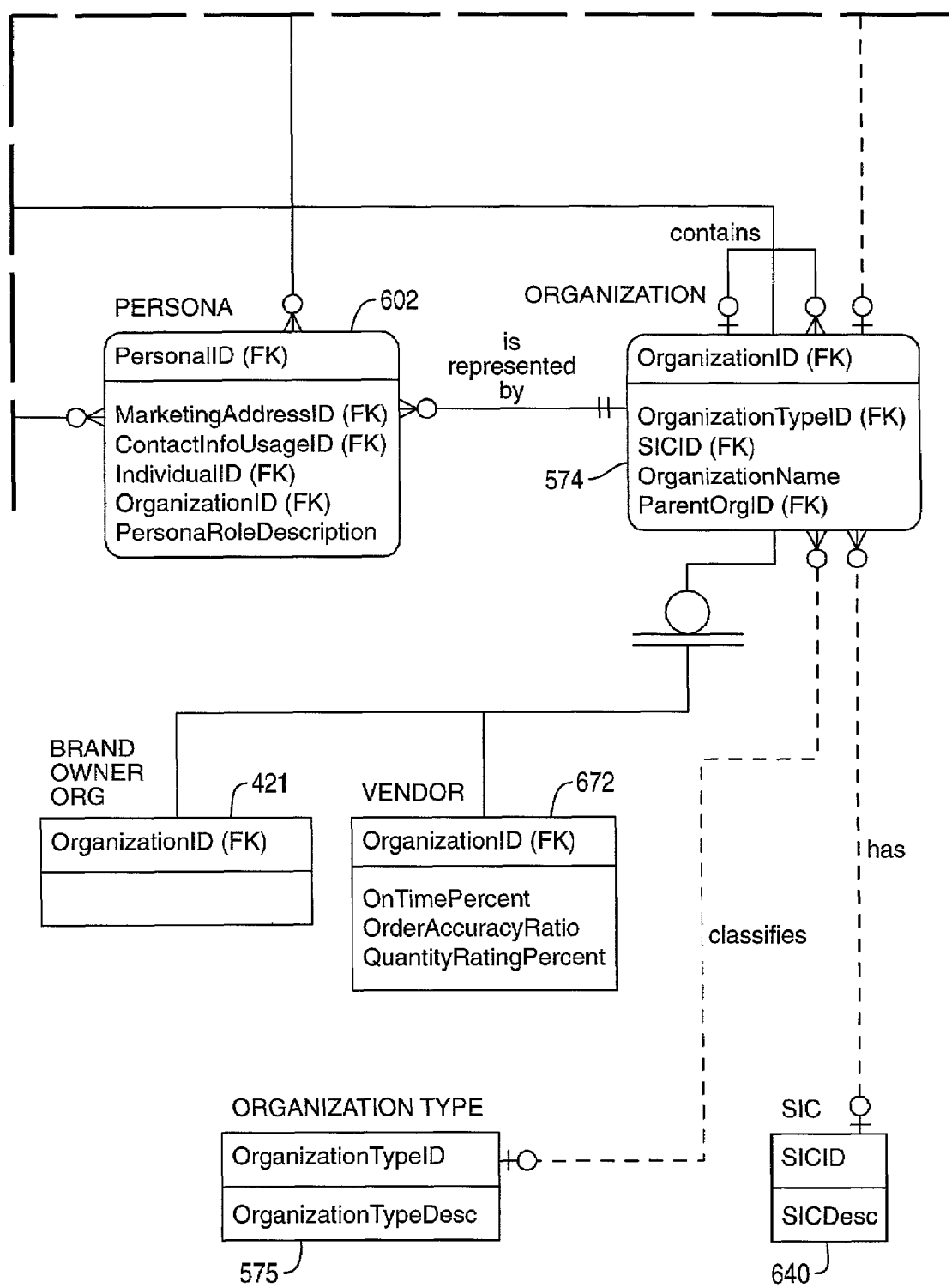

The entities of the VENDER subject area, illustrated in FIGS. 16A and 16B, are defined as follows:

VENDOR (672) An identifier of an ORGANIZATION that supplies ITEMs to a company. This ID is mapped to a party ID. This ID can represent an individual or a business.

VENDOR ITEM (673) Identifies which ITEMs can be obtained from which VENDORs.

VENDOR PURCHASE ORDER (674) Represents an order placed by the enterprise for ITEMSs to be supplied by a VENDOR.

VENDOR PURCHASE ORDER LINE (675) The detail line on the VENDOR PURCHASE ORDER that provides information about the ITEM being ordered.

VENDOR PURCHASE ORDER TYP (676) Distinguishes the various types of PURCHASE ORDERs.

VENDOR RECEIPT (677) A shipment of ordered goods from a VENDOR to the enterprise.

VENDOR RECEIPT ITEM (678) Information about a specific ITEM contained in a VENDOR RECEIPT.

VENDOR RETURN (679) ITEMs returned to the VENDOR, due to damage or malfunctioning of the ITEM.

VENDOR RETURN REASON (680) Establishes the reasons why an ITEM may be returned to a VENDOR. Reasons for return may include: damaged, incorrect item, etc.

VISIT

The VISIT subject area stores information concerning a customer's history at a virtual store's web site. Included would be information about the ads that triggered the visit, the web pages browsed, and the items of interest to the consumer.

The entities of the VISIT subject area, illustrated in FIGS. 17A through 17F, are defined as follows:

BROWSER APPLICATION (422) This entity represents the internet browser application software family the client is running. For example: Internet Explorer, Netscape.

BROWSER APPLICATION VER (423) This entity represents the application and version of the internet browser that the client is using to view the web site. Examples include: Internet Explorer 5.0, Netscape 4.06.

CONVERSION (456) This table contains a record for the conversions that were recommendations from the recommendation engine. This table is provided to support integration with recommendation engines and does not imply TSEB functions as a recommendation engine.

CONVERSION CATEGORY (457) Contains information concerning the linkage between recommended items and the web page the item was displayed on.

DOMAIN EXTENSION (479) This entity represents the extension of the name of the domain server. For example: .com, .net, org.

EMAIL CLIENT APPLICATION (482) This entity represents the email application used by a client to read and send email, such as Microsoft Outlook Express 5.0.

ENTRY FLAG (484) Describes the order of the pages viewed during a web visit, such as first page, exit page, intermediate page.

EXIT METHOD (486) This entity represents the method by which the user left a web site. This would have the value 'timeout' for most visits, but other values could be defined for explicit actions that result in a user exiting the site.

FILE (488) The entity represents an electronic file, for example song .mp3 file, a document .pdf file, etc.

FILE DOWNLOAD (489) The entity represents the request from a user to download a file from a web site.

FILE TYPE (490) The entity represents the types by which a FILE may be classified. Common file types include EXE, MP3, PDF, etc.

HTML RESPONSE FILE (500) This entity represents the actual HTML file that is returned to the user as a result of a click.

INTERACTION (506) This entity represents activities that occur during a visit that can not be directly tied to a CLICK or set of CLICKs during a VISIT.

INTERACTION RESULT (507) Information regarding interaction results.

INTERACTION SUBTYPE (508) Information regarding interaction sub types.

INTERACTION TYPE (509) Describes the various types of interactions users can have with an enterprise.

IP ADDRESS (513) This entity represents the Internet Protocol address the client requests are coming from.

PAGEVIEW (578) Loaded from weblog unless a customer has a database with this information such as Broadvisision.

PAGEVIEW_COMPONENT (579) This table lists all the components downloaded by this PageView.

PAGEVIEW_X_INTERACTION TASK (580) This table is the output of an application that can examine the interactions associated with each click and determine their outcome, e.g., purchase, abandonment etc.

PLATFORM (604) This entity represents the operating system platform family that the client is running. Examples: Windows 9x, Windows NT, Mac, UNIX.

PLATFORM VER (605) This entity represents the operating system platform and version the client is using. Examples: Windows 98, Windows NT 4.0.

QUERY STRING FIELD NAME (621) This entity represents the domain of parameter names that may appear in the query string of a URL for a WEB PAGE.

QUERY STRING FIELD VALUE (622) This entity represents the domain of parameter values that may appear in the query string of a URL for a WEB PAGE.

QUERY STRING NAME VALUE (623) This entity stores the relationship between PageViews, QUERY STRING FIELD NAMEs and QUERY STRING FIELD VALUEs. It holds the set of name-value pairs from the query string of the URL that is associated with this PageView. The name-value pairs often include elements such as search parameters.

RECOMMENDATION (625) This table contains a record for each recommendation that was made by the recommendation engine. This table is provided to support integration with recommendation engines and does not imply TSEB functions as a recommendation engine.

REFERRAL TYPE (627) An entity used for classifying referrals into various sub-types such as email referrals, e-location referrals, etc. UNIQUE VISIT (670) If a cookie does not exist in partyID then the visit is unique. If unique, then cookie_value is inserted in party.partyID.

VISIT (681) A period of time that a PERSON spends at a LOCATION.

VISIT LOCATION (683) Contains information linking visits to locations.

VISITOR DOMAIN (684) This entity stores information about IP addresses from which customers access a retailer's web site. This is useful in providing summary level information about various access points for customers such as internet service providers, public access terminals, companies, universities, government sites, etc. The information can be useful in selecting advertisements and designing promotions.

WEB IDENTIFICATION METHOD (685) This entity represents the method by which the PARTY was identified for a WEB VISIT.

WEB VISIT (697) Loaded from weblog unless customer has a database with this information such as Broadvisision.

WEB VISIT TYPE (698) This entity represents a classification of the result derived from a WEB VISIT. Possible values include: Browse, 1st Purchase, Repeat Purchase, etc.

WEB_VISIT_FILE (699) This associative table stores all the files downloaded during a visit.

VISITOR

FIGS. 18A through 18E illustrate an entity-relationship diagram of the VISITOR subject area. The VISITOR subject area captures information about the users involved in web transactions and/or interactions. This area maintains information about customer's payment accounts, and household and organizational affiliations, and it maps customers to entries in the Address and Demographics Subject Areas.

The entities of the VISITOR subject area are defined as follows:

ACCOUNT STATUS (401) Information regarding account statuses.

ACTIVITY STATUS (402) This entity stores the valid states of an entity. Valid states can be active, inactive, or deleted.

BRAND OWNER ORG (421) The ORGANIZATION that created, owns, and controls a specific BRAND. For example: Nabisco, Victoria's Secret, Pepsi Co., etc.

CREATION SOURCE (467) An indication of how and where information about the existence of a PARTY is first obtained. Sources include: a purchased prospect list, the PARTY requested a catalog through the business's website, etc.

CREDIT CARD TYPE (468) Describes a kind of credit card, such as Visa, MC, Diners, etc.

CREDIT INFO (469) Information regarding party entities credit histories.

CREDIT RATING (470) Internal or external methods for classifying a PARTY's or a PAYMENT ACCOUNT's credit worthiness. Entries may include: do not extend credit to this person, low risk, high risk, TRW score.

CUSTOMER SCORE (471) This entity represents the score a customer is given based on their previous behavior, and represents their likelihood to perform some other action.

HOUSEHOLD (498) A grouping of INDIVIDUALs for marketing purposes. They typically live at the same ADDRESS and have biological ties, such as family members, e.g., the Simpson family.

HOUSEHOLD INDIVIDUAL (499) A grouping of INDIVIDUALs for marketing purposes. They typically live at the same ADDRESS and have biological ties. For example: Homer, Marge, Lisa, Bart, and Maggie.

INDIVIDUAL (505) Any human being of interest to the enterprise.

LOYALTY LEVEL (555) Loyalty program information.

ORGANIZATION (574) A sub-type of PARTY. Multiple INDIVIDUALs who have organized into a formal group for a common purpose.

ORGANIZATION TYPE (575) Information regarding organization types.

PARTY (583) Any INDIVIDUAL, HOUSEHOLD, or ORGANIZATION of interest to the enterprise.

PARTY ACCOUNT (584) Information regarding accounts.

PARTY LOYALTY LEVEL (704) Loyalty program information.

PARTY PAYMENT ACCOUNT (589) Information linking party entities to payment accounts.

PARTY SEGMENT (591) A cross-reference of the actual PARTYs contained in a specific SEGMENT.

PARTY STATUS (592) This entity maintains the relationship between a PARTY and a PARTY STATUS to allow tracking of the history as the PARTY STATUS of a PARTY changes.

PARTY TYPE (595) Contains information regarding party entity types.

PAYMENT ACCOUNT (596) An account established by a PARTY with an ORGANIZATION, typically to facilitate and enable the transfer of funds.

PAYMENT ACCOUNT STATUS (597) This entity maintains the relationship between a PAYMENT ACCOUNT and an ACTIVITY STATE to allow tracking of the history as the ACTIVITY STATE of a PAYMENT ACCOUNT changes.

PAYMENT ACCOUNT TYPE (598) Describes a kind of PAYMENT ACCOUNT, for example: Check, Credit Card, Loyalty Card, etc.

PAYMENT TRANSFER (599) This table contains account number information for both source and destination accounts.

PAYMENT RECORD (601) This table contains records detailing the transfer of funds between two businesses.

PERSONA (602) The 'role' an INDIVIDUAL is playing while interacting with the enterprise, typically in association with an ORGANIZATION. For example, INDIVIDUAL Jill may posses two different PERSONAs: Jill may order ITEMs in her capacity as 'owner' of 'Jill's Dog Grooming Co.', or Jill may call about a problem with an order in her capacity as a 'buyer' for ABC Corporation.

SCORE TYPE (634) Describes the type of technology used to generate the score, e.g., CART, Decision Tree, CHAD etc.

SIC (640) Standard Industry Classification Codes. A way to indicate the type of business an ORGANIZATION is. Used for segmentation purposes by the marketing industry.

SUPPRESSION (649) CRM support table linking suppression information to party entities.

VENDOR (672) An identifier of an ORGANIZATION that supplies ITEMs to a company. This ID is mapped to a party ID. This ID can represent an individual or a business.

WEB SERVER

The WEB SERVER subject area provides summary information, operational metrics and errors about the physical server devices servicing a given web visit by a customer.

Figure 19:
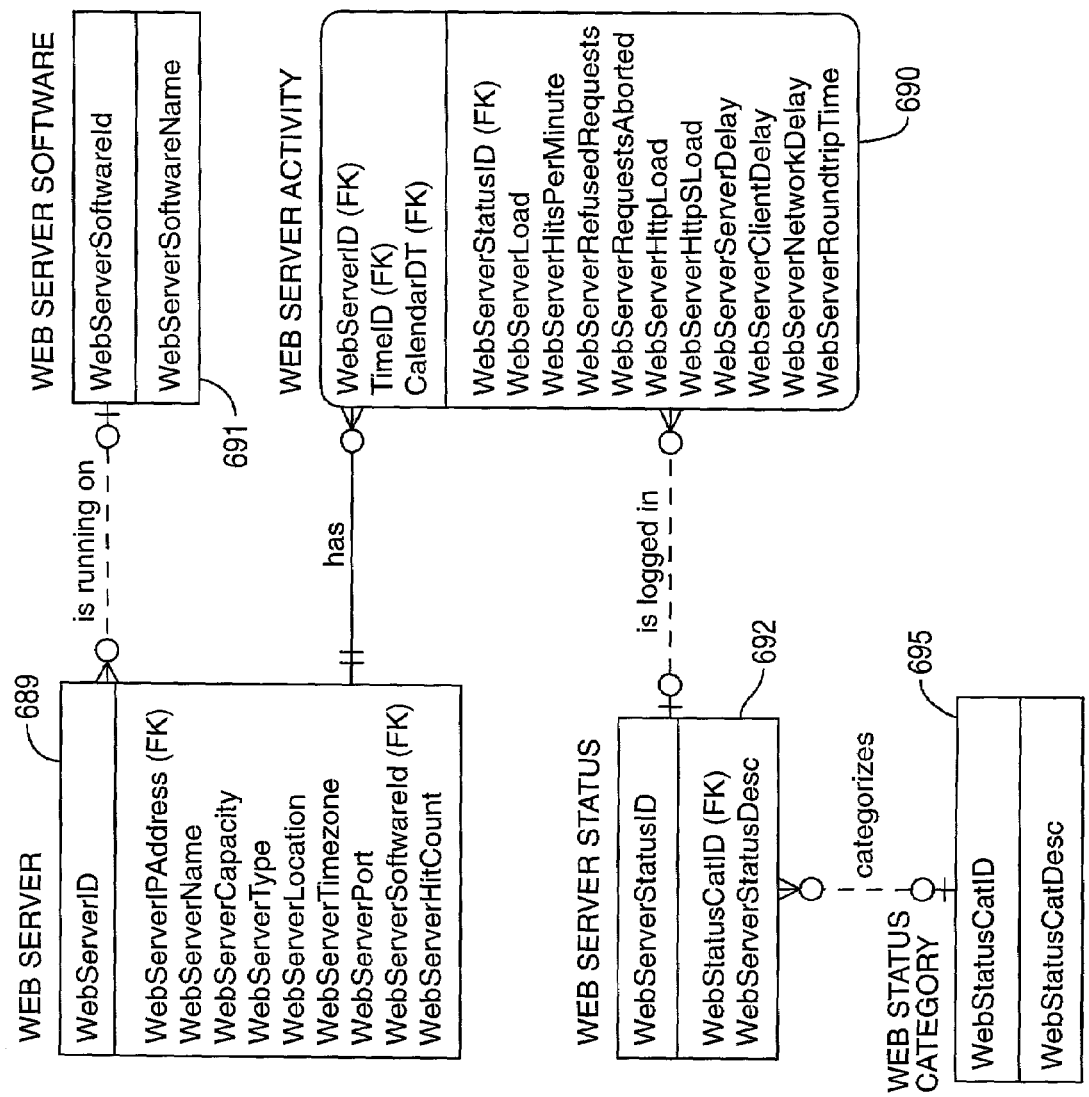
FIG. 19 is an entity-relationship diagram of the WEB SERVER subject area of the logical data model in accordance with the preferred embodiment of the present invention.

The entities of the WEB SERVER subject area, illustrated in FIG. 19, are defined as follows:

WEB SERVER (689) Provides summary information about the physical server devices servicing a WEB VISIT.

WEB SERVER ACTIVITY (690) Provides WEB SERVER operational metrics.

WEB SERVER SOFTWARE (691) Captures information about the software being utilized by the web server.

WEB SERVER STATUS (692) An entity used to provide information about WEB SERVER errors.

WEB STATUS CATEGORY (695) Domain for Web Server error categories such as: Unknown, Informational, Successful, Redirection, Client Error.

WEB SITE

The WEB SITE subject area stores information about the company's web sites including page components, page generation, and web page type.

Figure 20A:
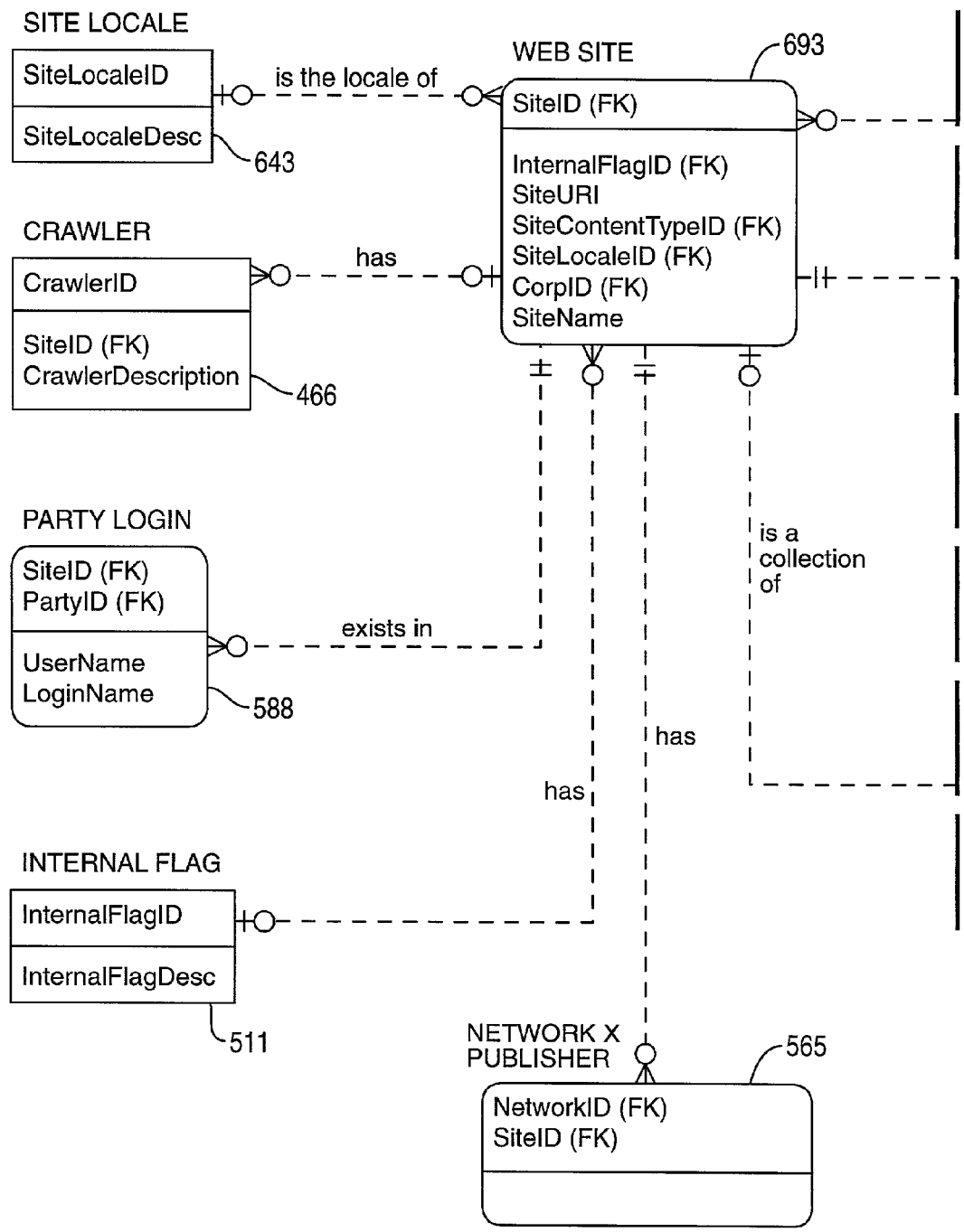
FIGS. 20A and 20B illustrate an entity-relationship diagram of the WEB VISIT subject area of the logical data model in accordance with the preferred embodiment of the present invention.
Figure 20B:
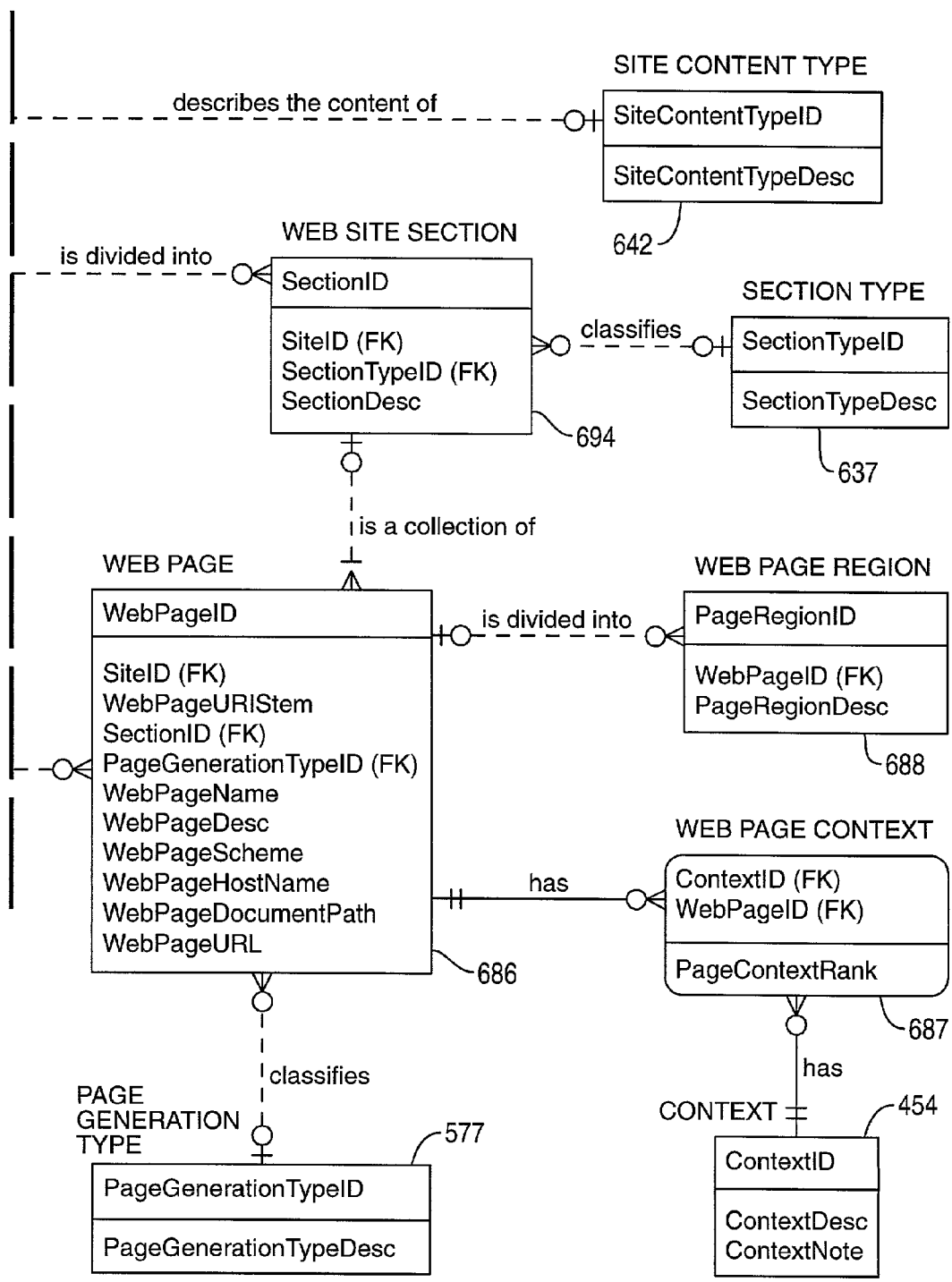

The entities of the WEB SITE subject area are, illustrated in FIGS. 20A and 20B, are defined as follows:

CONTEXT (454) Contains the business intent represented by web pages.

CRAWLER (466) This table contains a list of crawler sites that have visited the web site of the business entity.

INTERNAL FLAG (511) Usage of this table is customer specific.

NETWORK X PUBLISHER (565) A cross-reference of the actual PUBLISHERs contained in a specific NETWORK.

PAGE GENERATION TYPE (577) This entity is used to classify the method involved in generating a web page. For example: static versus dynamic page.

PARTY LOGIN (588) This entity represents the login information of a PARTY. This entity supports tracking of a PARTY's login names for multiple web sites.

SECTION TYPE (637) This entity represents a classification of the content for a WEB SITE SECTION similar to sections of a newspaper. A WEB SITE may be divided into several sections based on the content of the pages. For example, one section may be sports related content while another may be finance related.

SITE CONTENT TYPE (642) This entity represents a classification of the content of a WEB SITE. Possible SITE CONTENT TYPEs include Sports, News, Portal, etc.

SITE LOCALE (643) This entity represents the nationality or locale the a WEB SITE is designed for, e.g., Yahoo Germany or Yahoo Spain.

WEB PAGE (686) Source: Weblog->URL_Stem Frame presented after a click. It will be identified as any URL in the click records which does not have a component suffix with a web_page flag to be set in weblog. URLs in weblog->referrer_origin are recorded here also, as they are referenced in the click table.

WEB PAGE CONTEXT (687) Links the context for which the web page is being rendered.

WEB PAGE REGION (688) This entity represents areas in which a WEB PAGE may be divided. Examples include: TOP, BOTTOM, TOP-LEFT.

WEB SITE (693) This entity represents a collection of WEB PAGES under a single domain name.

WEB SITE SECTION (694) This entity represents divisions of a WEB SITE, such as Yahoo Sports or Yahoo Finance, in order to divide large WEB SITES into smaller divisions of related WEB PAGES that contain similar content.

CONCLUSION

The Figures and description of the invention provided above reveal a flexible relational data model for E-Business businesses. The E-Business Logical Data Model design enables the capturing of detail profile data concerning businesses web site visitors. By utilizing this data model, businesses are able to uncover deeper segmentation and visitor usage patterns. Information concerning all visitor preferences is captured, including online viewing and shopping habits, personal profile characteristics and general visitor activities. Additionally, the model allows historical analysis of visitor profile information for specific time periods, i.e. a visitor can have a different set of profile metrics for the first 2 weeks of a month verses the last two.

By capturing detail visitor profile information, an E-Business retailer is able to obtain a comprehensive view of the web site visitor behavior and better segmentation of businesses web site visitors. Additionally, this customer profile information can be used to plan marketing strategies targeting certain market segments. This detail information, collected and organized primarily in the PROFILE and VISITOR subject areas of the E-LDM, allows businesses to gain insight into the businesses' visitor behaviors, segmentation and preferences.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A database system for storing profile data related to web site visitors to a web store web site operated by an E-Business retailer, said profile data being organized within said database system in accordance with a logical data model, said logical data model comprising a plurality of entities and relationships defining the manner in which said profile information is stored and organized within said database system, wherein said profile information includes at least one information type selected from the group consisting of:
   information concerning occupations of said visitors;
   information concerning income levels of said visitors;
   information concerning educational levels of said visitors;
   marital status information about said visitors;
   gender information about said visitors;
   ethnicity information about said visitors;
   residence information about said visitors; and
   language information about said visitors.

2. A customer relationship management system for storing and managing information for an E-Business retailer, said customer relationship management system comprising:
   a database for storing and organizing said information;
   a logical data model defining the manner in which said information is stored and related within said database; and
   a subject area within said logical data model defining the manner in which profile information concerning web site visitors to a web store web site operated by said E-Business retailer is stored and organized within said database;
   wherein said profile information includes at least one information type selected from the group consisting of:
   information concerning occupations of said visitors;
   information concerning income levels of said visitors;
   information concerning educational levels of said visitors;
   marital status information about said visitors;
   gender information about said visitors;
   ethnicity information about said visitors;
   residence information about said visitors; and
   language information about said visitors.

3. In a customer relationship system for an E-Business retailer, a method for managing profile information concerning web site visitors to a web store web site operated by said E-Business retailer, said method comprising the step of establishing a database for storing and organizing said profile information, said profile information being organized within said database in accordance with a logical data model including a plurality of entities and relationships defining the manner in which said profile information is stored and organized within said database system, wherein said profile information includes at least one information type selected from the group consisting of:

information concerning occupations of said visitors;
information concerning income levels of said visitors;
information concerning educational levels of said visitors;
marital status information about said visitors;
gender information about said visitors;
ethnicity information about said visitors;
residence information about said visitors; and
language information about said visitors.

* * * * *